US006677964B1

(12) United States Patent
Nason et al.

(10) Patent No.: US 6,677,964 B1
(45) Date of Patent: \*Jan. 13, 2004

(54) METHOD AND SYSTEM FOR CONTROLLING A COMPLEMENTARY USER INTERFACE ON A DISPLAY SURFACE

(75) Inventors: D. David Nason, Bainbridge Island, WA (US); Mahyar Ghadiali, Issaquah, WA (US); John Easton, Vashon, WA (US)

(73) Assignee: xSides Corporation, Seattle, WA (US)

( \* ) Notice: Subject to any disclaimer, the term of this patent is extended or adjusted under 35 U.S.C. 154(b) by 546 days.

This patent is subject to a terminal disclaimer.

(21) Appl. No.: 09/726,202

(22) Filed: Nov. 28, 2000

Related U.S. Application Data

(63) Continuation-in-part of application No. 09/666,032, filed on Sep. 20, 2000.
(60) Provisional application No. 60/248,438, filed on Nov. 13, 2000, and provisional application No. 60/183,453, filed on Feb. 18, 2000.

(51) Int. Cl.[7] ............................. G06F 3/14; G06F 9/445
(52) U.S. Cl. ....................... 345/764; 345/762; 345/967; 709/318; 709/323; 717/121
(58) Field of Search ................................. 345/764, 762, 345/765, 778, 769, 770, 967, 779, 698; 348/565, 566, 567; 709/328, 318, 319, 321, 323, 324, 329; 717/113, 110, 116, 120, 121

(56) References Cited

U.S. PATENT DOCUMENTS

| 4,476,464 A | 10/1984 | Hobbs ........................ 340/731 |
| 4,586,035 A | 4/1986 | Baker et al. ................. 340/712 |
| 4,642,790 A | 2/1987 | Minshull et al. ............. 364/900 |
| 4,649,499 A | 3/1987 | Sutton et al. ............... 364/518 |

(List continued on next page.)

FOREIGN PATENT DOCUMENTS

| EP | 0419765 A1 | 4/1991 |
| EP | 0564174 A2 | 10/1993 |
| EP | 0747805 A1 | 12/1996 |
| JP | 11167478 | 6/1999 |
| TW | 302453 | 4/1997 |
| TW | 357304 | 5/1999 |
| WO | WO 96/34467 | 10/1996 |
| WO | WO 97/21183 | 6/1997 |
| WO | WO 99/27517 | 6/1999 |

OTHER PUBLICATIONS

U.S. patent application Ser. No. 09/344,409, Porter, filed Jun. 24, 1999.

(List continued on next page.)

Primary Examiner—Raymond J. Bayerl
(74) Attorney, Agent, or Firm—Michael J. Donohue; Davis Wright Tremaine LLP

(57) ABSTRACT

An alternate display content controller provides a technique for controlling a video display separately from and in addition to the content displayed on the operating system display surface. Where the display is a computer monitor, the alternate display content controller interacts with the computer utility operating system and hardware drivers to control allocation of display space and create and control one or more parallel graphical user interfaces in addition to the operating system desktop. An alternate display content controller may be incorporated in either hardware or software. As software, an alternate display content controller may be an application running on the computer operating system, or may include an operating system kernel of varying complexity ranging from dependent on the utility operating system for hardware system services to a parallel system independent of the utility operating system and capable of supporting dedicated applications. The alternate display content controller may also include content and operating software delivered over the Internet or any other LAN. The alternate display content controller may also be included in a television decoder/settop box to permit two or more parallel graphical user interfaces to be displayed simultaneously.

30 Claims, 34 Drawing Sheets

U.S. PATENT DOCUMENTS

| | | | | |
|---|---|---|---|---|
| 4,710,761 A | 12/1987 | Kapur et al. | ................ | 340/721 |
| 4,868,765 A | 9/1989 | Diefendorff | ................ | 364/521 |
| 4,899,136 A | 2/1990 | Beard et al. | ................ | 340/706 |
| 4,972,264 A | 11/1990 | Bishop et al. | ................ | 358/183 |
| 5,001,697 A | 3/1991 | Torres | ................ | 364/521 |
| 5,060,170 A | 10/1991 | Bourgeois et al. | ................ | 364/521 |
| 5,072,412 A | 12/1991 | Henderson, Jr. et al. | .... | 395/159 |
| 5,119,082 A | 6/1992 | Lumelsky et al. | ................ | 340/731 |
| 5,146,556 A | 9/1992 | Hullot et al. | ................ | 395/159 |
| 5,202,961 A | 4/1993 | Mills et al. | ................ | 395/159 |
| 5,305,435 A | 4/1994 | Bronson | ................ | 395/159 |
| 5,339,390 A | 8/1994 | Robertson et al. | ................ | 395/157 |
| 5,367,623 A | 11/1994 | Iwai et al. | ................ | 395/157 |
| 5,371,871 A | 12/1994 | Spilo | ................ | 395/425 |
| 5,394,521 A | 2/1995 | Henderson, Jr. et al. | .... | 395/158 |
| 5,418,572 A | 5/1995 | Nonweiler et al. | ................ | 348/446 |
| 5,473,745 A | 12/1995 | Berry et al. | ................ | 395/157 |
| 5,491,795 A | 2/1996 | Beaudet et al. | ................ | 395/159 |
| 5,500,934 A | 3/1996 | Austin et al. | ................ | 395/755 |
| 5,513,342 A | 4/1996 | Leong et al. | ................ | 395/157 |
| 5,521,614 A | 5/1996 | Kotha et al. | ................ | 345/128 |
| 5,561,471 A | 10/1996 | Kim et al. | ................ | 348/565 |
| 5,568,603 A | 10/1996 | Chen et al. | ................ | 395/155 |
| 5,586,244 A | 12/1996 | Berry et al. | ................ | 395/340 |
| 5,617,526 A | 4/1997 | Oran et al. | ................ | 395/326 |
| 5,619,639 A | 4/1997 | Mast | ................ | 395/326 |
| 5,621,428 A | 4/1997 | King et al. | ................ | 345/118 |
| 5,621,904 A | 4/1997 | Elliott et al. | ................ | 395/342 |
| 5,625,782 A | 4/1997 | Soutome et al. | ................ | 395/341 |
| 5,631,825 A | 5/1997 | van Weele et al. | ................ | 364/188 |
| 5,652,851 A | 7/1997 | Stone et al. | ................ | 395/346 |
| 5,673,403 A * | 9/1997 | Brown et al. | ................ | 345/744 |
| 5,675,755 A | 10/1997 | Trueblood | ................ | 395/346 |
| 5,704,050 A | 12/1997 | Redpath | ................ | 395/339 |
| 5,724,104 A | 3/1998 | Eom | ................ | 348/569 |
| 5,742,285 A | 4/1998 | Ueda | ................ | 345/342 |
| 5,742,797 A | 4/1998 | Celi, Jr. et al. | ................ | 395/507 |
| 5,745,109 A | 4/1998 | Nakano et al. | ................ | 345/340 |
| 5,745,762 A | 4/1998 | Celi, Jr. et al. | ................ | 395/681 |
| 5,757,386 A | 5/1998 | Celi, Jr. et al. | ................ | 395/507 |
| 5,764,964 A | 6/1998 | Dwin et al. | ................ | 395/509 |
| 5,771,042 A | 6/1998 | Santos-Gomez | ................ | 345/342 |
| 5,793,438 A | 8/1998 | Bedard | ................ | 348/569 |
| 5,812,132 A | 9/1998 | Goldstein | ................ | 345/345 |
| 5,818,416 A | 10/1998 | Hwang | ................ | 345/127 |
| 5,825,357 A | 10/1998 | Malamud et al. | ................ | 345/340 |
| 5,831,592 A | 11/1998 | Cahill, III | ................ | 345/127 |
| 5,838,296 A | 11/1998 | Butler et al. | ................ | 345/127 |
| 5,847,709 A | 12/1998 | Card et al. | ................ | 345/355 |
| 5,864,347 A | 1/1999 | Inoue | ................ | 345/516 |
| 5,874,937 A | 2/1999 | Kesatoshi | ................ | 345/127 |
| 5,874,958 A | 2/1999 | Ludolph | ................ | 345/339 |
| 5,874,965 A | 2/1999 | Takai et al. | ................ | 345/357 |
| 5,940,077 A | 8/1999 | Amro | ................ | 345/342 |
| 6,008,803 A | 12/1999 | Rowe et al. | ................ | 345/327 |
| 6,018,332 A | 1/2000 | Nason et al. | ................ | 345/127 |
| 6,025,841 A | 2/2000 | Finkelstein et al. | ................ | 345/342 |
| 6,025,884 A | 2/2000 | Choi | ................ | 348/565 |
| 6,094,230 A | 7/2000 | Han | ................ | 348/564 |
| 6,118,428 A * | 9/2000 | Blackmon et al. | ...... | 345/781 X |
| 6,151,059 A | 11/2000 | Schein et al. | ................ | 348/13 |
| 6,172,669 B1 | 1/2001 | Murphy et al. | ................ | 345/199 |
| 6,310,603 B1 | 10/2001 | Nason et al. | ................ | 345/145 |
| 6,320,577 B1 | 11/2001 | Alexander | ................ | 345/339 |
| 6,330,010 B1 | 12/2001 | Nason et al. | ................ | 345/802 |
| 6,337,717 B1 | 1/2002 | Nason et al. | ................ | 348/567 |
| 6,356,284 B1 | 3/2002 | Manduley et al. | ................ | 345/779 |

OTHER PUBLICATIONS

U.S. patent application Ser. No. 09/517,874, Porter, filed Mar. 2, 2000.

Brunhoff, "Pleasing the Eye," *Unix Review,* 7(10):65–72, 1989.

Cohen et al., "Constraint–Based Tiled Windows," *IEEE Computer Society Press,* pp. 35–45, 1986.

"Control Strip en Desktop Strip," *Apple World Magazine,* pp. 6132–6133, XP002152897, Jul.–Aug. 1995.

"Coordinating Multiple Graphical User Interfaces Video Access," *IBM Technical Disclosure Bulletin,* 39(5):7–9, XP000584036, May 1996.

"Flexible Tool Bar," *IBM Technical Disclosure Bulletin,* 36(08):91, XP000390153, Aug. 1993.

Gancarz, "Uwm: A User Interface for X Windows," *Summer Conference Proceedings*, USENIX Association, Jun. 9–13, 1986, pp. 429–440.

"Internet Kiosk Touch Panel Shell," *IBM Technical Disclosure Bulletin,* 39(08):85–87, XP000638146, Aug. 1996.

Lantz and Rashid, "Virtual Terminal Management in a Multiple Process Environment," *Proceedings of the Seventh Symposium on Operating Systems in Principles*, Association for Computing Machinery, Dec. 10–12, 1979, pp. 86–97.

"Method and Apparatus for a Graphical Dial Interface," *IBM Technical Disclosure Bulletin,* 37(01):403, XP000428826, Jan. 1994.

Meyrowitz and Moser, "BRUWIN: An Adaptable Design Strategy for Window Manager/Virtual Terminal Systems," *Proceedings of the Eighth Symposium on Operating Systems Principles*, Association for Computing Machinery, Dec. 14–16, 1981, pp. 180–189.

"Single–Click Action Buttons," *IBM Technical Disclosure Bulletin,* 37(03):93, XP000441391, Mar. 1994.

Stille et al., "A$^2$DL–An Adaptive Automatic Display Layout System," *Third Annual Symposium on Human Interaction with Complex Systems HICS '96*, IEEE Computer Society Press, pp. 243–250.

"Three–Dimensional Selection Widget," *IBM Technical Disclosure Bulletin,* 38(02):423, XP000502528, Feb. 1995.

Van Name et al., "Easing the RAM–Cram Blues," *Byte,* 15(3):227–228, 230, 232, 234, XP000652459, Mar. 1990.

* cited by examiner

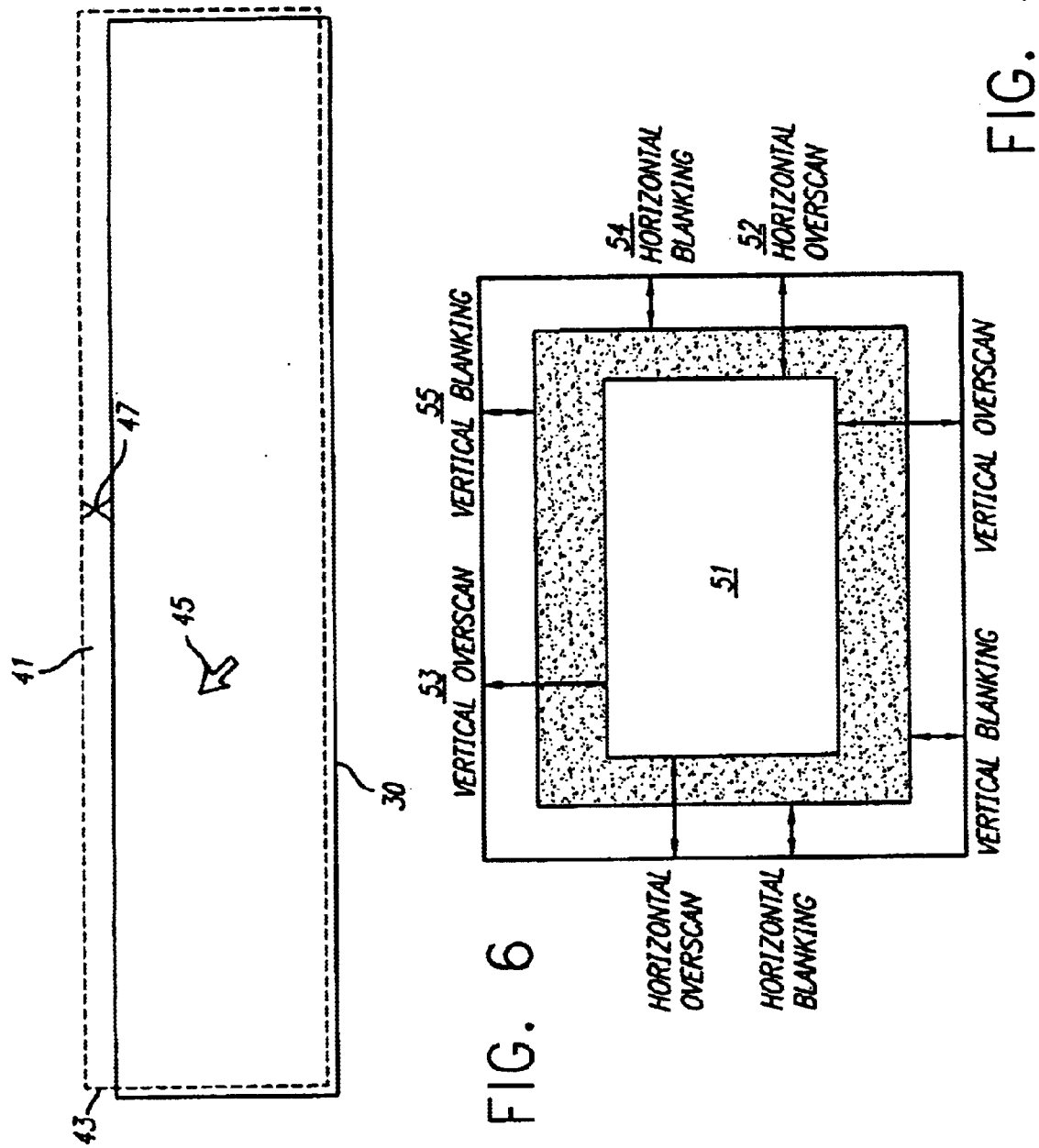

METHOD AND SYSTEM FOR CONTROLLING A COMPLEMENTARY USER INTERFACE ON A DISPLAY SURFACE

CROSS-REFERENCE TO RELATED APPLICATIONS

This application is a continuation-in-part of U.S. patent application Ser. No. 09/666,032, filed on Sep. 20, 2000, and claims the benefit of U.S. Provisional Application Nos. 60/183,453, filed on Feb. 18, 2000 and 60/248,438, filed on Nov. 13, 2000.

TECHNICAL FIELD

The present invention relates to a method and system for controlling the display of information on a display surface and, in particular, to computer software that displays one or more user interfaces that can coexist with a native user interface provided by the computer system.

BRIEF DESCRIPTION OF THE DRAWINGS

FIG. 5 is a diagram of a cursor or pointer within the overscan user interface and the hotspot above it within the standard display.

FIG. 6 is a diagram of the usable border within the vertical overscan and the horizontal overscan surrounding the standard display.

SUMMARY OF THE INVENTION

Figure 1:
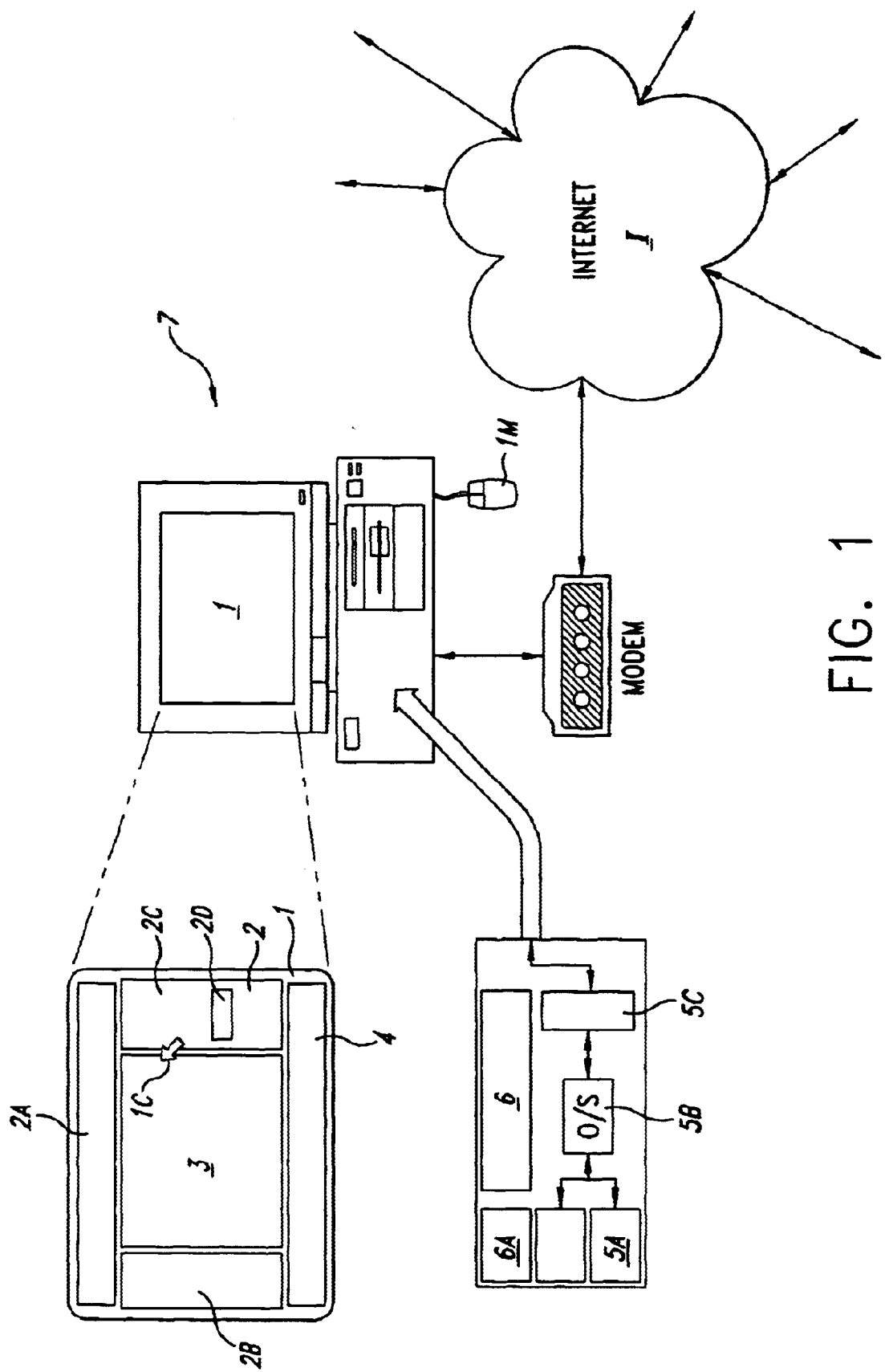
FIG. 1 is a block diagram of a first embodiment of the present invention.

Embodiments of the present invention provide computer-based methods and systems for displaying information on a display surface. When a native (resident) operating system is present, these embodiments display information in a manner that is complementary to the native operating system. The information displayed may be coexistent with a user interface provided by the native operating system. In addition, embodiments may be embedded into a native operating system and provide a primary interface to a display surface.

Embodiments also provide a technique for controlling allocation and content of display space among one or more user interfaces, operating systems or applications permitting an application or parallel graphical user interface (GUI) to operate outside the desktop, the area designated for display of the native operating system interface and it's associated applications. In an example embodiment, a computer operating under the control of any utility operating system such as Microsoft Windows™, Linux, Apple's Macintosh O/S or Unix may have the allocation of visible display controlled by techniques of the present invention. The operating system user interface (the native GUI) may be scaled and/or moved to a specific area of the display permitting a parallel (or complementary) GUI to operate in the open area. An example embodiment of the present invention may be as an application that operates under the primary or utility operating system or it may be distributed as functionality that is combined with an operating system kernel (e.g., distributed as a microkernel) to control the display and content in the parallel display.

Also, in some embodiments, a technique is provided for adding and using a parallel graphical user interface adjacent to the primary graphical display user interface, for example in the border beyond the standard screen display area. Conventional video systems, such as VGA, SVGA, XGA, SXGA and UXGA video systems, include a defined border surrounding the display area. The original purpose of this border was to allow adequate time for the horizontal and vertical retrace of the electron gun in a cathode ray tube display. However, with the advent of LCD displays and as retrace speeds have increased in modern monitors, it is now possible to present a user interface display in this border. The border which can be controlled as a user interface is a portion of what is known as the "overscan" area. Example embodiments include a method and system for presenting one or more additional or secondary user interfaces, for example, in the overscan area surrounding the native user interface display (the desktop).

When the electron gun in a CRT retraces to the left of the screen or the top of the screen, it requires a significant amount of time relative to the presentation of a scanned line of data. During the retrace, the electron gun is turned off ("blanked"). If the blanking time required for the retrace is equal to the amount of time available, there is no usable overscan. However, modern monitors have become much faster in their retrace speeds, leaving a significant amount of time when the electron gun need not be blanked, allowing a displayable border. In the prior art, although the border is usually "black" (the gun is turned off), it is well known how to specify that the border shall be given any one of six colors. Standard BIOS allows a specification of this color. The desired color is simply specified in one of the registers for the video controller. Typically no data for this color is stored in the buffer of video memory for the display. An example embodiment of the present invention establishes an additional video buffer for the border and allows this buffer to be written with display data like the regular display buffer. The additional video buffer is often present but unused in the graphics systems of most computers because video memory is usually implemented in sizes that are powers of 2, e.g., "512K", whereas standard desktop dimensions are not, "e.g., 640×480=300K". The display area is thereby expanded, on one or more edges, to provide a visible area previously invisible. The pixels within this newly visible area of the display are made accessible to programs through an application programming interface (API) component of example embodiments of the present invention. A program incorporating a parallel graphical user interface may be displayed in the previously blanked area of the display, functionally increasing the accessible area of the display without hardware modification. In other cases the desktop may be increased or decreased to non-standard sizes to leave open display area for the parallel graphical user interface.

Example embodiments of the present invention include a method and system for displaying an image on a video display system in an area outside of the primary display area generated by the video display system by adjusting the video display area to include display memory outside of predefined video modes. Two dimensions define the standard display area, each specifying a number of pixels. Selecting a video "mode" specifies these dimensions. The method can be accomplished by adjusting parameters for the video display system to increase the number of pixels in at least one dimension of the display system. The number of pixels which is added is less than or equal to the difference between the number of pixels specified in the video mode and a maximum number of pixels which the video display system can effectively display. Any such difference is referred to here as an overscan area. Thus, the overscan area may be the difference between the current desktop video mode and the display capability of the display device or more specifically, any portion of video memory unused when the operating system is in a given screen dimension. Because most interface displays are created by writing a desired image to a buffer or memory for the video display, the method requires allocating additional video display memory for the added pixels. The image written to such memory is then displayed by the system alongside the original display area.

In other example embodiments, only the vertical dimension is increased and the parallel or complementary user interface is presented above or below the primary display area. Alternatively, the horizontal dimension may be increased and the parallel user interface displayed to the right or the left of the primary display area. Similarly, the parallel user interface may be displayed on any or all of the four sides of the primary display area.

In still other example embodiments, a parallel (or complementary) GUI is provided that includes access to existing search engines and browsers. In another embodiment, the parallel GUI includes a search engine and/or browser. A search engine and/or browser may be opened in either the overscan area or a space within or over the native operating system user interface.

In still other example embodiments, techniques are provided for adding and using a parallel graphical user interface adjacent to the primary graphical display user interface even if no overscan area is used. These techniques can be used to increase the overall real estate of the display area whereby the desktop is reduced, scaled, or moved to fit in a smaller or new portion of the total display area. A parallel user interface can then be displayed in the remaining portion of the total display area, or in a space within or over the desktop. In one embodiment, displaying and maintaining the parallel user interface is accomplished transparent to the user interface of the native operating system by intercepting calls to the video display driver. In some embodiments, techniques are provided for Windows™ environments and for Unix style environments. Other embodiments using similar techniques for other types of environments are also contemplated.

In yet another embodiment, a pixel mask technology is provided for supporting permitted applications to define, reserve, and use persistent display regions within the native desktop area of the display screen. These persistent display regions mask other output, thus preventing the output from the permitted applications to a persistent display region from being obscured by output from other (non-permitted) applications.

In yet another embodiment, a display-trap technology is provided to support a video card and driver independent mechanism for reducing the display area allocated to the desktop user interface, so that one or more parallel user interfaces can be displayed in the remaining area of the display screen.

In another embodiment, the methods and systems of the present invention are combined with voice and video streaming technologies, such as VoIP, IP streaming video, video encoding, video conferencing, and television programming and enabliing technologies, such as EPG and HDTV support, to produce applications whose user interfaces communicate outside of the native desktop area. For example, calendars, calculators, video conferencing applications, phones, etc. can be provided that are enabled to communicate with a user in one or more areas outside, or on top of, the desktop. In one embodiment, the user interfaces of these applications are persistent and operate independently of the native operating system, so that they remain executing, even when the operating system fails. In one embodiment, these applications are combined with a microkernel that is native operating system independent and can run on any computer system that the microkernel supports, including as an embedded application in a hardware device. In one embodiment, these techniques are used to create a webtop interface, which is independent of the desktop and the native operating system.

These and other features and advantages of embodiments of the present invention will become further apparent from the detailed description and accompanying figures and appendices that follow.

DESCRIPTION OF THE INVENTION

Embodiments of the present invention provide methods and systems for displaying information on a display surface in a manner that complements the display metaphor and technology provided by a native operating system. Using techniques of embodiments of the present invention, a complementary user interface is made operable within an existing system or is provided as a stand-alone environment. The complementary user interface may coexist as one or more secondary graphical user interfaces ("GUIs") with a primary user interface, such as conventional desktop GUI provided by the native operating system. The complementary user interface provided by such embodiments may be used, for example, to provide additional display screen real estate or to provide quick or continuous ("sticky") access to selected applications. The complementary user interface may provide access to a wide variety of capabilities, including, for example, continuous access to a user's favorite network locations on, for example, the Internet. For example, continuous access to applications such as a personal information manager, calendar, phone, video conferencing, television programming, etc. may be provided.

Figure 2:
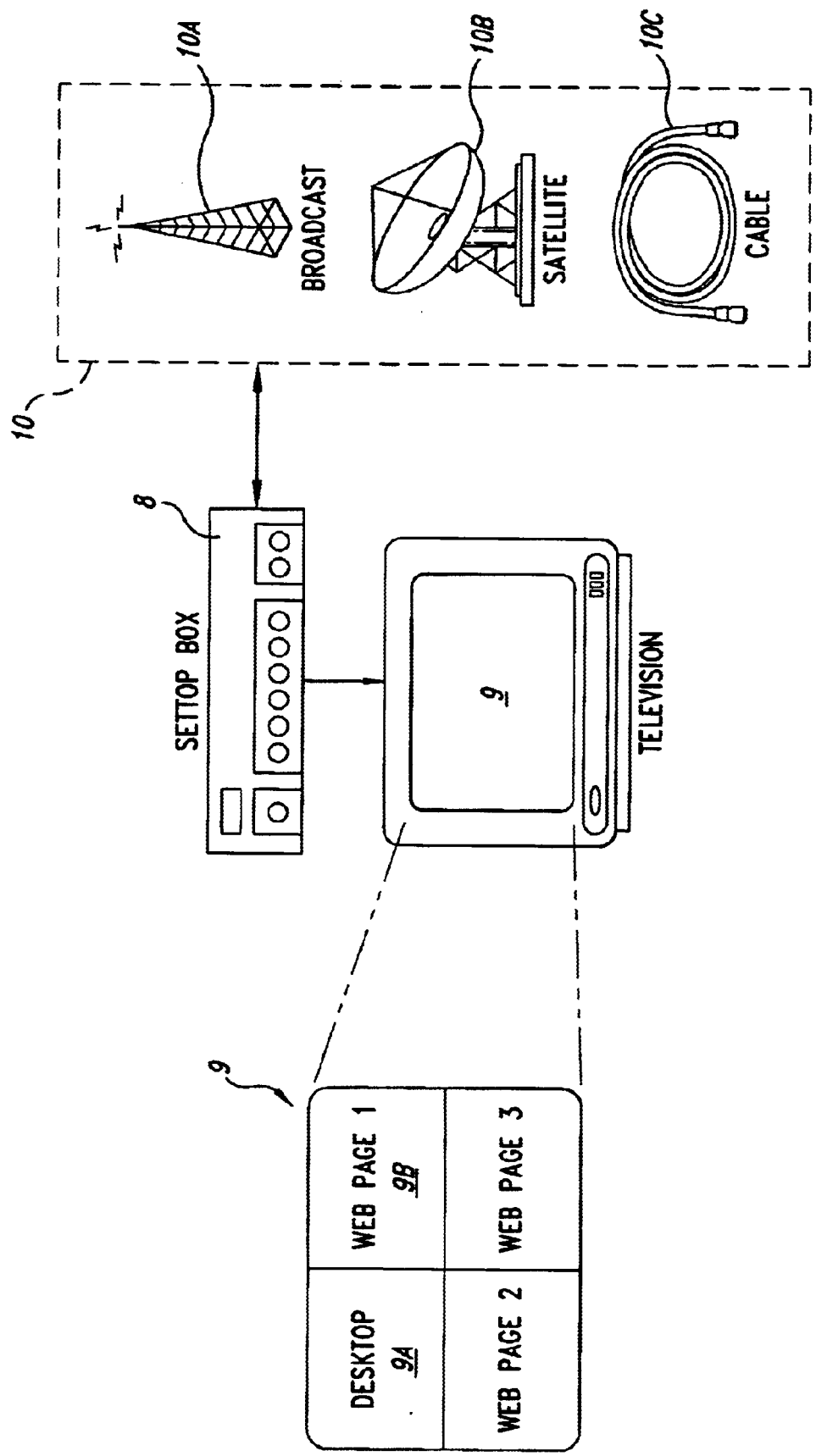
FIG. 2 is a block diagram of a second embodiment of the present invention.

Referring now to FIGS. 1 and 2, in a preferred embodiment, programming mechanisms and interfaces in a video display and control system such as computer system 7 or settop box 8 provide one or more parallel GUIs such as space 2C and/or space 4 in a display area such as display area 1 or display area 9 by providing access and visibility to a portion of the display otherwise ignored and/or inaccessible (an "overscan area"). Display areas such as display area 1 or display area 9 may be created on any type of analog or digital display hardware including but not limited to CRT, TFT, LCD and flat panel displays.

Alternate display content controller 6 interacts with the computer utility operating system 5B and hardware drivers 5C to control allocation of display space 1 and create and control one or more parallel graphical user interfaces such as context sensitive network browser (CSNB) 2 and internet pages 2A and 2B adjacent to the operating system desktop 3. Alternate display content controller 6 may be incorporated in either hardware or software. As software, an alternate display content controller may be an application running on the computer operating system, or may include an operating system kernel of varying complexity ranging from dependent on the native operating system for hardware system services to a parallel system independent of the native operating system and capable of supporting dedicated applications. Applications enabled with the alternate display content controller also may be embedded in various devices. The alternate display content controller may also include content and operating software such as JAVA delivered over the Internet I, or over any other network.

The alternate display content controller may also be included in a television decoder/settop box such as box 8 to permit two or more parallel graphical user interfaces such as pages 9A and 9B to be displayed simultaneously. Methods and systems of the present invention may be compatible with conventional television formats such as NTSC, PAL, PAL-C, SECAM and MESECAM. In this configuration content and software may be delivered over any conventional delivery medium 10 including but not limited to over the air broadcast signals 10A, cable 10C, optical fiber, and satellite 10B.

FIG.'s 1 and 2 will be referenced in more detail below.

Figure 15:
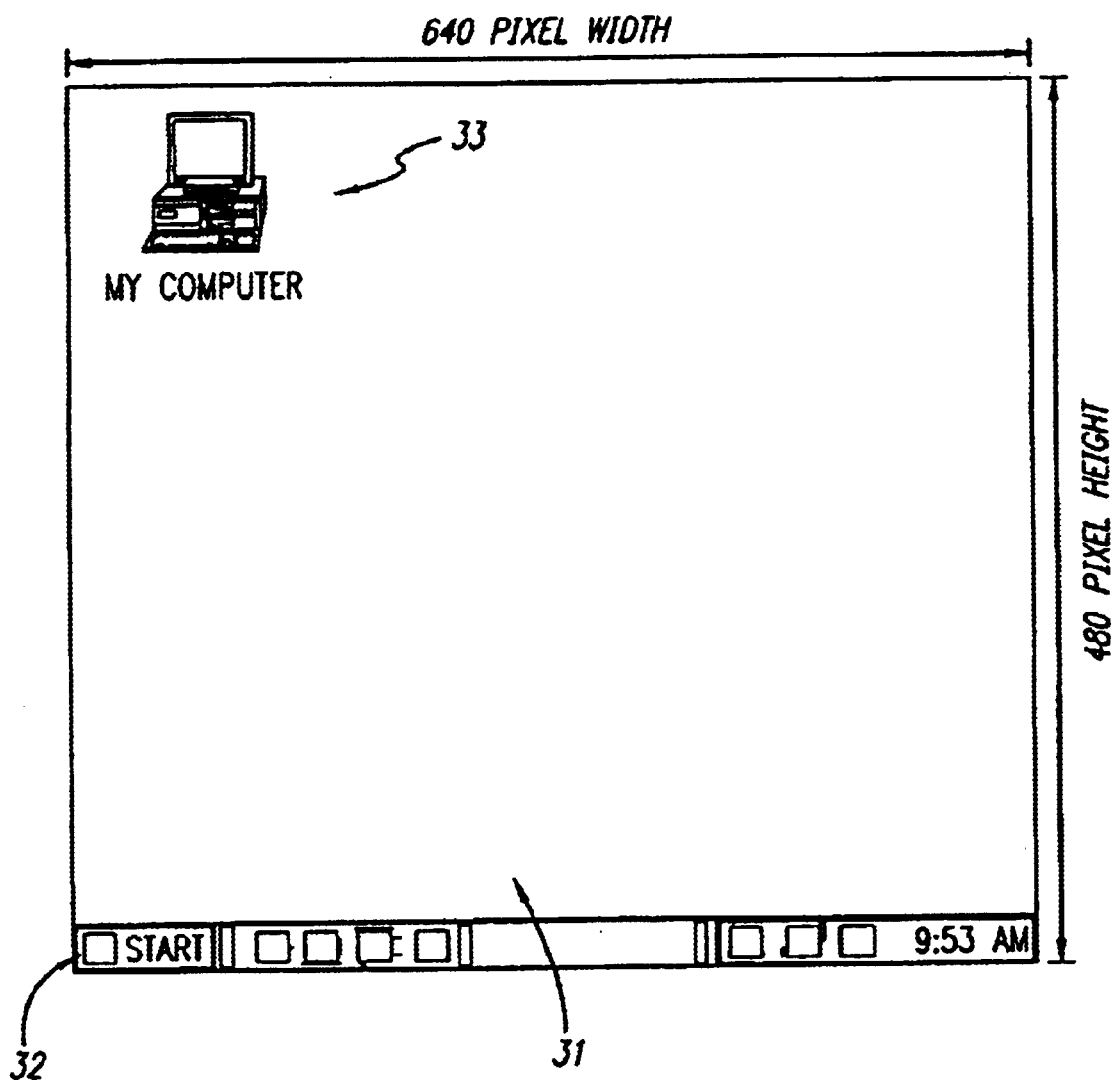
FIG. 15 is a diagram of a standard display of the prior art.

FIG. 15 shows an example of a standard prior art display desktop generated by a Microsoft Windows 95™ operating system. Within the desktop 31 are the taskbar 32 and desktop icons 33.

Figure 3:
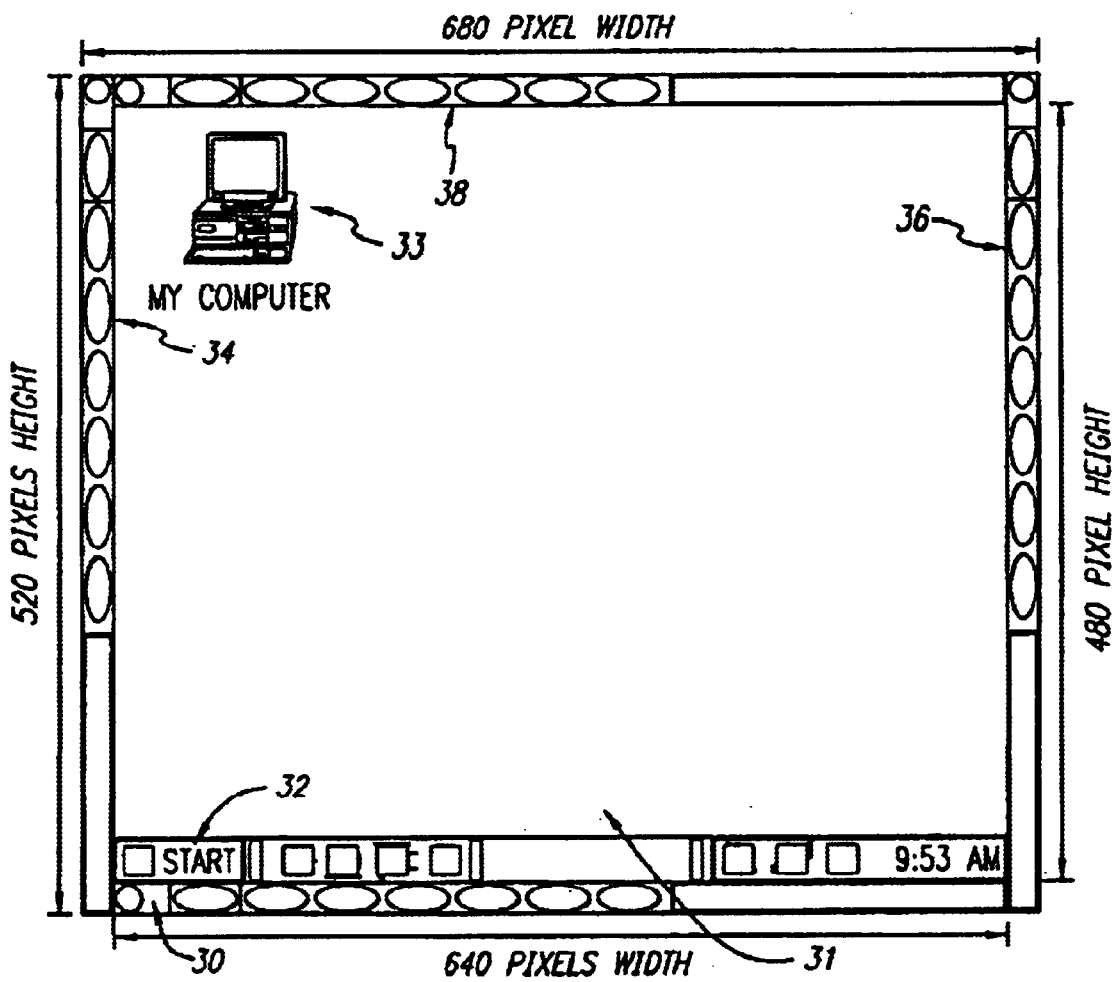
FIG. 3 is a diagram of a standard display with an overscan user interface on all four borders of the display.
Figure 16:
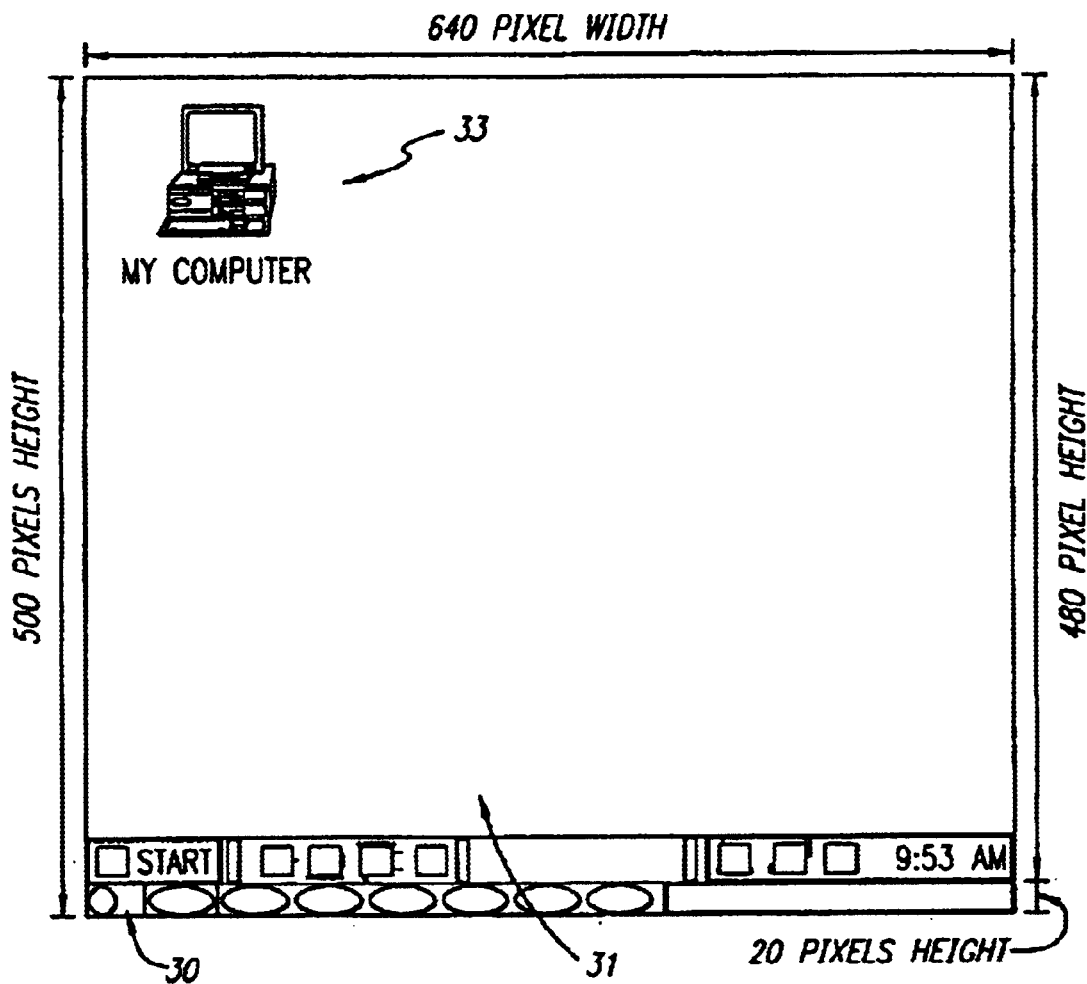
FIG. 16 is a diagram of a standard display with an overscan user interface in the bottom overscan area.

In one embodiment of the present invention, a complementary graphical user interface image is painted onto one or more of the sides of the overscan area as shown in FIG. 3. FIG. 3 is a depiction of a Super VGA (SVGA) display with the addition of a graphical bar user interface displayed in the overscan area. The overscan user interface bar 30 is defined to reside outside the borders of the "desktop" display area 31. In FIG. 16, the display is modified to include a graphical user interface 30 in a bar 20-pixels high below the bottom edge. In FIG. 3, the display is modified to include a graphical user interface in four bars each 25-pixels high/wide outside each of the four display edges: a bottom bar 30, a left side bar 34, a right side bar 36, and a top bar 38. The complementary interface may include, and is not limited to, buttons, menus, application output controls (such as a "ticker window"), animations, and user input controls (such as edit boxes). Because the complementary interface is not obscured by other applications running within the standard desktop, the complementary interface may be constantly visible or it may toggle between visible and invisible states based upon any of a number of programming parameters (including, but not limited to, the state of the active window, the state of a toggle button, a network message, user preference, etc.).

Figure 25:
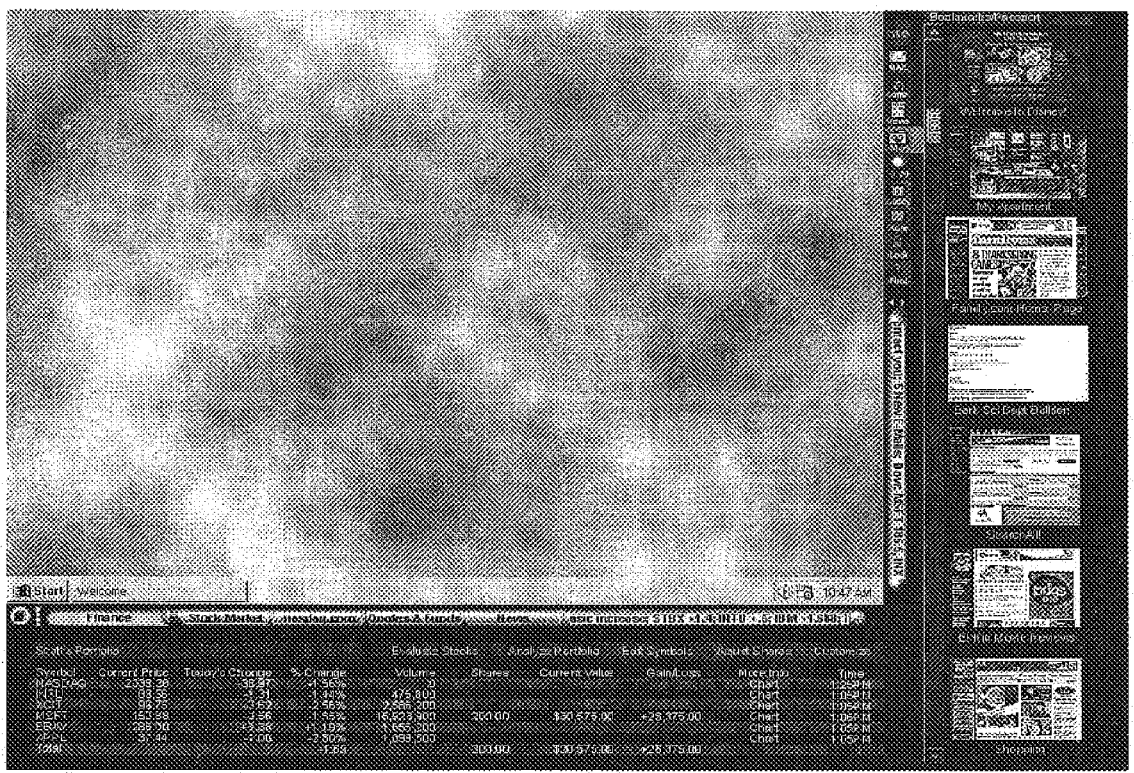
Figure 26:
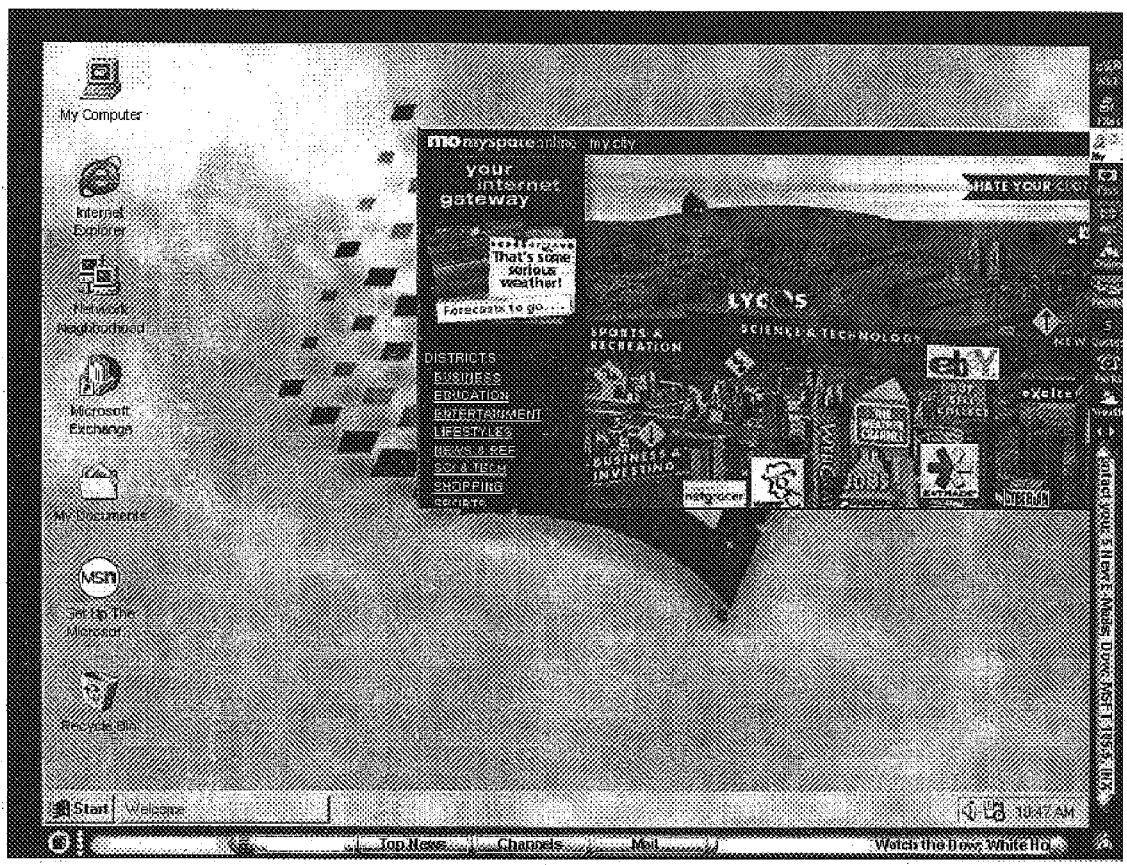
Figure 27:
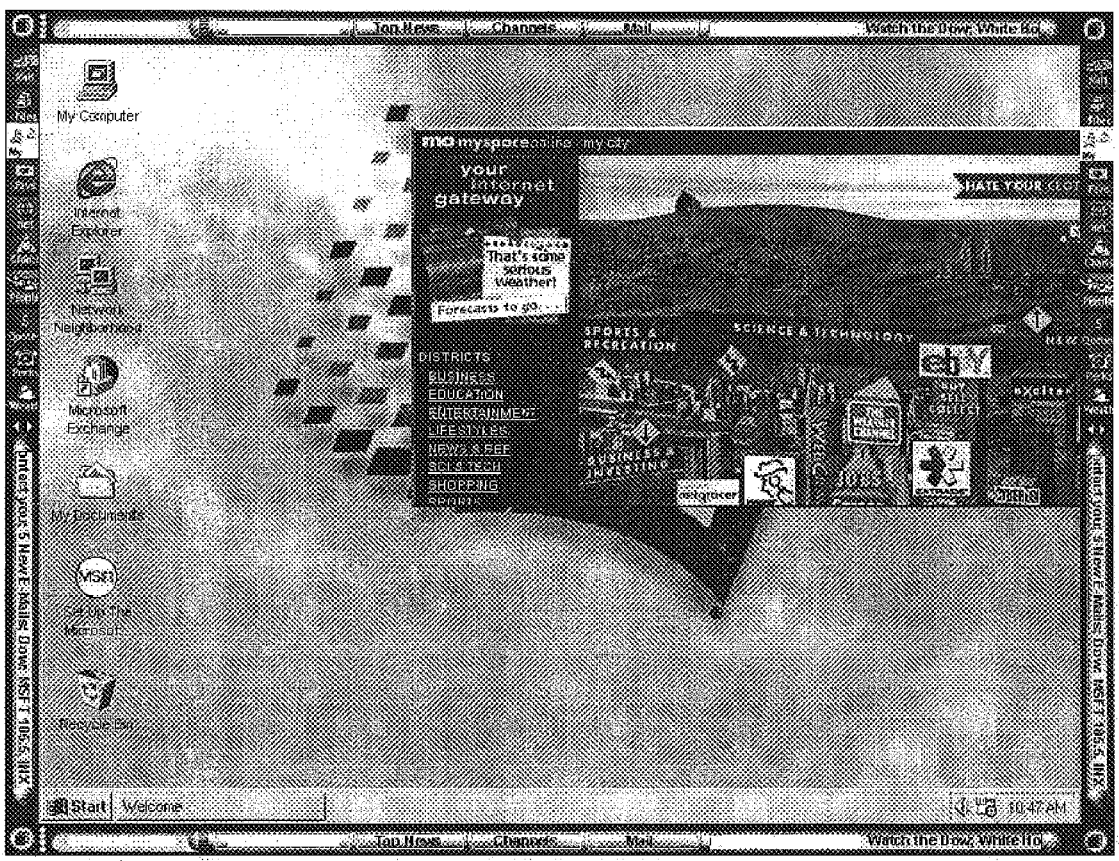
Figure 28:
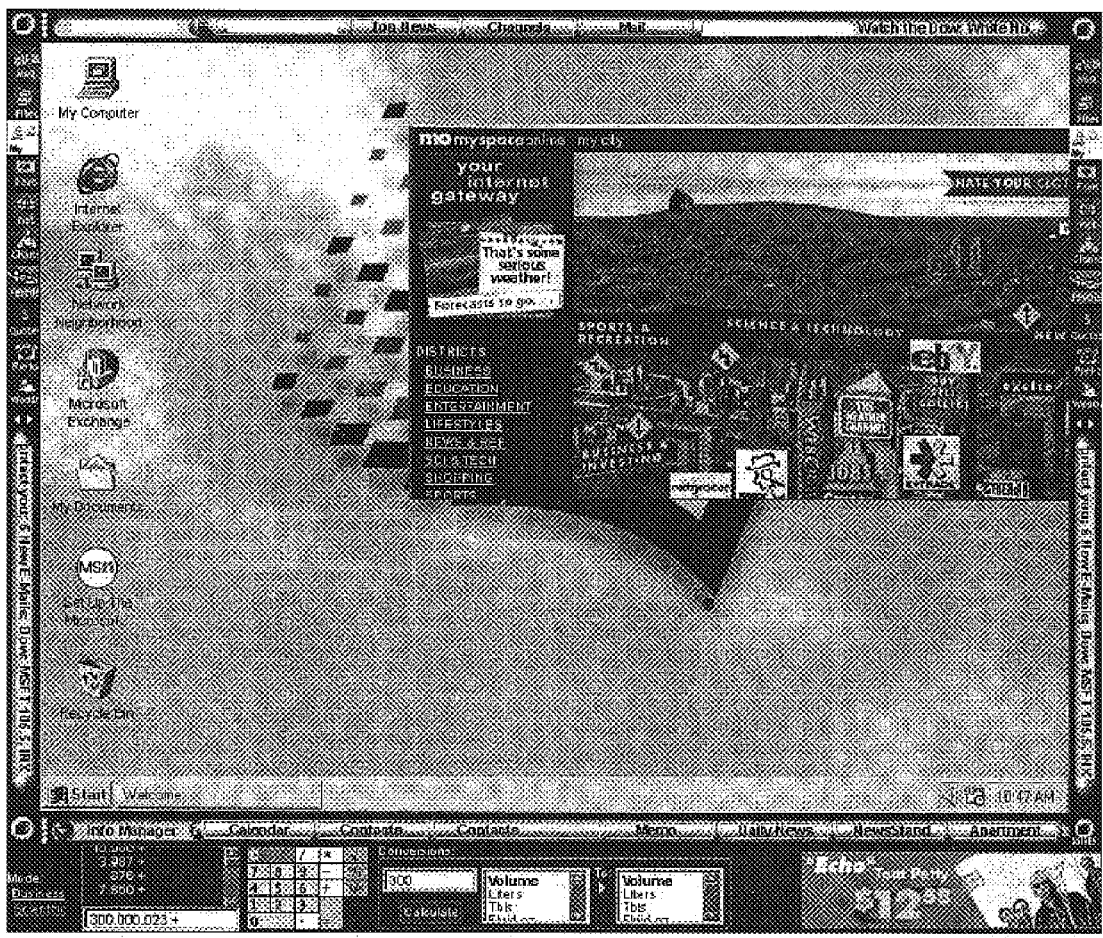
Figure 29:
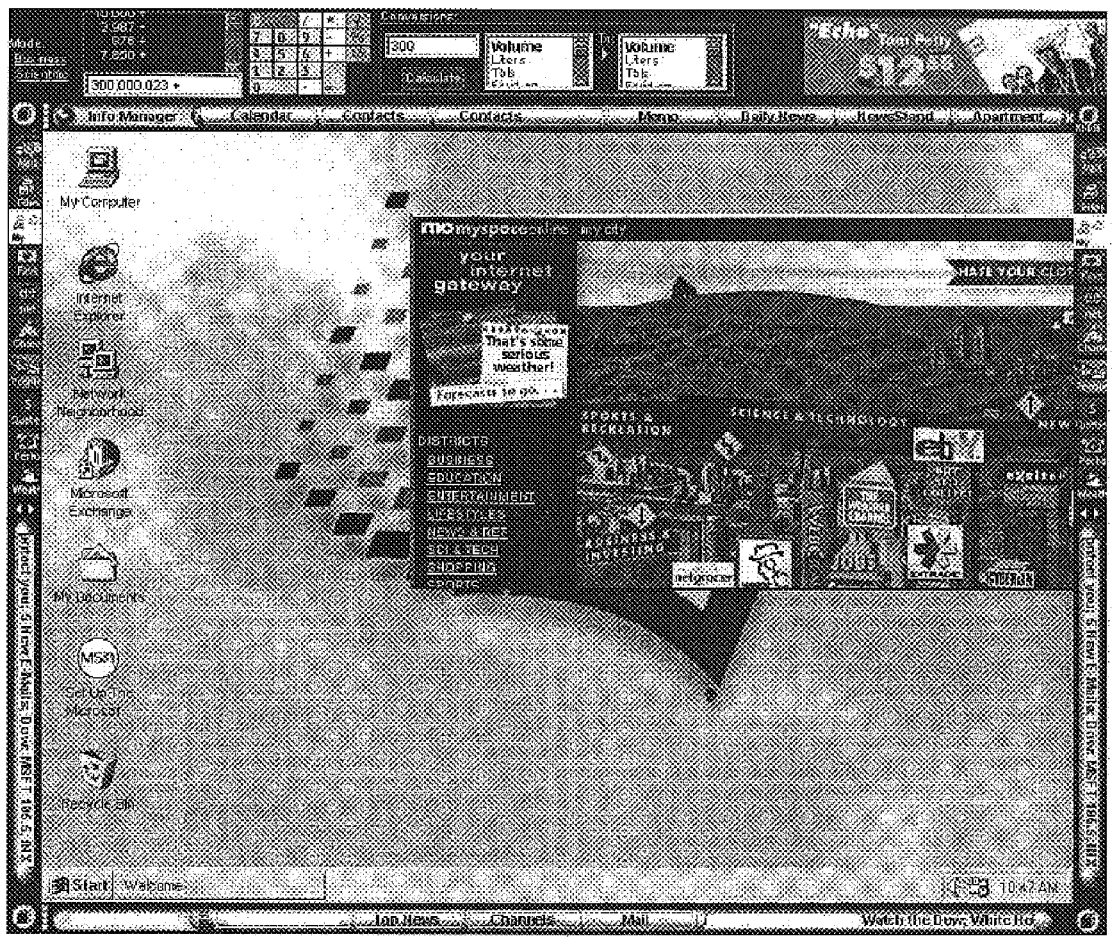
Figure 30:
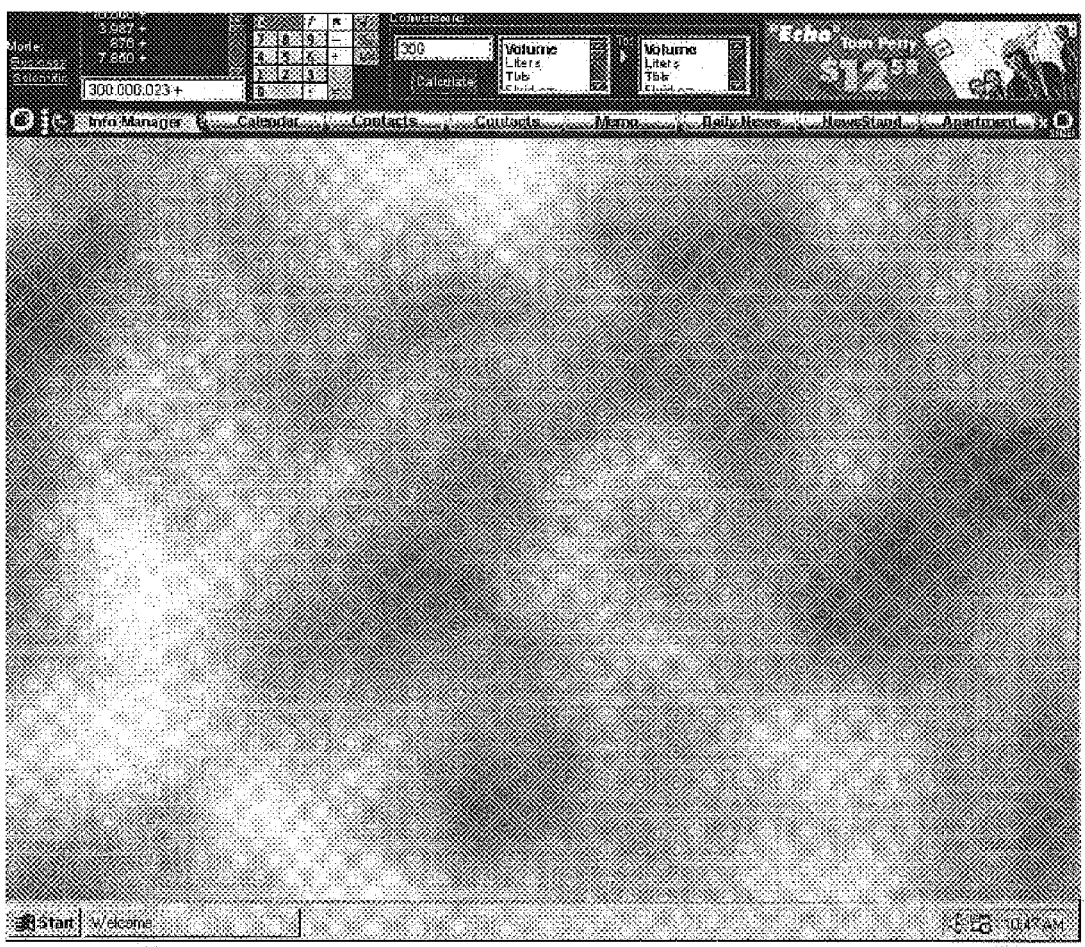

Also, once the overscan area is allocated or other methods are employed to increase the overall real estate of the display area (or even if the display area remains unchanged in size), the native desktop may be reduced or moved to fit in a smaller or new portion of the total display area, leaving any side or other region open for displaying the complementary user interface. FIGS. 22–30 illustrate several possible configurations and allocations of the display area to include one or more complementary user interfaces. These figures illustrate that the complementary user interfaces may have heterogeneous styles and sizes and may reside on one or more areas of the overscan area as well as within (overlaying) the native GUI (see, for example, menus 2301 in FIG. 23). In addition, the desktop may be moved or reduced, as shown in FIG. 25 and 30, and used in conjunction with complementary user interfaces that reside outside of or within the modified desktop. FIG. 25 also demonstrates a complementary GUI whose contents can be dynamically driven by connecting to a network, such as the Internet. One skilled in the art will appreciate that any combination of these features is possible in practicing embodiments of the present invention and that additional features may be added within the scope of the present invention.

1. Video Display System Environment

Figure 4:
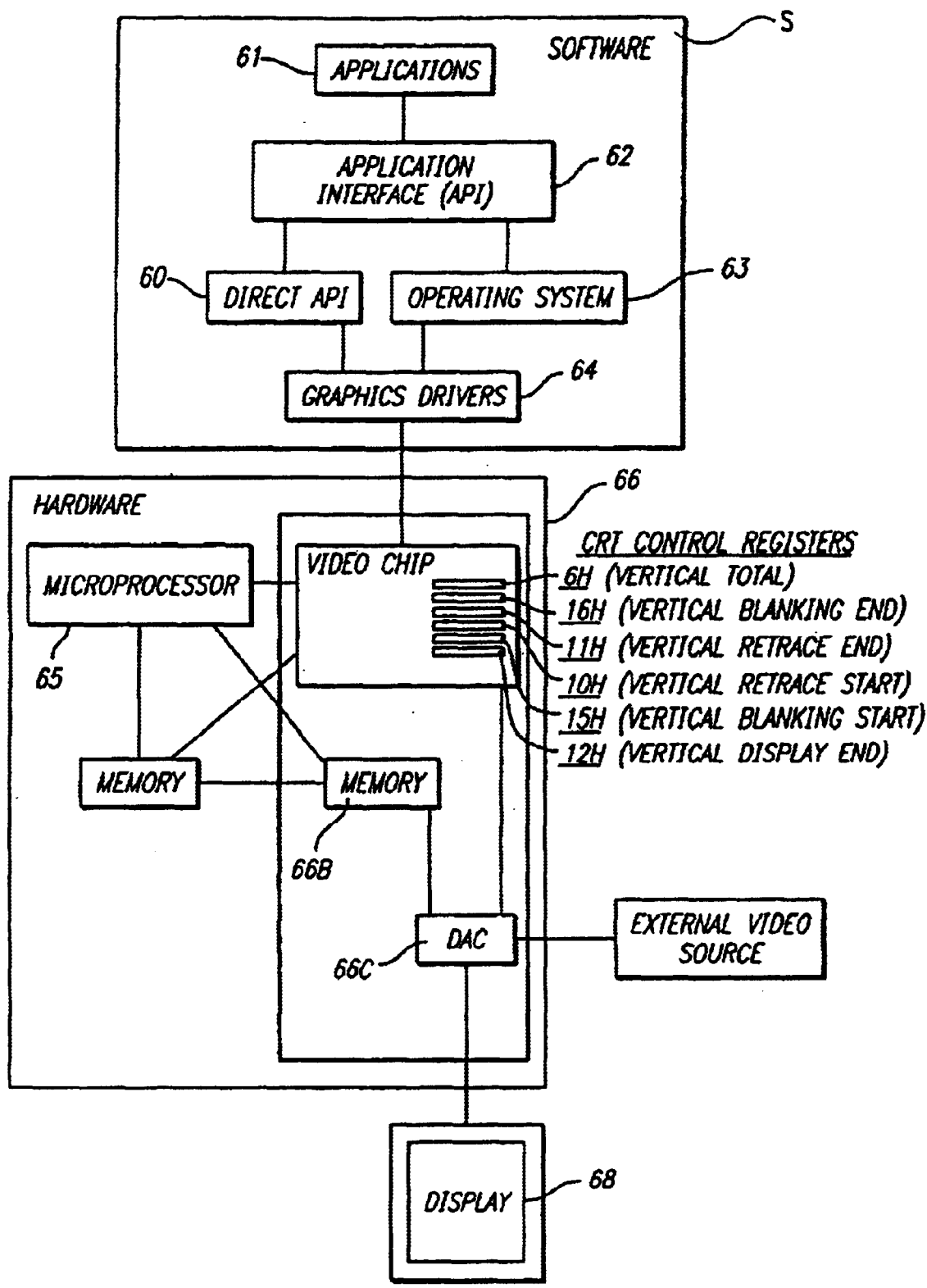
FIG. 4 is a block diagram of the basic components of a computer system video display environment that interacts with the methods and systems of the present invention.

FIG. 4 is a block diagram of the basic components of a computer system video display environment that interacts with the methods and systems of the present invention. Within the software component S are the native operating system 63 and one or more applications such as application 61. Within the protected modes of modem systems, applications 61 do not have direct access to the Video or Graphics Drivers 64 or hardware components such as the video card 66 which contains the video chipset 66A, 66B and 66C. Abstraction layers such as Application Programming Interface (API) 60, and/or DirectX API 62, provide limited access, often through the operating system 63. One such example API is Microsoft's GDI, which provides graphical display capabilities to applications running in Microsoft Windows environments.

Embodiments of the present invention provide a technique for painting and accessing an area of the computer display not accessible, or used, in the native desktop graphics modes. In the Microsoft Windows environments (including Microsoft Window 95 and derivatives, and Microsoft Windows NT 4.0 and derivatives) and other contemporary operating environments, the primary display area desktop is usually assigned by the operating system to be one of a set of pre-determined video "modes" such as those laid out in Tables 1 and 2 below, each of which is predefined at a specific pixel resolution. Thus, the accessible area of the computer display may not be modified except by selecting another of the available predefined modes.

TABLE 1

ROM BIOS VIDEO MODES

| Mode Number | Resolution | Mode Colors | Buffer Type | Segment |
|---|---|---|---|---|
| 00H | 42 × 25 chars (320 × 350 pixels) | 16 | Alpha | B800 |
| 00H | 42 × 25 chars (320 × 350 pixels) | 16 | Alpha | B800 |
| 00H | 42 × 25 chars (320 × 400 pixels) | 16 | Alpha | B800 |
| 00H | 42 × 25 chars (320 × 400 pixels) | 16 | Alpha | B800 |
| 01H | 42 × 25 chars (320 × 200 pixels) | 16 | Alpha | B800 |
| 01H | 42 × 25 chars (320 × 350 pixels) | 16 | Alpha | B800 |
| 01H | 42 × 25 chars (320 × 400 pixels) | 16 | Alpha | B800 |
| 01H | 42 × 25 chars (320 × 400 pixels) | 16 | Alpha | B800 |
| 02H | 80 × 25 chars (640 × 200 pixels) | 16 | Alpha | B800 |
| 02H | 80 × 25 chars (640 × 350 pixels) | 16 | Alpha | B800 |
| 02H | 80 × 25 chars (640 × 400 pixels) | 16 | Alpha | B800 |
| 02H | 80 × 25 chars (640 × 400 pixels) | 16 | Alpha | B800 |
| 03H | 80 × 25 chars (640 × 200 pixels) | 16 | Alpha | B800 |
| 03H | 80 × 25 chars (640 × 350 pixels) | 16 | Alpha | B800 |
| 03H | 80 × 25 chars (640 × 400 pixels) | 16 | Alpha | B800 |
| 03H | 80 × 25 chars (720 × 400 pixels) | 16 | Alpha | B800 |
| 04H | 320 × 200 pixels | 4 | Graphics | B800 |
| 05H | 320 × 200 pixels | 4 | Graphics | B800 |
| 06H | 840X200 pixels | 2 | Graphics | B800 |
| 07H | 80 × 25 chars (720 × 350 pixels) | 2 | Alpha | B000 |
| 07H | 80 × 25 chars (720 × 400 pixels) | 2 | Alpha | B000 |
| 0DH | 320 × 200 pixels | 16 | Graphics | A000 |
| 0EH | 640 × 200 pixels | 16 | Graphics | A000 |
| 0FH | 640 × 350 pixels | 4 | Graphics | A000 |
| 10H | 640 × 350 pixels | 4 | Graphics | A000 |
| 10H | 640 × 350 pixels | 16 | Graphics | A000 |
| 11H | 640 × 480 pixels | 2 | Graphics | A000 |
| 12H | 640 × 480 pixels | 16 | Graphics | A000 |
| 13H | 320 × 200 pixels | 256 | Graphics | A000 |

TABLE 2

SVGA VIDEO MODES DEFINED IN THE VESA BIOS EXTENSION

| Mode Number | Resolution | Mode Colors | Buffer Type |
|---|---|---|---|
| 100H | 640 × 480 pixels | 256 | Graphics |
| 101H | 640 × 480 pixels | 256 | Graphics |
| 102H | 800 × 600 pixels | 16 | Graphics |
| 103H | 800 × 600 pixels | 256 | Graphics |
| 104H | 1024 × 768 pixels | 16 | Graphics |
| 105H | 1024 × 768 pixels | 256 | Graphics |
| 106H | 1280 × 1024 pixels | 16 | Graphics |
| 107H | 1280 × 1024 pixels | 256 | Graphics |
| 108H | 80 × 60 chars | 16 | Alpha |
| 109H | 132 × 25 chars | 16 | Alpha |
| 10AH | 132 × 43 chars | 16 | Alpha |
| 10BH | 132 × 50 chars | 16 | Alpha |
| 10CH | 132 × 60 chars | 16 | Alpha |
| 10DH | 320 × 200 pixels | 32,768 | Graphics |
| 10EH | 320 × 200 pixels | 65,536 | Graphics |
| 10FH | 320 × 200 pixels | 16,777,216 | Graphics |
| 110H | 640 × 480 pixels | 32,768 | Graphics |
| 111H | 640 × 480 pixels | 65,536 | Graphics |
| 112H | 640 × 480 pixels | 16,777,216 | Graphics |
| 113H | 800 × 600 pixels | 32,768 | Graphics |
| 114H | 800 × 600 pixels | 65,536 | Graphics |
| 115H | 800 × 600 pixels | 16,777,216 | Graphics |
| 116H | 1024 × 788 pixels | 32,768 | Graphics |
| 117H | 1024 × 768 pixels | 65,536 | Graphics |
| 118H | 1024 × 768 pixels | 16,777,216 | Graphics |
| 119H | 1280 × 1024 pixels | 32,768 | Graphics |
| 11AH | 1280 × 1024 pixels | 65,536 | Graphics |
| 11BH | 1280 × 1024 pixels | 16,777,216 | Graphics |

As shown in FIG. 6, when an image is displayed on a computer display, it is "overscanned". That is, the displayed video buffer data occupies less than the entire drivable screen size. The drivable screen size is determined by the total amount of video memory and the operative video display characteristics. The width of the overscan border that can be used for a complementary user interface depends on the amount of the horizontal overscan 52 reduced by the horizontal blanking 54 and the amount of the vertical overscan 53 reduced by the vertical blanking 55.

In one embodiment, only a border at the bottom of the standard display area is used to support a complementary user interface. Consequently, only the vertical control parameters for the cathode ray tube (CRT) controller, shown as Control Registers (CRs) 6H, 16H, 11H, 10H, 12H and 15H in FIG. 4 need to be adjusted. These parameters and others are shown in Table 3 below:

TABLE 3

VERTICAL TIMING PARAMETERS FOR CR PROGRAMMING.

| Register | Name | Description |
|---|---|---|
| 6H | Vertical Total | Value = (total number of scan lines per frame) - 2 |
| | | The high-order bits of this value are stored in the overflow registers. |
| 7H | Overflow | High-order bits from other CR registers. |
| 10H | Vertical Retrace Start | Scan line at which vertical retrace starts. |
| | | The high-order bits of this value are stored in the overflow registers. |
| 11H | Vertical Retrace End | Only the low-order 4 bits of the actual Vertical Retrace End value are stored. |
| | | (Bit 7 is set to 1 to write-protect registers 0 through 7.) |
| 12H | Vertical Display End | Scan line at which display on the screen ends. |
| | | The high-order bits of this value are stored in the overflow registers. |

TABLE 3-continued

VERTICAL TIMING PARAMETERS FOR CR PROGRAMMING.

| Register | Name | Description |
|---|---|---|
| 15H | Start Vertical Blank | Scan line at which vertical blanking starts. The high-order bits of this value are stored in the overflow registers. |
| 16H | End Vertical Blank | Scan line at which vertical blanking ends. The high-order bits of this value are stored in the overflow registers. |
| 59H-5AH | Linear Address Window Position | Linear address window position in 32-bit CPU address space. |

In the standard 640×480 graphics mode, the nominal horizontal scan rate is 31.5 KHz (31,500 times per second) with a vertical scan rate of 60 Hz (60 frames per second). So the number of lines in one frame is 31,500/60, or 525. Because only 480 lines of data need to be displayed, there are 525–480, or 45, lines available for vertical overscan. Leaving a more than adequate margin for retrace, which requires only 2 lines worth of time, the preferred embodiment uses 25 lines for the alternate display. Thus the additional 18 unused but available lines may be used to increase the size of the native operating system desktop to some non-standard size while still allowing two lines for retrace, or may be left blank, or may be used for one or more additional alternate parallel user interface displays. Similarly, the 1024×768 graphics mode may have a nominal horizontal scan rate of 68.7 KHz with a vertical scan rate of 85 Hz which computes to 808 lines per frame or 40 lines available for vertical overscan. By modifying the vertical scan rate down to 60 Hz, the frame size increases to 1145 lines which includes 377 lines available for vertical overscan.

2. Modifying the Video Display Area to Support a Complementary GUI

The information display methods of an embodiment of the present invention that uses the physical overscan area to increase display screen real estate can be achieved by providing three capabilities:

(1) to address and modify the visible resolution of the video display system such that portions of the overscan area are made visible as shown in FIG. 6, (2) to address and modify the video display contents for the visible portion of the overscan area, and (3) to provide an application programming interface (API) or other mechanism to allow applications to implement this functionality.

Figure 7:
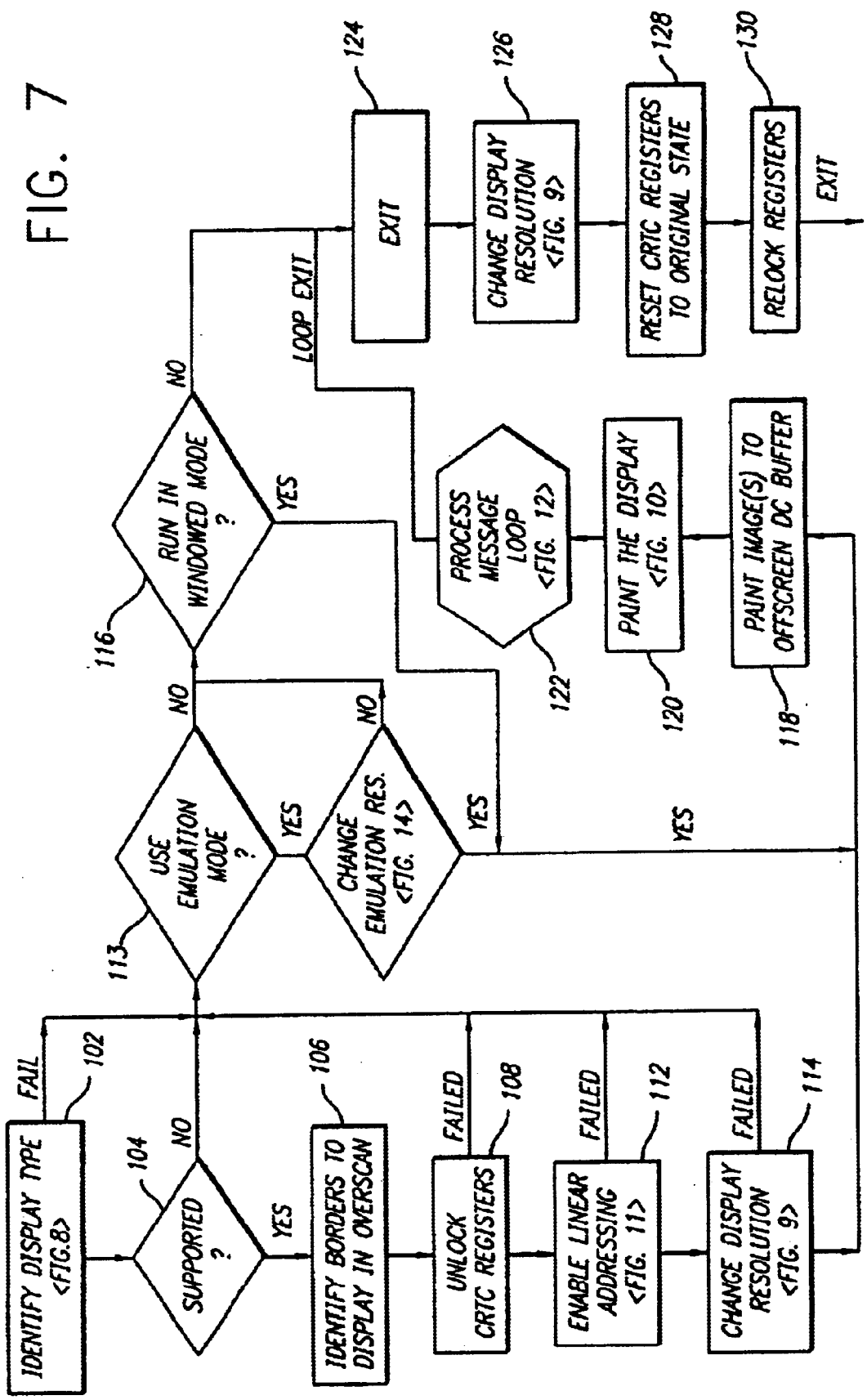
FIG. 7 is an overview flow diagram showing the operation of a preferred embodiment of the present invention.

FIG. 7, and the additional details and steps provided in FIGS. 8–13, provides example flow diagrams of an implementation of an embodiment of the present invention that meets the capabilities described above. The environment for this example implementation is a standard Microsoft Windows 95™ operating environment, using Microsoft Visual C and Microsoft MASM with Microsoft's standard platform Software Developer's Kit (SDK) and Device Driver Kit (DDK) for the development platform. One skilled in the art will recognize that other embodiments can perform on other platforms and within other environments. For example, embodiments could be implemented within any graphical interface environment, such as X-Windows, OSF Motif, Apple Macintosh OS, a Java OS, and others in which similar video standards (VGA, SVGA, XGA, SXGA, UXGA, 8514/A) are practiced. The reference books *PC Video Systems* by Richard Wilton, published by Microsoft Press and *Programmer's Guide to the EGA, VGA, and Super VGA Cards* by Richard F. Ferrano, published by Addison Wesley, herein incorporated by reference in their entirety, provide more than adequate background information to implement an embodiment in a Windows environment.

Figure 14:
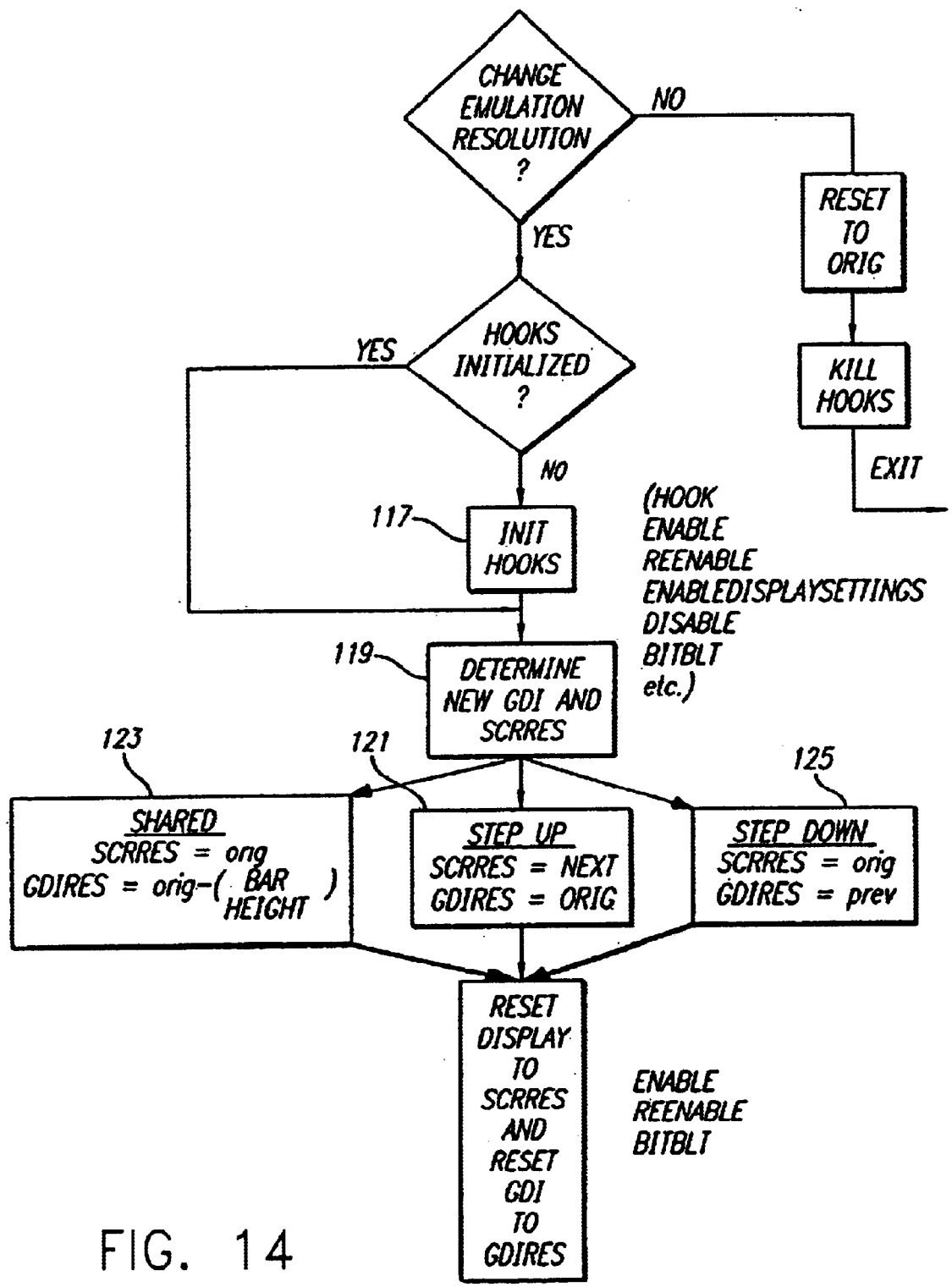
FIG. 14 is a flow diagram of the sub-steps of the Change Emulation Resolution step 115 in FIG. 7.

As noted earlier, the methods and systems of the present invention also provide other techniques, such as emulation mode, for the alternate display content controller to effectively increase the size of the display area available to parallel user interfaces, by sharing the usable display area between the native GUI and the parallel user interfaces. Emulation mode operates by either effectively shrinking down the portion of the display area allocated to the primary GUI, or by effectively increasing the resolution to a standard or non-standard resolution and utilizing the increase without offering any of the increase to the primary GUI. Emulation mode, as discussed in detail with respect to FIG. 14, provides hooks into the video driver and controls what resolution and portion of the screen is allocated to the primary GUI and what is allocated to the parallel GUIs. Note that, regardless of whether overscan techniques are used to increase the displayable area, emulation mode can be used to share the display area between a primary GUI and one or more parallel GUIs.

If the alternate display content controller determines that neither overscan techniques nor emulation mode can be used to display a complementary GUI, then it attempts to use a standard windowed mode provided by the native operating system or primary GUI.

In summary, the alternate display content controller determines how to increase the display area to utilize a complementary GUI, either by increasing the addressable area of the display (e.g., using the overscan area or by using emulation mode and increasing the resolution) or by decreasing the portion of the display usable by the primary GUI, such that remaining display area can be used by one or more complementary GUIs. Use of the overscan area is not automatic—the hardware and software system needs to be accessible to some degree in order to do this (either by knowledge of the video driver and hardware or by a series of heuristics). Several mechanisms can be used to determine whether an overscan technique can be used and are discussed in detail below. If no overscan techniques are usable in a particular video display scenerio, then the alternate display content controller determines whether an "emulation" mode can be used, which shares the resolution of the video display between the primary and any parallel (complementary) GUIs, effectively creating an accessible overscan area.

2.1 Techniques for Extending the Display Area Into the Physical Overscan Area (Overscan Mode)

Referring now in particular to FIG. 7, upon initialization, the program determines the screen borders to be accessed in Identify Borders To Display, step 106, based on user preferences and program configuration, and determines, as necessary, whether sufficient video memory exists to make the necessary display changes in the overscan area, step 106. For example, if the screen is currently set to a 1024×768 resolution at 16-bits-per-pixel, and the program is to include four graphical interfaces, one on each edge, with each bar 20 pixels deep, the program must check that video memory is greater than 1.7 MB (required number of bytes=pixels width * Bits Per Pixel * Pixels Height). This calculation is needed only when one or more bars may be displayed on the overscan screen. If the calculation fails to determine that sufficient video memory exists to display the bar or bars in the overscan area, the program proceeds to run in emulation mode. At Identify Display Type, step 102, the program attempts to determine the display type and current location in memory used by the display driver, in order to determine the size and locations of any display modifications to be made, e.g., to the size and location of overscan area(s) to be used.

Figure 8:
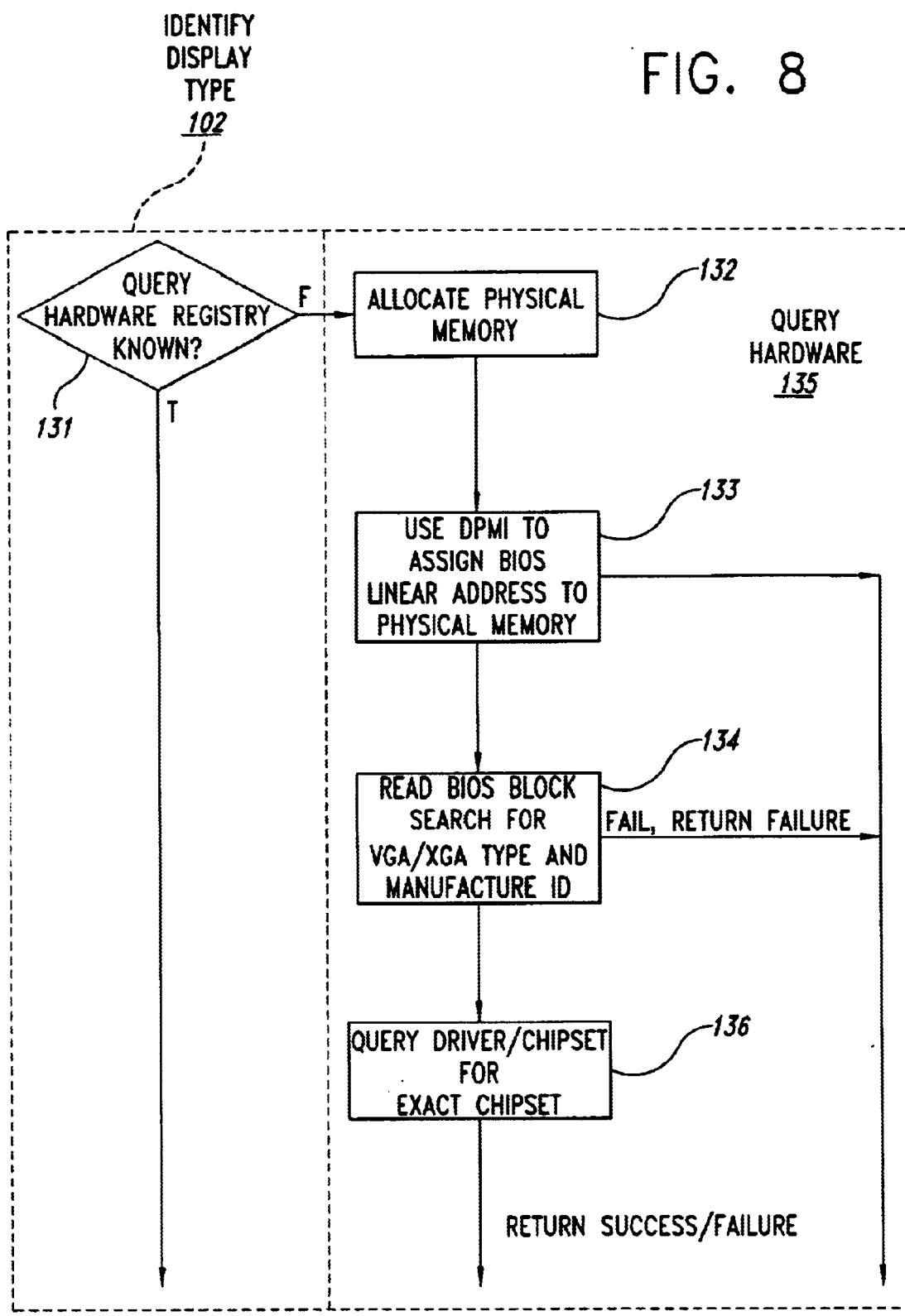
FIG. 8 is a flow diagram of the sub-steps in Identify Display step 102 of FIG. 7.

As described in further detail in FIG. 8, the program first queries the hardware registry in Query Hardware Registry, step 131, to attempt to determine the registered display type. If successful, the program then determines compatibility information in Display Type Supported, step 135, to verify that the program supports that display type and determine memory allocation information.

If the hardware registry information is unavailable, as determined in step 131, or the display type determined in step 131 is unsupported as determined by step 104, the program may use an alternate approach, shown as subroutine Query hardware, steps 135 in FIG. 8, to query the BIOS, in step 134, and the video chipset 66, in step 136, for similar information as described immediately below.

If the BIOS is to be accessed in step 134, physical memory is first allocated in Allocate Physical Memory, step 132, and accessed using Microsoft's DPMI (DOS Protected Mode Interface) to map it to the linear memory address in which the BIOS resides. It uses DPMI to assign BIOS linear address to physical memory, step 133.

Thereafter, the program queries the BIOS in Read BIOS block, Search for VGA/XVA type and manufacturer ID, step 134. If successful, the driver and chipset are then further queried to determine the display type and memory location in Query driver/chipset for exact chipset, step 136.

If the compatibility information does not indicate a standard VGA, SVGA, XGA, SXGA, UXGA, or 8514/A signature, step 134, this routine returns a failure. If a known chipset manufacturer's identification is found, the driver and/or chipset may be queried with manufacturer-specific routines, step 136, to identify and initialize, as necessary, the specific chipset.

If, in determining the display type, the program identifies a video device driver that is supported by the xSides™ Video Driver Extensions (VDE), the program will use the VDE to implement overscan mode and proceed to run. The xSides™ VDE are extensions that can be implemented by video device driver suppliers to more transparently and congruently support the xSides™ environment.

If, at step 104, the program was unable to finally identify the display type, either because the registry query in step 131 or the hardware query in step 135 was unsuccessful, the program will proceed to run in "emulation" mode.

Returning to FIG. 7, if the program has not already determined that it must proceed in "emulation" mode, it must determine whether it can proceed in "overscan" mode, step 104. There are a number of mechanisms by which this may be done. A set of classes is used, all derived from a common base class corresponding to the below-described VGA-generic technique.

The first mechanism is an implementation of the VGA-generic technique. Using this mechanism, no information specific to a video-card is necessary, other than ensuring VGA support. Using standard application programming interface (API) routines, primary and secondary surfaces are allocated.

Allocation of the primary surface will always be based on the entire screen display. Given the linear address of the allocated primary surface, from which a physical address can be derived, it can be extrapolated that the physical address of the location in video memory immediately adjacent to the primary surface, and therefore immediately below the desktop display, is represented by the sum of the number of bytes of memory used to maintain the primary surface in memory added to the physical address of the primary surface.

Once the physical address of the primary surface is known, the size of the primary surface as represented in video memory can be determined.

For example, the system looks in the CRs for the resolution of the screen, 800 by 600, in terms of number of bits per pixel, or bytes per pixel. Then any data stored in the CR representing any horizontal stride is included. This is the true scan line length.

Next, the physical address of the allocated secondary surface is derived from its linear address. In the case where the allocated secondary surface is, in fact, allocated in the memory space contiguous to the primary surface (the value of the secondary surface physical address is equal to the value of the primary surface physical address plus the size of the primary), the secondary surface is determined to be the location in memory for the overscan display.

If, however, the above is not true and the secondary surface is not contiguous to the primary surface, another approach mechanism is required. For example, a mechanism that "frees" memory from the video device driver to gain contiguous memory by effectively modifying or moving video device driver data may be used. This mechanism may use an interrupt routine to move the driver data transparently.

For example, if the program can identify the Interrupt Descriptor Table (IDT) from the Intel 80386 (or greater and compatible) processors, the program can use the Debug Registers (DRs) to move the driver data found between the primary and secondary display surfaces to a location further down the video memory, making the contiguous memory space available to the program.

The IDT associates each interrupt with a descriptor for the instructions that service the associated event. For example, when a software interrupt (INT 3) is generated (and interrupts are enabled), the Intel processor will suspend what it was currently doing, look up in the IDT for the appropriate entry (or interrupt vector) for the address of the code to execute to service this interrupt. The code is known as the Interrupt Service Routine (ISR). It will start executing the ISR. When a Return From Interrupt instruction (IRET) is executed by the ISR, the processor will resume what is was doing prior to the interrupt.

Intel 80386 microprocessors (or greater and compatible) provide a set of system registers that are normally used for debugging purposes. These are technically referred to as the Debug Registers (DRs). The DRs allow control over execution of code as well as access over data. The DRs are used in conjunction with exception code. There are four addresses registers (i.e., Four different locations of code and/or data) (DR0, DR1, DR2, and DR3).

The controlling register (DR7) can be programmed to selectively enable the address registers. In addition, DR7 is used to control the type of access to a memory location that will generate an interrupt. For example, an exception can be raised for reading and or writing a specific memory location or executing a memory location (i.e., Code execution).

Finally, the status register (DR6) is used to detect and determine the debug exception, (i.e., which address register generated the exception). When enabled and the data criterion is met, the x86 processor generates an Interrupt 1 (INT 1).

One example implementation of the alternate display content controller preferably first sets up the IDT to point a new ISR to process INT 1 interrupts. Next, the address of the code to be hooked (or the memory location of data) is programmed into one of the address registers and the appropriate bits within the control register are set. When the x86 processor executes this instruction (or touches the memory location of data), the processor generates an INT 1. The processor will then invoke the Interrupt 1ISR (as described above.) At this point, the ISR can do almost any kind of processor, code or data manipulation. When complete, the ISR executes an IRET instruction and the processor starts execution after the point of the INT 1 occurrence. The interrupt code has no knowledge of the interruption. This mechanism is used in the example implementation to move the memory address for the video cache and the hardware cursor.

To summarize, the first mechanism for determining whether or not overscan is supported determines how much physical area to allocate for the desktop, allowing adjacent area for parallel GUI secondary space beyond that to display in the overscan area. The newly allocated area will be the very first block of memory available. If this block immediately follows the primary surface, the physical address will correspond to the value associated with the physical address of the primary surface, plus the size of the primary surface. If that is true, the memory blocks are contiguous, this VGA-generic mechanism can be used to proceed with overscan mode, and the program returns true in step 104 of FIG. 7.

If this first, VGA-generic mechanism cannot be used, the video card and driver name and version information retrieved from the hardware registry or BIOS, as described earlier, is used in conjunction with a look-up table to determine the best alternatives among the remaining mechanisms. The table includes a set of standards keyed to the list of driver names found in the hardware registry. A class object specific to the video chipset is instantiated based, directly or indirectly, on the VGA-generic object.

If the hardware look up does not result in a reliable match, a reliability, or confidence, fudge factor may be used. For example, if the hardware look up determines that an XYZ-brand device of some kind is being used, but the particular XYZ device named is not found in the look up table, a generic model from that chipset manufacturer many often be usable. If no information on the video card is available, the program returns false in step 104 of FIG. 7 and will not proceed in overscan mode.

The next alternative mechanism for determining overscan mode support uses surface overlays. The first step to this approach is to determine if the system will support surface overlays. A call is made to the video driver to determine what features are supported and what other factors are required. If surface overlays are supported, for example, there may be a scaling factor required.

For example, a particular video card in a given machine, using 2 megabytes of video RAM, might support unscaled surface overlays at 1024×768 at 8 bits per pixel, but not at 1024×768 at 16 bits per pixel because the bandwidth of the video card or the speed of the card, coupled with the relatively small amount of video memory would not be sufficient to draw a full width overlay. It is often horizontal scaling that is at issue, preventing the driver from drawing a full width overlay. An overlay is literally an image that is drawn on top of the primary surface. It is not a secondary surface, which is described above. Typically, the system sends its signal from the video driver to the hardware which in turn merges the two signals together, overlaying the second signal on top of the first.

If a system cannot support unscaled overlays, perhaps because of bandwidth issues or memory issues, this mechanism is not desirable. It is not rejected, but becomes a lower priority alternative. For example, if the scaling factor is below 0.1, then the normal bar can be drawn and it will be clipped closer to the edge. If the scaling factor is more than 10%, another approach mechanism is required In the next set of alternative mechanisms, a secondary surface is allocated sufficient in size to encompass the normal desktop display area plus the overscan area to be used for display of the overscan bar or bars. Using these mechanisms, the allocated secondary surface does not have to be located contiguous in memory to the primary surface. However, these approaches use more video memory than the others.

The first step is to allocate a secondary surface sufficient in size to contain the video display (the primary surface) plus the overscan area to be used. If the allocation fails, that means that there is not enough video memory to accomplish the task and this set of mechanisms is skipped and the next alternative tried. After the new block of memory is allocated, a timer of very small granularity is used to execute a simple memory copy of the contents of the primary surface onto the appropriate location of this secondary surface. The timer executes the copy at approximately 85 times per second.

Another mechanism for determining overscan mode support is a variant that uses the system page tables to find addresses that correspond to the graphical display interface of the native operating system, such as Windows' GDI. One skilled in the art will recognize that similar methods can be used in systems with other graphical display interfaces to video device drivers. The system page table mechanism queries the system page tables to determine the current GDI surface address, that is, the physical address in the page table for the primary surface. A secondary surface is then created large enough to hold all of what is in the video memory plus the memory required for the overscan area to be displayed. This surface address is then pushed into the system page table and asserted as the GDI surface address.

Thereafter, when GDI reads from or writes to the primary surface through the driver, it actually reads from or writes to a location within the new, larger surface. The program can, subsequently, modify the area of the surface not addressed by GDI. The original primary surface can be de-allocated and the memory usage reclaimed. This mechanism, being more memory-efficient than the previously described mechanism, is the preferred alternative. But this mechanism, modifying the page tables, will not work correctly on a chipset that includes a coprocessor device. If the initial device query reveals that the device does include a coprocessor, this variant mechanism will not be attempted.

Other variations of the above-described mechanisms for determining overscan mode support are handled by derived class objects. For example, the VGA-generic mechanisms may vary when the video card requires more than ten bits to represent the video resolution in the CR. Some instances may require 11 bits. Such registers typically do not use contiguous bytes, but use extension bits to designate the address information for the higher order bits. In this example, the eleventh bit is usually specified in an extended CR register and the extended CR registers are usually chip specific.

Similarly, a variation of the surface overlay mechanism includes a scaling factor, as described above. This alternative is handled in specific implementations through derived class objects and may be the preferred solution in certain situations.

If any of the above-described mechanisms used to determine if overscan mode is supported and subsequently to initialize overscan mode returns a failure, another mode, such as "emulation" mode or "windowed" mode may be used instead.

If the program is to proceed in "overscan" mode, the Controller Registers, or CRs, must first be unlocked, as indicated in Unlock CRTC registers, step 108 in FIG. 7, to make them writeable. The controller registers 6H, 16H, 11H, 10H, 12H and 15H as shown in FIG. 4 and detailed in Table 3, may be accessed through standard input/output ports, using standard inp/outp functions. They are unlocked by clearing bit 7 in controller register 11H.

Addressing of video memory, step 112, is accomplished through one of several means. One is to use the standard VGA 64 Kb "hardware window", moving it along the video memory buffer 66B (FIG. 4) in 64 Kb increments as necessary. One example method is to enable linear addressing by querying the video chipset for the linear window position address, step 138 of FIG. 11. This 32-bit offset in memory allows the program to map the linear memory. to a physical address, steps 140 and 142 of FIG. 11, that can be manipulated programmatically.

Figure 9:
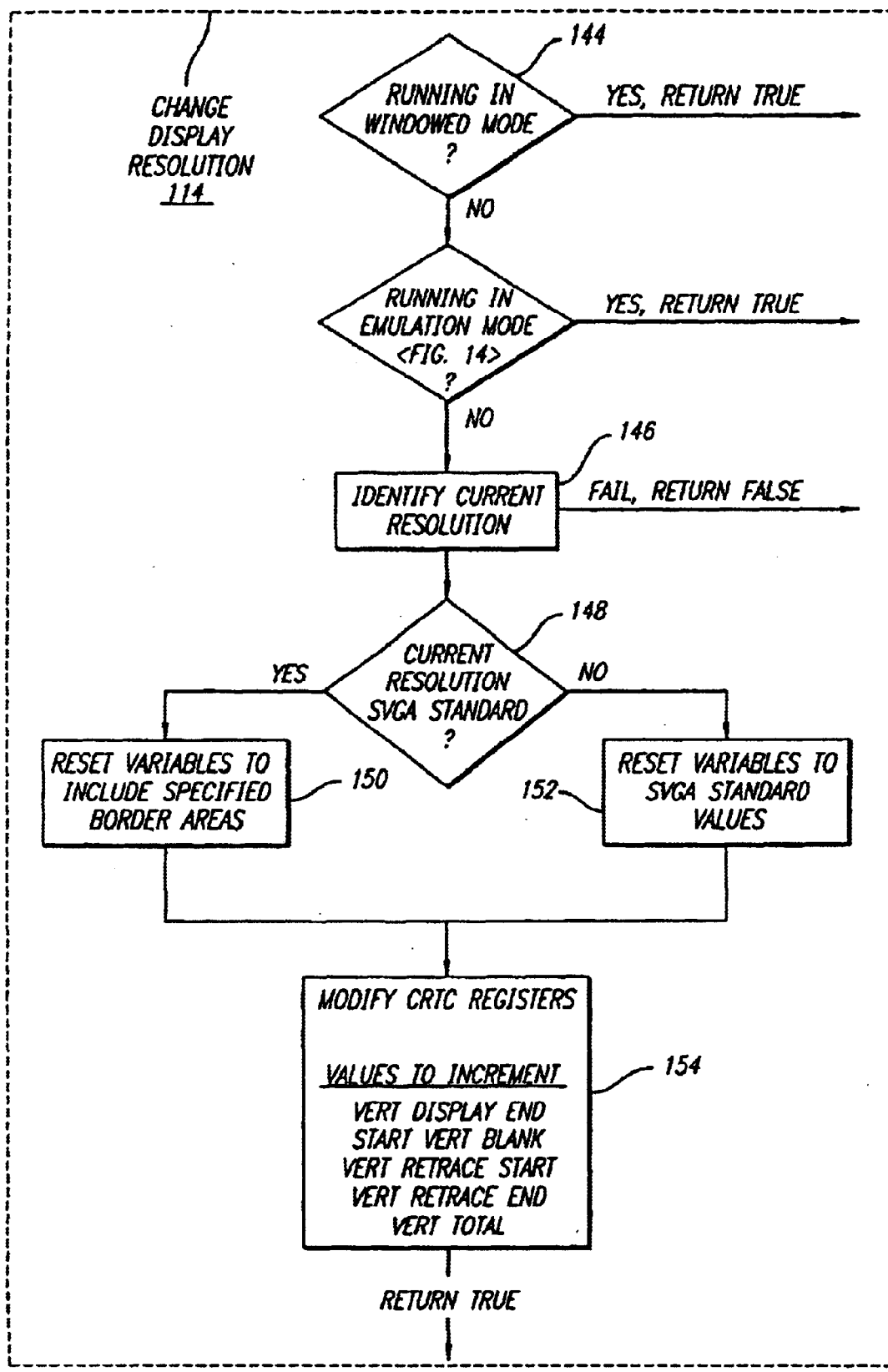
FIG. 9 is a flow diagram of the sub-steps of changing the display resolution step 114 of FIG. 7.

At this point the program can modify the size of the display, step 114 of FIG. 7 to include the border areas. Changing the display resolution to modify the size of the display is shown in detail in FIG. 9. In FIG. 9, the routine first checks to determine whether or not the system is running in "emulation" mode, step 144, and, if so, returns true. If not, it then determines whether to reset all registers and values to their original state, effectively returning the display to its original appearance, steps 148–154. The determination is based upon a number of parameters, such as whether the current resolution, step 146, reflects a standard value or previous programmatic manipulation, step 148. If a standard resolution is already set, the variables are reset to include the specified border areas, step 150. If not, the registers are reset to standard values. In both cases the CR registers are adjusted, step 154, to modify the scanned and blanked areas of the display. If the top or side areas are modified, existing video memory is moved accordingly in step 162 of FIG. 10.

If any of the foregoing routines returns a failure, the program may proceed to run in "emulation" mode, step 113 of FIG. 7, if possible, or in windowed mode, step 116 of FIG. 7.

Overscan mode, in the present invention, can be viewed as techniques for adding a secondary GUI by reconfiguring the actual display mode to add a modified, non-standard GUI mode in which the standard display size or resolution has been adjusted to include a secondary display in addition to the primary display. For example, a standard 640×480 display is modified in accordance with techniques of the present invention to become a larger display, one section of which corresponds to the original 640×480 display while another section may correspond to a 640×25 secondary GUI display.

In another embodiment of the present invention system, resources are allocated for a secondary GUI by fooling the video driver into going to larger resolution. This technique guarantees that enough video memory is allocated and unused, since the video driver allocates system resources according to the resolution that the video driver believes it will be operating in. To operate one or more secondary user interfaces in one or more areas of the screen it is necessary to have the memory within video memory or the frame buffer that is associated with the display location that is contiguously below the primary surface be free and available. By utilizing a series of small routines specific to hardware known to have system resource allocation problems for a secondary user interface, the program may execute such routine whenever resolutions will be switched, initializing the chipset pertinent to that particular routine. If the program finds a routine pertinent to the current particular chipset it will be launched. The routine initializes itself, performs the necessary changes to the driver's video resolution tables, forces a reenable, and sufficient space is subsequently available for one or more secondary user interfaces.

When reenabled, the video driver allocates video memory as needed for the primary display according to the data on the video resolution tables. Therefore, the modified values result in a larger allocation. Once the video driver has allocated memory necessary for the primary surface, the driver will allow no outside modification of the allocated memory. Thus by fooling the driver into believing that it needs to allocate sufficient memory for a resolution exactly x bytes larger than the current resolution where x is the size of one or more secondary user interfaces, the program can be sure that no internal or external use of the allocated memory space can conflict with the secondary user interface.

Fooling the driver into allocating the additional resources can also be done by modifying each instance of the video driver's advertised video mode tables and thus creating a screen size larger than the primary user interface screen size. This technique eliminates the need to prevent the driver from actually shifting into the specified larger resolution and handing the primary user interface a larger display surface resolution. When the video driver validates the new resolution, it will check against a hardware mode table, which has not been updated with the new resolution. (The "hardware mode table," a variant of the aforementioned video resolution tables, is not advertised and not accessible.) This validation, thus, will always fail and the video driver will refuse to shift into that resolution. But, because this technique modified the advertised video mode (resolution) tables early enough in the driver's process, the amount of allocated memory was modified, and memory addresses were set before the failure occurred during the validation process. Subsequently when the CRTCs are modified, in step 114, the driver has already reserved sufficient memory for one or more secondary user interfaces, which is not available to any other process or purpose.

In yet another embodiment of the present invention, an enveloping driver is installed to sit above the actual (primary) video driver and shims itself in between the hardware abstraction layer and the primary video driver in order to be able to handle all calls to the primary driver. This technique modifies the primary driver and its tables in a much more generic fashion rather than in a chipset specific fashion. The enveloping driver shims into the primary video driver, transparently handling calls back and forth to the primary video driver. The enveloping driver finds the video resolution tables in the primary video driver, which may be in a number of locations within the driver. The enveloping driver modifies the tables (for example, increasing 800×600 to 800×625). A 1024×768 table entry may become, for example, an 1024×800 entry.

Like the previously described technique for fooling the video driver, the primary video driver cannot validate the new resolution and therefore cannot actually change the display resolution setting. As a result, the primary video driver has allocated memory, allocated the cache space, determined memory addresses and moved cache and off-screen buffers as necessary, but is unable to use all of the space allocated, or draw into that space.

2.2 Techniques for Sharing the Display Area (Emulation Mode)

Emulation mode uses a "hooking" mechanism, as shown in FIG. 14, to use and reallocate display areas and driver resources. After the video device driver is identified through the hardware registry or the BIOS, e.g., as described above, certain programming interface entry points into the driver are hooked, such as in step 117, to control parameters passed to and from the driver. When the operating system's graphical device interface, for example GDI, calls those entry points into the video device driver, the alternate display content controller modifies the parameters being passed to the driver, and/or modifies the values being returned from the driver, thereby controlling the attributes of the display communicated back to the native operating system's graphical device interface. The program thus "hooks" (or intercepts) calls to the video device driver to and from the graphical device interface.

For example, by hooking the "ReEnable" function in the display driver, at step 117, the program can allocate screen area in different ways in step 119:

(1) In step-up mode, step 121, by intercepting a resolution change request and identifying the next-higher supported screen resolution and passing that higher resolution to the video device driver and when the driver acknowledges the change, intercepting the returned value, which would reflect the new resolution, and actually returning the original requested resolution instead. For example, when GDI requests a change from 640×480 resolution to 800×600 resolution; the program intercepts the request and modifies it to change the video device driver to the next supported resolution higher than 800×600, say 1024×768. The driver will change the screen resolution to 1024×768 and return that new resolution. The program intercepts the return and instead passes the original request, 800×600, to GDI. The video device driver has allocated and displays a 1024×768 area of memory. GDI and the native OS will display the desktop in an 800×600 area of the display, leaving areas on the right and bottom edges of the screen available to the program.

(2) In share mode, step 123, the program intercepts only the return from the video device driver and modifies the value to change the graphical device interface's understanding of the actual screen resolution. For example, when GDI requests a change from 800×600 resolution to 1024×768 resolution, the program intercepts the returned acknowledgment, subtracting a predetermined amount, for example, 32, before passing the return on to GDI. The video device driver has allocated and displays a 1024×768 area of memory. GDI will display the desktop in an 1024×736 area of the display, leaving an area on the bottom edge of the screen available to the program.

(3) In step-down mode, step 125, the program performs the reverse of step-up mode: that is, the program intercepts a resolution change request; requests the resolution change, but returns the next lower resolution to the graphical device interface. For example, when GDI requests a change from 640×480 resolution to 800×600 resolution; the program intercepts the request and modifies it to change the video device driver to 800×600. The video device driver will change the screen resolution to 800×600 and returns that new resolution. The program intercepts the return and instead passes a next lower resolution, 640×480 (denying the request), to GDI. The driver has allocated and displays a 800×600 area of memory. GDI and the native OS will display the desktop in an 640×480 area of that display, leaving areas on the right and bottom edges of the screen available to the overscan program.

An alternative to these hooking mechanisms would hook all of the necessary video device driver functions to modify the X,Y offsets used for specific GDI functions. Effectively, this moves the GDI display area within the larger screen display area. This mechanism allows the creation of emulation mode space on the top and left edges by sharing some or all of the space initially created for the bottom and/or right edges.

If the video device driver cannot be hooked, as described above, "emulation" mode cannot be supported and the program will proceed to run in "windowed" mode as described with reference to step 116 of FIG. 7. Windowed mode will use established API routines to the native operating system GUI to run as an "application toolbar" within the standard window display area. Running as a standard application enables the program to take advantage of mechanisms available to all applications on the native OS, such as window creation, docking toolbar interfaces, etc., and allows the program to run under standard conditions.

In summary, the alternate display content controller determines how to increase the display area to utilize a complementary GUI, either by increasing the addressable area of the display (e.g., using the overscan area or by using emulation mode and increasing the resolution) or by decreasing the portion of the display usable by the primary GUI, such that remaining display area can be used by one or more complementary GUIs. If no overscan techniques are usable in a particular video display scenerio, then the alternate display content controller determines whether an "emulation" mode can be used, which shares the resolution of the video display between the primary and any secondary (complementary) GUIs.

3. Rendering Images to the Modified Display Area

Figure 10:
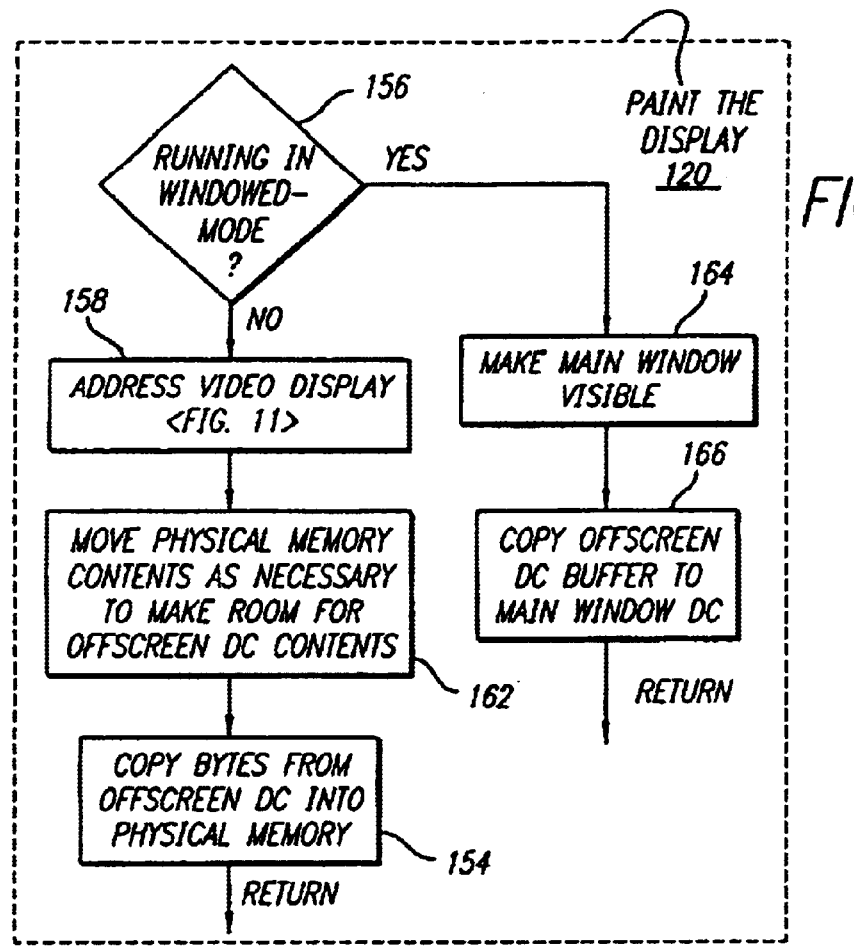
FIG. 10 is a flow diagram of the sub-steps in the Paint the Display step 120 of FIG. 7.

Phase 2 of the example embodiments of the present invention begins by painting the new images into an off-screen buffer, step 118, as is commonly used in the art, and making the contents visible, step 120, as described with respect to FIG. 10.

After determining and initializing the program mode, the program can display data by any of these techniques, as appropriate:

(1) Using standard API calls to render the data to an off-screen buffer, as described in the next section, and then hooking the "BitBlt" function entry point into the display driver in order to modify the offset and size parameters, the program subsequently redirect the Bit-Blt to the area outside of that which the API believes is onscreen.

Figure 11:
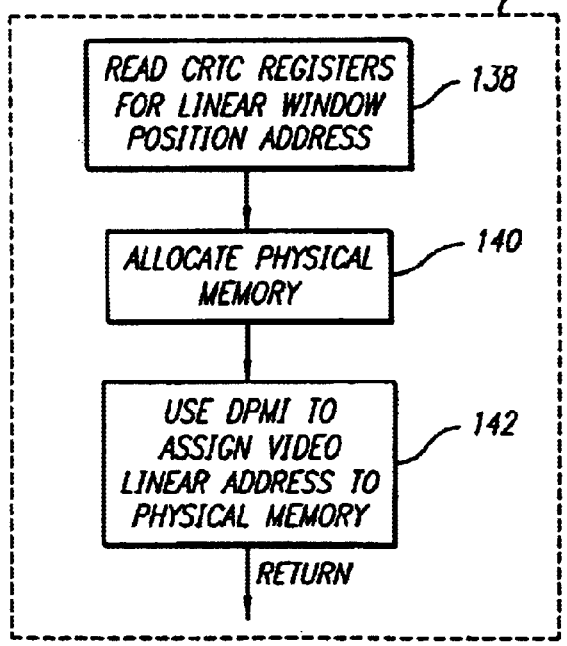
FIG. 11 is a flow diagram of the sub-steps of Enable Linear Addressing step 112 of FIG. 7.
Figure 12:
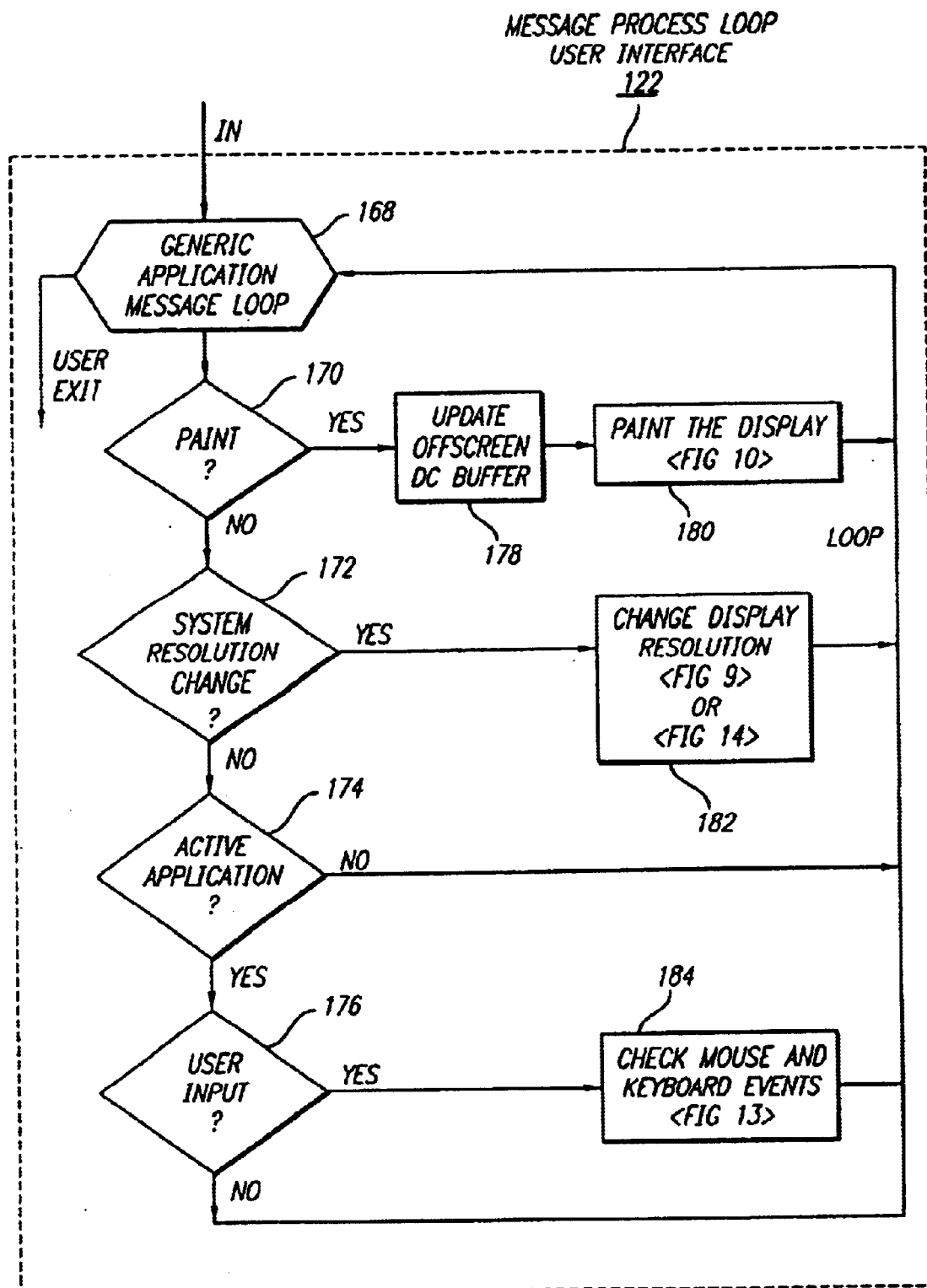
FIG. 12 is a flow diagram of the sub-steps of the Process Message Loop of FIG. 7.

(2) Using mechanisms of primary and secondary surface addresses, described above, the program determines the linear addresses for the off-desktop memory location(s) left available to it, and can render directly to those memory locations as shown in steps 158 and 142 of FIG. 11 and step 154 of FIG. 10.

(3) Using video device driver escapes, a standard mechanism within the domain of device driver interfaces, the program can blit directly to the video buffer.

(4) If the program is in "windowed" mode, step 156, the off-screen buffer is painted into the standard window client space, step 166, and made visible, step 164, using generic windowing-system routines.

4. Event Handling in Conjunction With the Modified Video Display Area

A preferred embodiment of the program includes a standard application message loop, step 122, which processes system and user events. An example of a minimum functionality process loop is in FIG. 12. Here the alternate display content controller handles a minimal set of system events, such as painting requests, step 170, system resolution changes, step 172, and activation/deactivation, step 174. Here, too, is where user events, such as key or mouse events, may be handled, step 184, detailed in FIG. 13. System paint messages are handled by painting as appropriate into the off-screen buffer, step 178, and painting the window or display buffer, step 180, as appropriate, as described earlier in FIG. 10. System resolution messages are received whenever the system or user changes the screen or color resolution. The program resets all registers and/or hooks, as approriate for the current modes, to the correct new values, then changes the display resolution, step 182, as earlier described in FIG. 9, to reflect the new resolution modified. User messages can be ignored when the program is not the active application.

Figure 13:
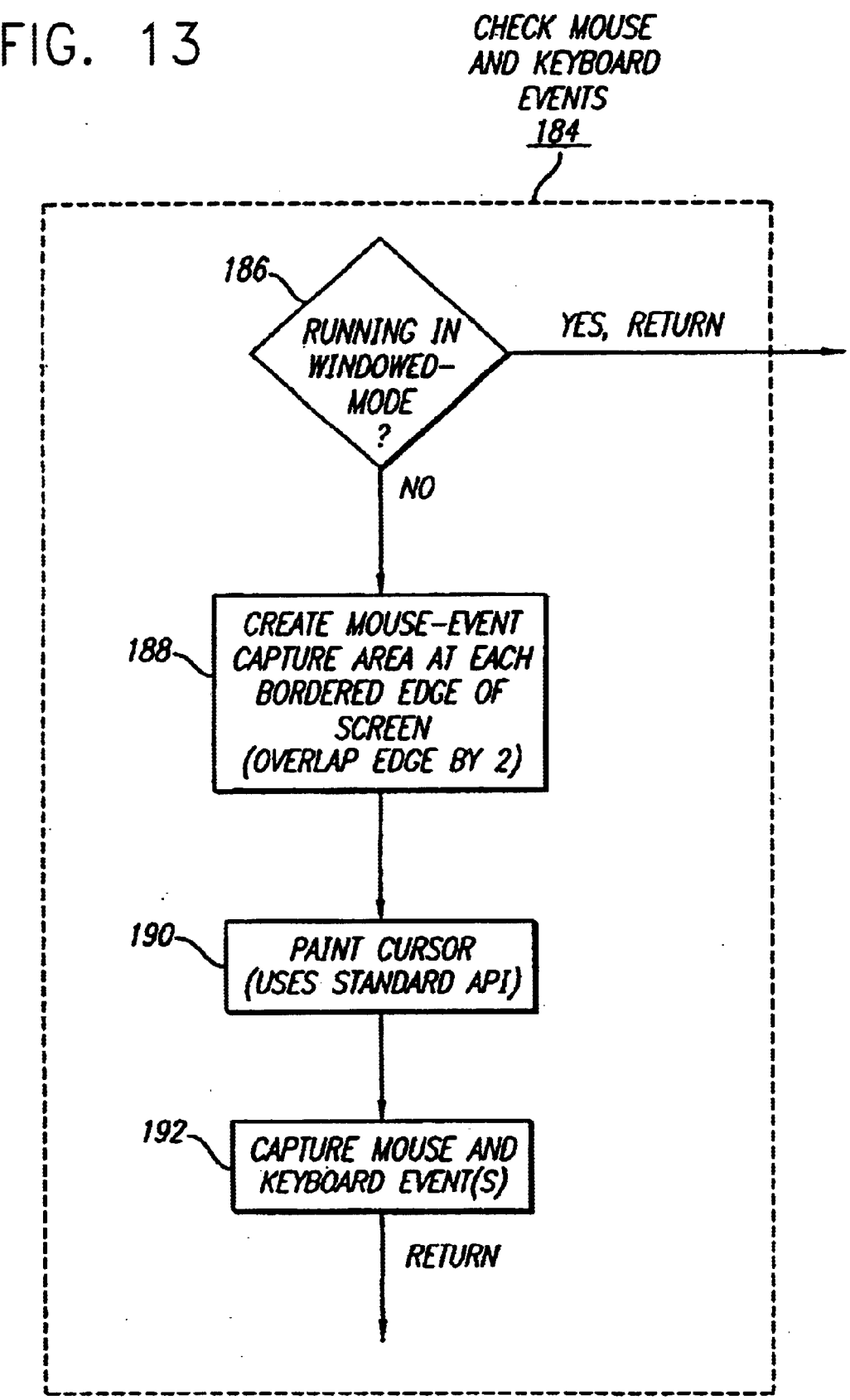
FIG. 13 is a flow diagram of the sub-steps of the Check Mouse and Keyboard Events step 184 in FIG. 12.

FIG. 13 describes a method of implementing user-input events. In this embodiment, there are three alternative mechanisms used to implement cursor or mouse support so that the user has a pointing device input tool within the alternate display content controller area user interface.

According to one preferred mechanism, GDI's "cliprect" is modified to encompass the bar's display area. That keeps the operating system from clipping the cursor as it moves into the overscan area. This change doesn't necessarily make the cursor visible or provide event feedback to the application, but is the first step.

Some current Windows applications continually reset the cliprect. It is a standard programming procedure to reset the cliprect after use or loss of input focus. Some applications use the cliprect to constrain the mouse to a specific area as may be required by the active application. Whenever the program receives the input focus it reasserts the cliprect, making it large enough for the mouse to travel down into the program display space.

Once the cliprect has been expanded, the mouse can generate messages to the operating system reflecting motion within the expansion area. GDI does not draw the cursor outside what it understands to be its resolution, however, and does not pass "out-of-bounds" event messages on to an application. The preferred program uses a VxD device driver, and related callback functions, to make hardware driver calls at ring zero to monitor the actual physical deltas, or changes, in the mouse position and state. Every mouse position or state change is returned as an event to the program which can graphically represent the position within the display space.

An alternative mechanism avoids the need to expand the cliprect in order to avoid conflict with a class of device drivers that use the cliprect to facilitate virtual display panning. Querying the mouse input device directly the program can determine "delta's", changes in position and state. Whenever the cursor touches the very last row or column of pixels on the standard display, it is constrained there by setting the cliprect to a rectangle comprised of only that last row or column. A "virtual" cursor position is derived from the deltas available from the input device. The actual cursor is hidden and a virtual cursor representation is explicitly displayed at the virtual coordinates to provide accurate feedback to the user. If the virtual coordinates move back onto the desktop from the overscan area, the cliprect is cleared, the virtual representation removed, and the actual cursor restored onto the screen.

A third alternative mechanism creates a transparent window that overlaps the actual Windows desktop display area by a predefined number of pixels, for example, two or four pixels. If the mouse enters that small, transparent area, the program hides the cursor. A cursor image is then displayed within the overscan bar area, at the same X-coordinate but at a Y-coordinate correspondingly offset into the overscan area. If a two-pixel overlap area is used, this method uses a granularity of two. Accordingly, this API-only approach provides only limited vertical granularity. This alternative mechanism assures that all implementations will have some degree of mouse-input support, even when cliprect and input device driver solutions fail.

Similarly, the keyboard input can be trapped whenever the mouse is determined to be within the program's display space. Using standard hooking mechanisms available to the native OS and graphical user interface, or alternatively a hook directly unto the keyboard driver, key events can be trapped and processed whenever the program determines to do so (e.g., when the user moves the mouse onto the program display space). When the key input is trapped, other applications can be prevented from viewing keyboard events. If the keyboard driver itself is hooked, even GDI does not get the key input events.

FIG. 7 also describes the cleanup mechanisms executed when the program is closed, step 124. The display is reset to the original resolution, step 126, and the CR registers are reset to their original values, step 128, and locked, step 130.

5. Rendering Into and Accessing the Modified Display Area

Various techniques can be used by applications, in addition or alternatively, as appropriate, to render into and access the modified display area once it has been created. As previously discussed, in one embodiment, an API to the functionality of the alternate display content controller is provided to applications to enable them to use graphics primitives that fully function within a display area that potentially extends past the display area originally allocated to the native desktop. Several embodiments of these API are provided to support applications in differing system environments and to achieve different functions. These embodiments allow communications with the modified display area from an application to be as transparent as possible, so that the application does not need to know whether it is communicating to an area allocated to the desktop or to an area outside of that allocated to the desktop.

Figure 37:
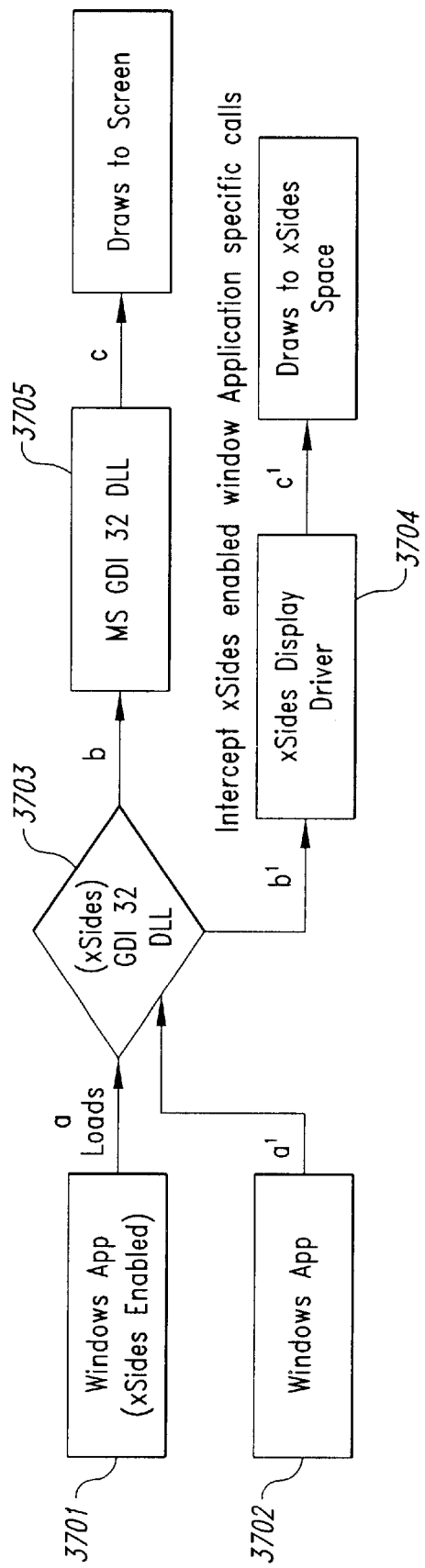
FIG. 37 is an example block diagram of applications using techniques that intercept native graphics interface library calls.

5.1 Techniques for Rendering to a Modified Display in Windows™ Like Environments In one embodiment, the alternative display content controller provides an API that intercepts and routes all of the calls to a graphics device interface (GDI) invoked by an application to communicate with the display. For example, in the Windows™ environment, the alternate display content controller intercepts all function calls to the GDI application programming interface (API). The controller determines, based upon the coordinates of the window being written to, whether the call should be forwarded to a display driver that can output to an overscan area (a complementary GUI display driver), or whether the call should be forwarded to the native graphics device interface. One skilled in the art will recognize that other combinations are possible, such as part processing of the request by the complementary GUI display driver before forwarding the request to the native graphics display driver FIG. 37 is an example block diagram of applications using techniques that intercept native graphics interface library calls. In FIG. 37, applications 3701 and 3702 are shown making a call to a function of the API of a graphics device interface after loading the GDI code (GDI 32.DLL). Application 3701 is an application which uses the alternate display content controller API (referred to here, for example, as the "xSides" API) to render using techniques of a complementary GUI into the extended display area (e.g., the display area outside of the native desktop rectangle). Application 3702 is a standard Windows™ application. The alternate display content controller 3703 intercepts the call, and determines whether to forward it to a display driver enabled with the techniques of the present invention 3704, or (/and) to a native display driver (e.g., Windows™ GDI) 3705. One skilled in the art will recognize that this interception technique will work with other graphics device interfaces that are loaded dynamically and that define a documented API, for example, the USER 32.DLL of other Windows™ environments.

Using GDI, this interception technique is accomplished by fooling applications into loading a complementary GUI-enabled graphics device interface library (e.g., xSides GDI) instead of the native operating system graphics device interface library (e.g., GDI). Specifically, upon system initialization, the alternate display content controller renames the native graphics device interface library (e.g., "MS GDI 32.DLL") and names its own graphics device interface library (the overscan-enabled GDI) into the name of the native graphics device interface library (e.g., xSides GDI is renamed "GDI.DLL"). When the alternate display content controller's library loads and initializes, it loads the native graphics device interface library, thereby linking directly into the native GUI capabilities. Thereafter, applications transparently call the alternate display content controller, even if they are only invoking routines of the native graphics interface device library.

When an application makes a function call to the new graphics library (e.g., the GDI.DLL shown as 3703), the library needs to determine whether to invoke the API that is extended display area-enabled (xGDI) or to invoke the native GDI. One skilled in the art will recognize that there are various ways to make this determination. Using one method, at initialization, an application that uses xGDI registers itself by calling an initialization routine of xGDI, so the alternate display content controller knows which applications actually use the xGDI API. Therefore, xGDI knows when an application that is not xGDI-enabled (e.g., application 3702) is making a function call to the new graphics library, and the call can immediately be forwarded on to the native GDI (e.g., "MS GDI 32.DLL"). When, on the other hand, an application that is xGDI-enabled (e.g., application 3701) makes a function call to the new graphics library, the xGDI routines can determine whether the location referred to in the call (relative to where the pointer was located when the call was made) is within the native desktop rectangle or outside of it in the extended display area.

Using another method, the alternate display content controller may allow an application to write into the extended display area regardless of whether it has "registered" itself with xGDI. For example, an application such as a calculator may be initially launched in the native desktop area and then dragged using a mouse into the extended display area. In this case, the extended display area-enabled API can transparently translate the applications calls relative to new origin coordinates in order to render into the extended display area.

One technique for accomplishing this transparent translation is to intercept every call to the native GDI that causes a repaint or a refresh to occur, translate the coordinates and draw into offscreen memory, and then render the offscreen memory contents into the extended display area. One disadvantage of using this technique is that it consumes more memory and has a small performance hit during each paint/refresh (it draws twice for each call).

A second technique for accomplishing this transparent translation is to translate each native GDI function call to an extended display area-enabled function call and to then translate coordinates in each call. For example, the "CreateWindow" function call of GDI forwards to an "XCreateWindow" function call. One difficulty of using this technique is that the alternate display content controller becomes sensitive to modified versions of the native GDI.

5.2 Techniques to Prevent Obscuring Data

In one embodiment, techniques of the present invention provide a mechanism by which arbitrary rectangular regions of a native desktop display can be reserved for a specific application, allowing the creation and presentation of persistent images that cannot be obscured by any other application. These rectangular regions are called Pixel Masks, because they are masks on the pixels in the region. These techniques are provided via software tools and libraries and complementary documentation, which enable applications developers to build applications with persistent presence on the native desktop.

In an example embodiment implemented in the Windows™ environment, the Pixel Mask software is implemented using a variation of the display driver of the alternate display content controller Essentially, the display driver is augmented to provide a new feature, that of creating and defining Pixel Masks and authorizing sources. The display driver is augmented by inserting a filter layer between the native operating system's graphics device interface (e.g., Windows™ GDI) and the display driver.

Figure 32:
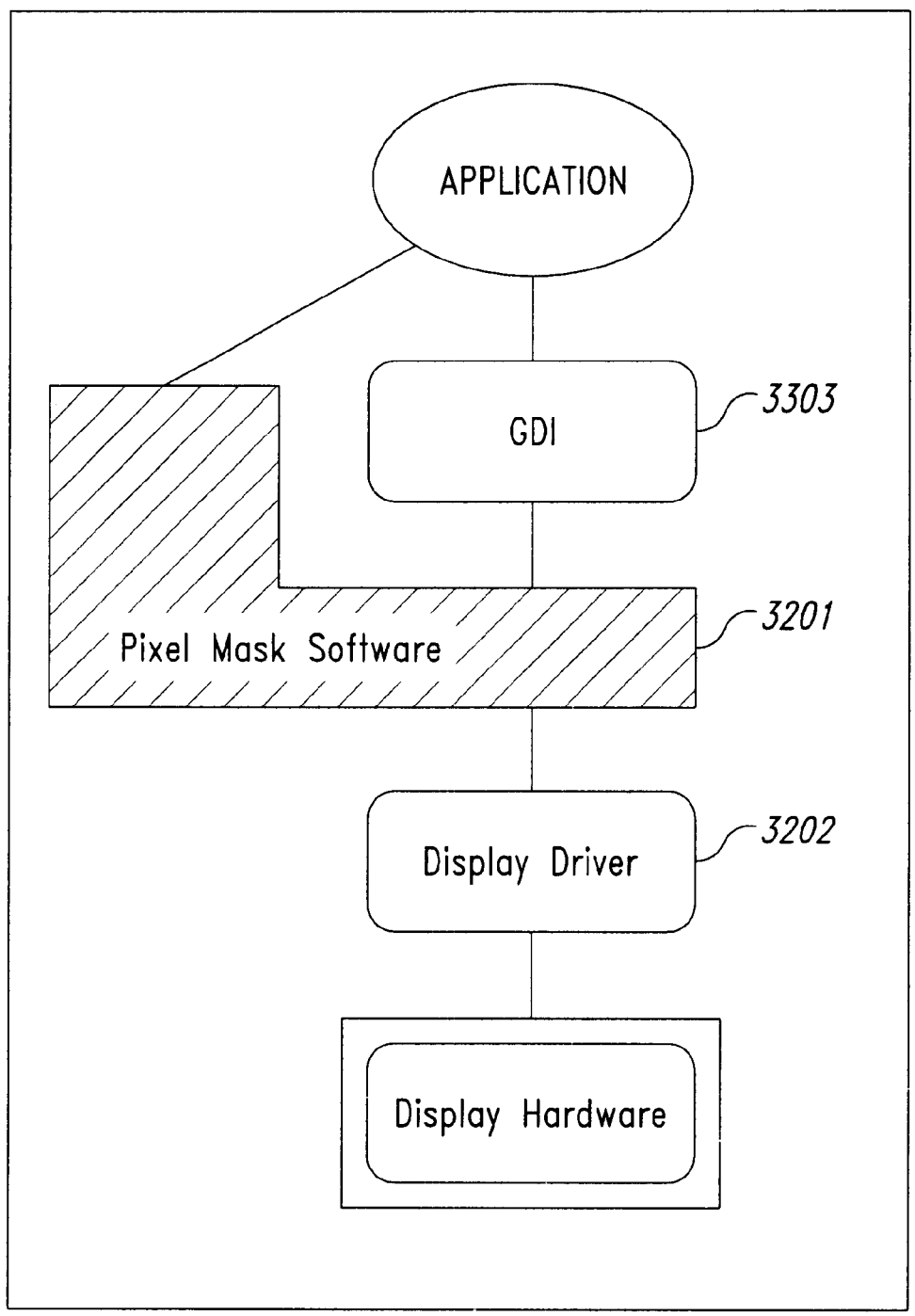
FIG. 32 is an example block diagram of an application using pixel mask technology in conjunction with an extended display area-enabled display driver.

FIG. 32 is an example block diagram of an application using pixel mask technology in conjunction with an extended display area-enabled display driver. In FIG. 32, the Pixel Mask software is shown residing between the enabled display driver 3202 and the native graphics device interface 3303.

There are two primary parts to the Pixel Mask software: an API that provides a programming interface to the application and a filter driver that intercepts calls from the graphics device interface to the display driver and provides the pixel mask functionality.

The Pixel Mask API provides a set of functions that allows the application program to create and define the Pixel Mask regions, and to identify the authorized bitmap that can be displayed in the Pixel Mask region.

The following functions are defined for the Pixel Mask API:

Pixelmask_Init initializes the Pixel Mask software. Resources are allocated and initialized, and the software is put into a known state.

Pixelmask_Uninit de-initializes the Pixel Mask software. Resources are freed, and the software in put into an undefined state.

Pixelmask_CreateMask creates and defines a pixel mask.

Pixelmask_DeleteMask deletes a previously created pixel mask.

Pixelmask_ActivateMask activates an existing pixel mask.

Pixelmask_DeactivateMask deactivates an existing pixel mask. Once deactivated, the display space is no longer reserved.

Pixelmask_IdentifySource identifies the display source (for example, a bitmap) that has access to an existing pixel mask. All other attempts to display to the display space within the pixel mask will be clipped at the pixel mask boundaries.

The Pixel Mask Display filter augments the functionality of the display driver by allowing the creation of pixel masks and the identification of authorized display sources that can be displayed in the pixel masks. The display filter will clip all other data that is output into the region covered by the pixel masks. The display filter intercepts calls from the native graphics device interface to the display driver. It hooks in processing before calling the display driver and additional processing after the thread of execution returns from the display driver.

For Windows™ 9x systems, the following display driver functions need to have pre- and post-processing added to support the pixel mask feature.

BitBIt
BitmapBits
DeviceBitmapBits
ExtTextOut
Output
Pixel
SaveScreenBitmap
ScanLr
SetDIBitsToDevice
StretchBlt
StretchDIBits
UpdateColors Each of these functions will be wrapped by an associated Pixel Mask software function that will, for non-authorized sources, check the specified destination against existing pixel masks, and, if there's an intersection, clip the source data so none is displayed in the region covered by the pixel mask. Authorized sources will be passed through to the display driver function to render data.

One skilled in the art will recognize that, in conjunction with using other software techniques that enable rendering to the extended display areas (areas outside of the native desktop display area), the pixel mask techniques can also provide persistent displays outside the desktop.

6. Additional/Alternative Embodiments

6.1 Additional Embodiments of Overscan Techniques for Modifying the Display Area to Support a Complementary GUI The following embodiments may be used to modify the size of the display area or the allocation of the display area in order to support a complementary user interface:

1. Utilizing the VESA BIOS Extensions (VBE) in place of the CRT Controller registers (FIG. 5) to determine and/or access the linear window position address, step 138, as necessary.

2. Utilizing the VESA BIOS Extensions (VBE) in place of the CRT Controller registers (FIG. 5) to increase the visible display area as drawn by the CRT.

3. Utilizing API's (application programming interfaces) 62 capable of direct driver and/or hardware manipulation, such as Microsoft's DirectX and/or DirectDraw, in place of the CRT Controller registers and/or direct access to the display buffer.

4. Utilizing API's (applications programming interfaces) 62, such as Microsoft's DirectX and/or DirectDraw, capable of direct driver and/or hardware manipulation, to create a second virtual display surface on the primary display with the same purpose, to display a separate and unobscured graphical user interface.

5. Utilizing modifications to the Shell or Shell tray window component of the operating system 63 in place of the CRT Controller registers and/or DirectX access to the display buffer.

6. Utilizing modifications to the Shell or Shell tray window component of the operating system 63 to create a second virtual display surface on the primary display with the same purpose, to display a separate and unobscured graphical user interface.

7. Building this functionality into the actual video drivers 64 and/or mini-drivers. Microsoft Windows provides support for virtual device drivers, VxDs, and/or System Services which could also directly interface with the hardware and drivers. These could also include an API to provide applications with an interface to the modified display.

8. Incorporating the same functionality, with or without the VGA registers, into the BIOS and providing an API to allow applications an interface to the modified display.

9. Incorporating the same functionality into hardware devices, such as monitor itself, with hardware and/or software interfaces to the CPU.

10. Incorporating the same functionality into overlay devices, either through the video device system or not, overlaying the display to provide applications with an interface to the display.

Embodiments of the present invention do not depend solely upon the ability to change the CRTCs to modify the visible display area. As described, additional mechanisms are provided that define other methods of creating and accessing visible areas of the screen that are outside the dimensions of the desktop accessed by the native operating system's user interface. Various other embodiments of the methods and systems of the present invention also will be apparent to one skilled in the art.

6.2 Using Alternate Display Content Controller to Drive the Native Desktop

Techniques of the present invention may be used to control the desktop e.g., Windows) to easily enable the desktop to operate in virtually any non-standard size limited only by the capability of the display hardware. This may be in combination with parallel graphical user interface displays or exclusively to maximize the primary operating system desktop display area. This may not require any modification to the operating system.

For example, the visual display area is conventionally defined by the values maintained in the CRTC registers on the chip and available to the driver. The normally displayed area is defined by VGA standards, and subsequently by SVGA standards, to be a preset number of modes, each mode including a particular display resolution which specifies the area of the display in which the desktop can be displayed.

The desktop of a typical native operating system, e.g., Windows, can only be displayed in this area because the operating system does not directly read/write the video memory, rather it uses programming interface calls to the video driver. The video driver simply reads/writes using an address that happens to be in video memory. So this mechanism needs to recognize the value (e.g., address) that the video card and driver assert is available for painting. This value is queried from the registers, modified by specific amounts to increase the display area, and rewritten to the card. In this manner, example embodiments cab change the attributes of writable and visible display area without informing the operating system's display interface of the change.

Embodiments of the present invention don't necessarily change the CRTCs to add just to the bottom. Preferably the top is also moved up a little. This keeps the displayed interfaces centered within the drivable display area. For example, rather than just add thirty-two scan lines to the bottom, the top of the display area is moved up by sixteen lines.

6.3 Additional Embodiments for Locating Parallel User Interfaces

One skilled in the art will recognize that any number of parallel Guls may be positioned in areas not normally considered the conventional overscan area. For example, a secondary GUI may be positioned in a small square exactly in the center of the normal display in order to provide a service required by the particular system and application. In fact, the techniques of reading and rewriting screen display information can be used to maintain the primary GUI information, or portions of it, in an additional memory and selectively on a timed, computed, interactive, or any other basis, replace a portion of the primary GUI with the secondary GUI such as a pop-up, window, or any other display space. One skilled in the art will recognize that the techniques discussed can be used to effectively position a secondary GUI anywhere on the display screen that is addressable by the alternate display content controller. The controller can also be used to control the relationship between the native (primary) GUI and any secondary GUIs in terms of what is displayed, in what location, at what time.

As a simple example, a security system may require the ability to display information to a user without regard to the status of the computer system and/or require the user to make a selection, such as call for help by clicking on "911?". Embodiments of the present invention could provide a video display buffer in which a portion of the primary GUI interface was continuously recorded and displayed in a secondary GUI for example in the center of the screen. Under non-emergency conditions, the secondary GUI would then be effectively invisible in that the user would not notice anything except the primary GUI.

Under the appropriate emergency conditions, an alarm monitor could cause the secondary GUI to present the "911?" to the user by overwriting the copy of the primary display stored in the secondary GUI memory. Alternatively, a database of photographs may be stored and one recalled in response to an incoming phone call in which caller ID identified a phone number associated with a database photo entry.

In general, embodiments of the present invention may provide one or more secondary user interfaces which may be useful whenever it is more convenient or desirable to control a portion of the total display, either outside the primary display in an unused area such as an overscan area or even in a portion of the primary GUI directly or by time division multiplexing, directly by communication with the video memory, or by bypassing at least a portion of the video memory to create a new video memory. In other words, methods and systems of the present invention may provide one or more secondary user interfaces outside of the control of the native system, such as the native operating system, which controls the primary GUI.

Additional user interfaces may be used for a variety of different purposes. For example, a secondary user interface may be used to provide simultaneous access to the Internet, full motion video, and a conference channel. A secondary user interface may be dedicated to a local network or multiple secondary user interfaces may provide simultaneous access and data for one or more networks to which a particular computer may be connected.

6.4 Alternative Embodiment Using a Universal Trapping Technique to Create and Manipulate a Modified Display In another aspect of the methods and systems of the present invention, a universal "trapping" technique is provided for modifying the display area and running applications in extended display areas (outside of the native desktop). The new method is "universal" in the sense that, unlike several of the other techniques, it is not sensitive to the particular video card and driver installed in the system. These techniques can be used as an alternative to emulation mode. In essence, the trapping technique operates by shrinking the display area (rectangle) allocated to the native desktop and then dynamically swapping the old size and the new size in response to certain events in the system.

Figure 33:
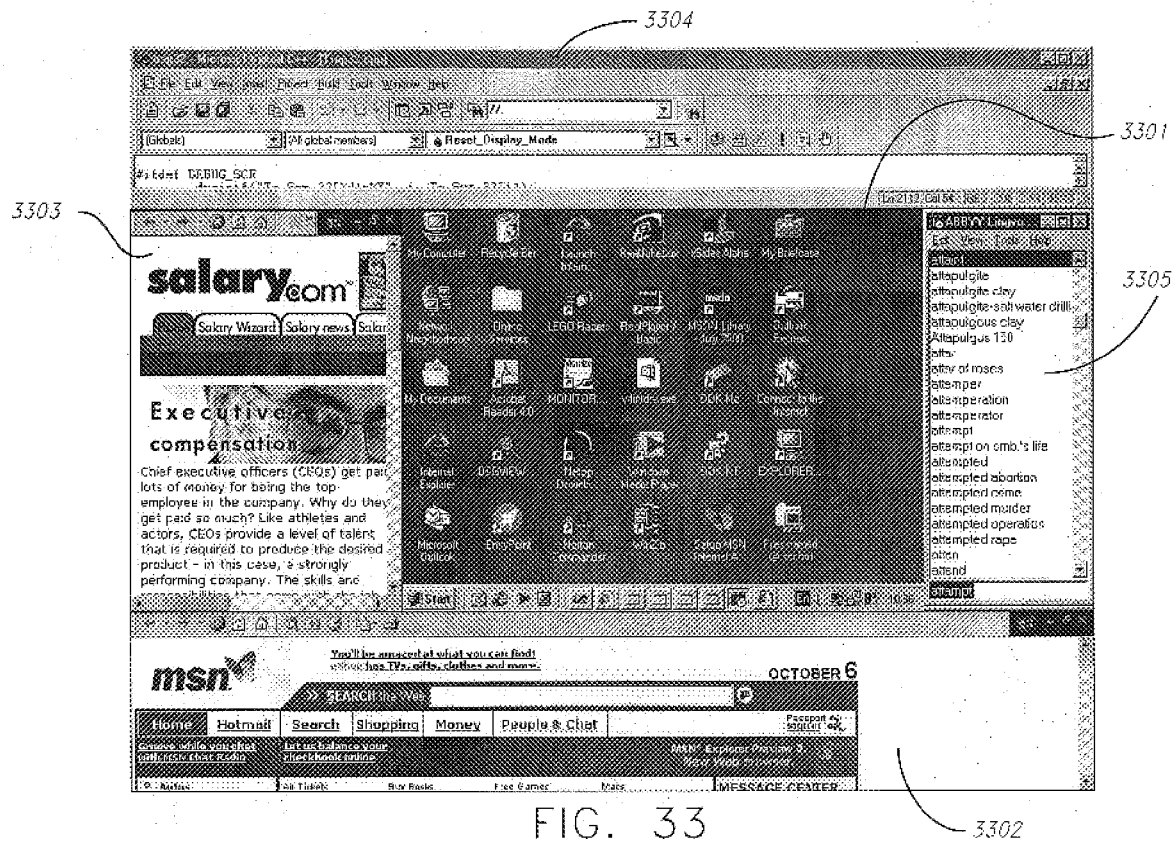
FIG. 33 is an example screen display of application windows that are displayed using a universal trapping approach for modifying the display area and rendering outside of the native desktop.

FIG. 33 is an example screen display of application windows that are displayed using a universal trapping approach for modifying the display area and rendering outside of the native desktop. The native desktop (with a collection of icons displayed) is shown in display area 3301. Parallel GUIs are shows in display areas 3302–3305, here shown as surrounding the native desktop 3301. One skilled in the art will recognize that any combination of these parallel GUIs may exist, on one or more sides of the native desktop, and that several parallel GUIs may coexist on a side.

An example embodiment of the trapping technology shrinks the desktop rectangle, and then dynamically swaps the old size and the new size in response to certain events. For example, whenever the mouse moves, the desktop rectangle must be temporarily restored to full screen, in order for the cursor have full range of motion and move into the areas outside the new size (smaller) inner desktop.

In order for the desktop to be resized on the fly, the program must first determine where in memory the desktop rectangle is stored. Experimentation has revealed that Windows™ maintains this information in several locations. These locations are undocumented in both 9x and NT. As discussed below, one embodiment determines these locations by hooking particular function calls to the native windowing system. There are numerous events that must be intercepted in order to maintain the "illusion" of a smaller desktop. These events are enumerated as follows:

32-bit Ring-3 Hooks:

1. The WNDPROC (window main procedure) of each outside window must be hooked. The hook procedure checks for messages related to size and position of the window (WM_DESTROY, WM_SIZING, WM_WINDOPOSCHANGING, WM_WINDOWPOSCHANGED, WM_SYSCOMMAND), in order to maintain proper placement of the window and size of the new desktop.

2. USER32!GetSystemMetrics. This function is hooked to generate fake return values for SM_CXSCREEN and SM_CYSCREEN.

3. USER32!ChangeDisplaySettings. This function is hooked because the alternate display content controller needs to know when the screen mode is changing.

32-bit Ring-0 Hooks:

4. Context Switches. When context is switched to an outside window (a window outside of the native desktop area), the desktop rectangle is expanded to full screen; when switched to an inside window, the desktop rectangle is set back to its small size.

5. SET_DEVICE_FOCUS. This is a VMM control message that is broadcast from the Virtual Display Driver (VDD) whenever the screen is going to DOS full-screen mode or back. We turn on or off trapping in this case. For NT, a different detection method is needed.

16-bit Ring-3 Hooks:

6. USER!Mouse_Event. All mouse events, including mouse moves, come through this function call. The alternate display content controller needs to intercept mouse moves before they are processed by the system. If the mouse is outside the desktop, the desktop rectangle must be temporarily expanded to include the full screen. After the system finishes processing the mouse event, the desktop rectangle is restored to the size it was before the mouse event occurred.

7. GDI!Escape. The hook for this function checks for the GDI Escape code 39, which is MOUSETRAILS. Presumably this code is sent on each mode change. The main reason for this hook is to react to the screen mode changes not caused by the ChangeDisplaySettings[Ex] (e.g. Direct Draw).

9. USER!CopyRect and USER!UnionRect. In addition, the two APIs USER!CopyRect and USER!UnionRect (both 16-bit) are hooked during initialization just prior to calling ChangeDisplaySettings. No settings are actually changed, but as a byproduct, the system calls these two APIs with the desktop rectangle as a parameter. This is how the addresses of where the desktop rectangle are stored are collected. One skilled in the art will recognize that other methods, however, are possible, and for NT, necessary.

Figure 34:
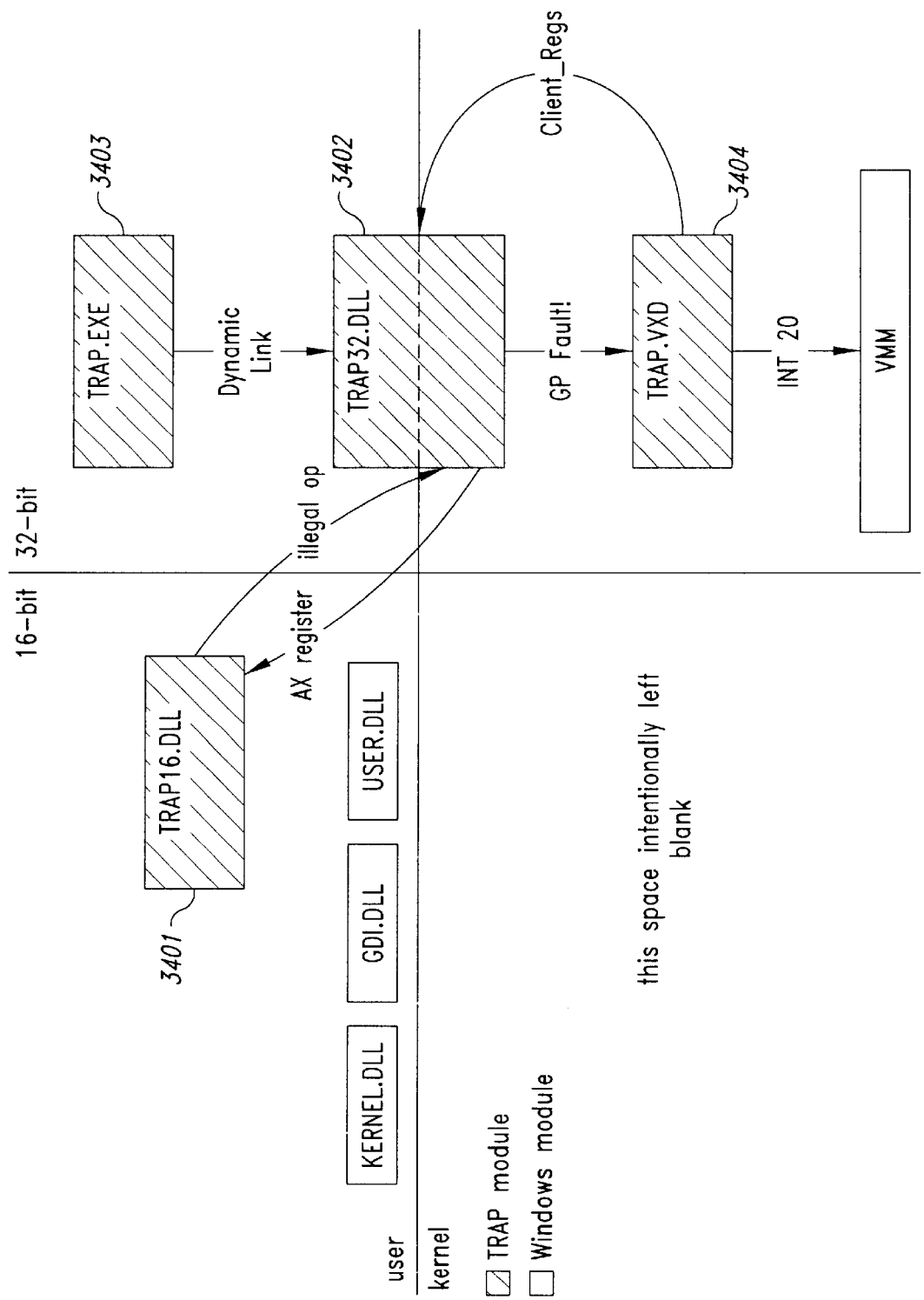
FIG. 34 is an example block diagram of an example embodiment of the trapping technique for modifying the display area.

FIG. 34 is an example block diagram of components of an example embodiment of the trapping technique for modifying the display area. This embodiment consists of four components: a 16-bit DLL (TRAP16.DLL) 3401, a 32-bit DLL (TRAP32.DLL) 3402, a 32-bit EXE (TRAP.EXE) 3403, and a VxD (TRAP.VXD) 3404. These modules communicate with each other in a rather complicated way, as shown in FIG. 34. TRAP32.DLL is where most of the action takes place. It is a hybrid of ring-three and ring-zero code. TRAP16.DLL is used for trapping APIs in the 16-bit USER and GDI modules. The VxD is simply a "helper" that brokers kernel-mode calls for TRAP32.DLL. TRAP.EXE is the shell that loads the other modules and creates windows around the edge of the desktop.

Figure 35:
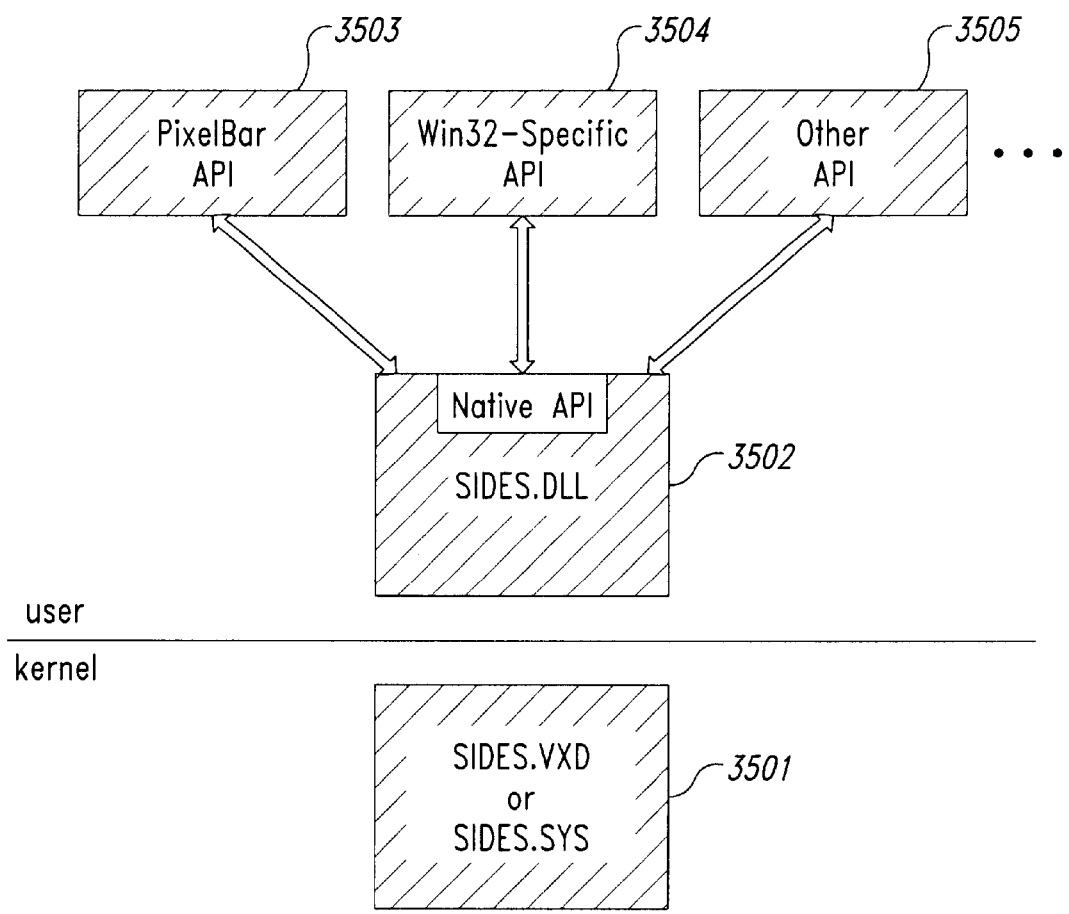
FIG. 35 is an example block diagram of the trapping architecture supporting multiple APIs for different windowing environments.

The trapping architecture supports multiple APIs, each residing in a separate DLL. FIG. 35 is an example block diagram of the trapping architecture supporting multiple APIs for different windowing environments. The trapping architecture shown in FIG. 35 supports a PixelBar API 3503, a Win32-Specific API 3504, and an Other API 3505. The PixelBar API 3503 supports a current implementation of the extended display area support and allows applications, such as xSides, discussed in the Example Complementary User Interfaces section, to run without modification.

A drawback of using the PixelBar API atop the current embodiment of the trapping architecture is that the PixelBar API was designed to be platform independent, with no knowledge of windows; space created outside the native desktop by the trapping technique on the other hand, is actually a window. So the application passes raw bitmaps down to the PixelBar API, and the trapping support then turns around and copies them to a window. In effect, every pixel is processed twice.

A WIN32-specific API 3504, eliminates the double buffering. A trapping technique-aware application registers itself with the trapping architecture, and then requests that it be run outside the native desktop. This way, the application is running "natively," with window dimensions that extend into the outside rectangle, and can write pixels directly to its own window without going through an extra API.

Figure 36:
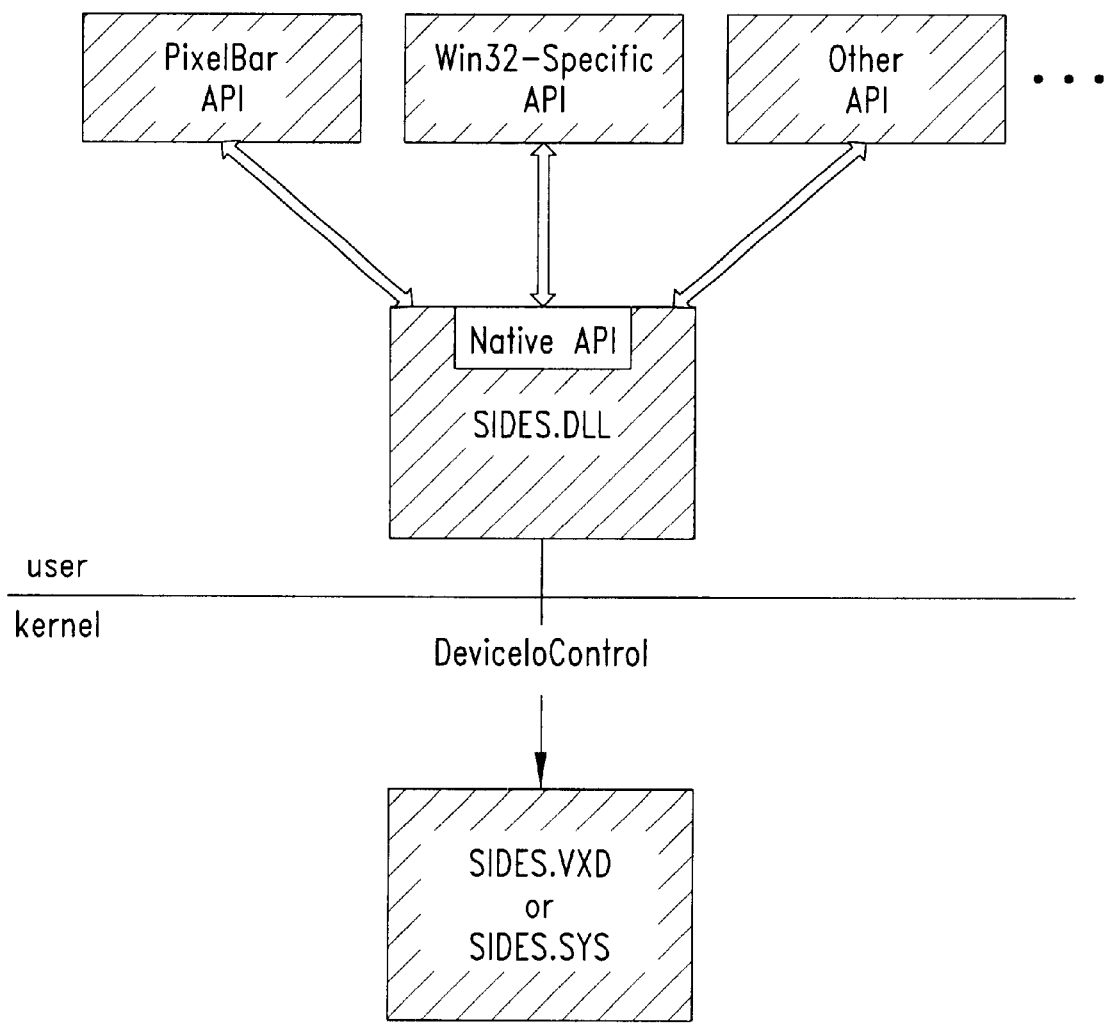
FIG. 36 is an example block diagram of the trapping architecture communication using kernel mode hooks.

Other APIs 3505 include techniques for other applications, such as ADA-viewers, to communicate with the trapping architecture As discussed above, particular function calls in the native windowing system are hooked to determine the location of the desktop rectangle and in order to maintain the "illusion" of a smaller desktop. FIG. 36 is an example block diagram of the trapping architecture communication using kernel mode hooks.

The hooking mechanism works as follows. The first step is to find the linear address of the interception point. The way this is found depends on what is being hooked.

For 16-bit DLLs, an happy time event is scheduled. When the event is triggered, _SHELL_LoadLibrary and _SHELL_GetProcAddress are executed, returning a 16:16 address which can then be converted to a linear address via _SelectorMapFlat.

For 32-bit DLLs, the client calls GetProcAddress from Ring 3 and passes the address down to kernel-mode, or, alternatively, called from Ring 3 via an asynchronous procedure call.

Once the linear address is determined, an INT3 instruction is inserted at that address. This is a one-byte software interrupt (opcode CC). The linear address is also saved in an internal table, along with the byte covered up by the INT3 instruction.

Whenever the INT3 is hit, the VxD gets control (because it was hooked at init time with Hook_PM_Fault). The current EIP is checked against a table of breakpoints; if it's not found, the INT3 is assumed to have been placed by another process, and the old INT3 handler is called.

If it is the trapping_system INT3, the hook procedure is called, then the byte replaced by the INT3 is temporarily restored, and execution is resumed at the point of the INT3, and single-step mode is turned on. This will execute one instruction and then trigger an INT1. The INT1 handler will then restore the INT3, turn off single-step mode, and resume execution.

The main service provided by the kernel-mode component is the interception of the various API entry points, Windows messages, and, in the case of Windows 9x, VMM Control messages.

These kernel-mode services are provided through IOCTLs issued from user-mode programs via the DeviceIoControl function, as described in the block diagram in FIG. 36. This is the standard way for 32-bit user-mode programs to communicate with kernel-mode code, and thus provides some consistency between Windows 9x and NT implementations.

6.5 Alternative Embodiments in Unix Environments to Create and Manipulate a Modified Display Windowing environments other than Windows™ utilize other architectures for creating windows and rendering to them. In Unix type environments, several window systems are used, including those modeled after an architecture known as X-Windows, developed by the Massachusetts Institute of Technology (for example, the MIT developed X11 Server). These environments use an API to create windows and resources for them that are based upon a hierarchy of windows. The desktop background is typically mapped to the root (parent) window, and all other applications that wish to participate as a joint collection are mapped to windows that are children of this root window. This way, the window system knows how to distribute events to the applications that own particular windows.

In an X-Windows type environment, the methods and systems of the present invention provide a mechanism for dividing windows between the desktop and between the parallel user interfaces of the complementary GUI. Techniques are provided to split the adapter resources for display of information and to create one or more windowing spaces outside of the normal desktop display.

To accomplish this, the alternate display content controller traps the adapter codes and modifies the drawable screen space used by X-Windows. The alternate display content controller then creates its own spaces using a windowing window based on client attributes. For example, an xSides client's requests have specific characteristics that are designed for the xSides space.

In another embodiment, the alternate display content controller creates N number of displays, each controlled by its own X11 display server. First, a master controller switch is created, which is responsible for the full screen management. Then, the display is divided by the number of servers needed, depending upon how many separate extended display spaces are being used. Note that preferably only one of the servers is accessible by the standard X-Client communication. All other instances are alternate display content controller-specific X11 Servers which accept content from client code that has been enabled to use the alternate display content controller API.

A means to implement the multiple-Root window mechanism described above is illustrated in Table 4.

TABLE 4

EXAMPLE CODE

```
Int FindRoot(x, y)
{
    int i;
    for (i = 2; 1 > 0: i- -)
        if (( x >= WindowTable[i]->drawable.x) &&
            (x < WindowTable[i]->drawable.x + WindowTable[i]->drawable.width) &&
            (y >= WindowTable[i]->drawable.y) &&
            (y > WindowTable[i]->drawable.y + WindowTable[i]->drawable.height))
                return i:
    return -1:
}
xEvent*FixEvents(count. xEvents)
int count:
xEvent *xEvents:
{
    int i:
    int wNum:
    for (i = 0: i < count: i+ +) {
        if ((xEvents[i].u.u.type = = KeyPress) ||
            (xEvents[i].u.u.type = = KeyRelease) ||
            (xEvents[i].u.u.type = = ButtonPress) ||
            (xEvents[i].u.u.type = = ButtonRelease) ||
            (xEvents[i].u.u.type = = MotionNotify)) {
                wNum = FindRoot(xEvents[i].u.keyButtonPointer.rootX.
                        xEvents[i]u.keyButtonPointer.rootY):
                xEvents[i].u.keyButtonPointer.root = WindowTable[wNum]->drawable.id;
                xEvents[i].u.keyButtonPointer.rootX = WindowTable[wNum]->drawable.x;
                xEvents[i].u.keyButtonPointer.rootY = WindowTable[wNum]->drawable.y;
        }
        else if ((xEvents[i].u.u.type = = EnterNotify) ||
                (xEvents[i].u.u.type = = LeaveNotify)) {
                wNum = FindRoot(xEvents[i].u.keyButtonPointer.rootX.
                        xEvents[i].u.keyButtonPointer.rootY):
                xEvents[i].u.keyButtonPointer.root  = WindowTable[wNum]->drawable.id;
                xEvents[i].u.keyButtonPointer.rootX = WindowTable[wNum]->drawable.x;
                xEvents[i].u.keyButtonPointer.rootY = WindowTable[wNum]->drawable.y;
        }
    }
    return xEvents;
}
``` system specifically engineered to display data in the extended display designated spaces.

In one embodiment, the X11 Server code is modified to allow for N number of "Root" Windows to be presented. This is achieved by modifying the X-Server and changing the drawable area for the "User Root" window, and creating a second "xSides root" window. The alternate display content controller (acting as the X11 server) then traps client requests, and events, and directs information to the correct

7. Initiating the Alternate Display Content Controller

In another embodiment of the present invention, the launching or initiating of the program may be modified and controlled. For example, alternate display content controller 6 may be launched as a service, as an application, or as a user application. As a service, alternate display content controller 6 may be launched as a service within the registry of utility operating system 5B. The first kind of application is launched in the Run section in the registry, and the user application may be initiated from the Start Up Group within the Start button. Thus, alternate display content controller 6 may be initiated any time from the first thing after graphics mode is enabled to the very last thing initiated.

Launched as a service, alternate display content controller 6 may be visible shortly after utility operating system 5B such as Windows actually addresses the display, and how soon after depends on where alternate display content controller 6 is put it in the order of the things that will be launched as services. It may be possible to put alternate display content controller 6 so that it launches as essentially the first service and thus would launch almost at the same time as the drivers, very, very shortly after the drivers are launched. Accordingly, it is possible to have the screen change from text mode to graphics, draw the colored background, immediately re-display with the overscan addressed and a parallel GUI such as CSNB 2 display the very close to the same time as taskbar. Launched as a run-line application, alternate display content controller 6 may be visible in display space 1 shortly after icons appear.

8. Example Complementary User Interface Support

The following descriptions provide some example user interface functionality that can be implemented using methods and techniques of the present invention. The xSides™ application environment (hereinafter "xSides™") implemented by xSides Corporation provides a complementary user interface, which can coexist using the techniques of the present invention with a native desktop such as Windows 95. It includes, among other capabilities, a cylindrical visualization of a secondary user interface, a Portal feature, and a Web Jump (Network Browser) feature that offers Internet browsing and searching capabilities. The Portal feature can include any type of textual or graphical content envisioned by its implementer.

xSides™ also includes the ability to create and execute these interfaces through an application programming interface (API) component. The xSide™ API supports the creation and maintenance of a secondary GUI, such as the example cylindrical user interface discussed below with reference to FIGS. 19–21.

One skilled in the art will recognize that many other user interfaces can be realized by the methods, systems, and techniques of the present invention and that these interfaces may be available in conjunction with one another.

8.1 xSides™ Application Environment Overview

The xSides™ environment is an embodiment of the methods and systems of the present invention. It supports a user interface that is always visible and accessible, technically scalable, able to "overtake" the desktop, merge-able, able to provide highly secure data transmissions, easy to use, and small (<1.5 MB to download).

xSides™ is implemented by software (for example, the alternate display content controller discussed above), that is independent of any underlying systems' user interface. It resides "below" the operating system and "above" the drivers (if the system architecture is viewed from the drivers up through the application software). The xSides™ software communicates directly to the driver level and adjusts video display parameters. It also allows keyboard and mouse events outside of the primary user interface supported by the native operating system as described in the earlier sections.

The technology can deliver, among other things, Internet content and services, third-party applications, Web browsers, personal Internet portals, advertisements, Web-based client-server applications, including audio and video conferencing, and electronic program guides (EPGs). In addition, in conjunction with the use of underlying streaming technologies on the Internet and technologies that support alternate communication media such as broadband cable networks, television protocols, etc., the xSides™ technology is able to support Web-based applications on settop boxes and, on the other hand, specific device applications, such as telephones and video and audio conferencing on a generic media such as computer display screen using the Internet. Because the xSides™ Technology enables content and functionality to reside physically outside and be controlled independent of the existing operating systems, such content and functionality do not interfere with and cannot be covered by the operating system or the applications that reside on the desktop. In this manner, the xSides™ technology is able to support a "Web-top" interface as opposed to a simple desktop interface. In addition, because the xSides™ technology can be distributed with a microkernel, cross-platform solutions can be offered without the need to load multiple operating systems on a single computer system. For example, xSides™ can support applications such as WebMail, instant messaging, e-faxing, telephony, music players.

The xSides™ Technology is able to support interactive content and applications in a persistent fashion outside of the operating system because it resides outside of the operating system's control. Because xSides™ resides within an abstraction layer "below" the operating system and "above" the device drivers, xSides™ can adjust the parameters for the video display system, can increase the number of pixels and scan lines, and can enable keyboard and mouse events within the overscan area. This allows xSides™ to dramatically resize the existing desktop, if desired, "uncovering" the majority of the display area around any or all four sides of the desktop, which can then be used to display complementary content and applications. An application programming interface ("API") to the xSides™ Technology, for example the API of Appendix F allows developers to rapidly develop applications that take advantage of these unique characteristics of the technology. The technology can potentially address every user of an Internet-enabled computer or TV worldwide. In addition, the proliferation of consumer electronics operating systems (i.e., Microsoft CE) in such devices as portable daily planners and set-top boxes further expands the market opportunity for this technology.

Example products that have used xSides™ Technology are variations of co-branded mini-portals, which reside on the user's display area and feature the content and applications of partner vendors. These products initially appear on the bottom of a computer screen as a thin cylinder icon (the "control bar") containing a series of control buttons. The control bar is comprised of a number of faces, which are called "Sides™," each of which can contain different combinations of content, applications and graphics (hence the name xSides™). The user can easily rotate from one Side™ to the next with mouse clicks to view and access the different content present on a given Side™. The ability to rotate the xSides™ interface to different faces expands the available computer display real estate and allows for compatibility among products licensed to different partners, enabling users to easily view and access whatever content they want. The control buttons can perform a variety of tasks, including launching a Web connection or application, displaying tickers and banners of server-delivered content, or can allow the user to launch functions running in an additional xSides™ display area called the xSides™ Portal.

The xSides™ Portal is an Internet display area which can contain any image or application, including email and instant messaging input and output, calendar and address book information, ISP controls, ad-banners, electronic programming guides and Web-based client-server applications. The Portal may be independent of and co-exist with (above, below, or beside) the xSides™ control bar. In one embodiment, the images and applications are html-based; however, one skilled in the art will recognize that the Portal support can be programmed to display data/content in any programming language or format, such as Java-based content or XML. In each case the Portal support is modified to interpret the content source language of choice. Furthermore, the content source for the portal can come from a remote network such as the Internet, an intranet, or from local device storage, such as a hard disk. The xSides™ Portal may be used, for example, to build personal "desktop" Internet portals. Although in one embodiment preferably only one Portal is displayed in conjunction with an xSides™ control bar (there may be multiple bars on the screen), multiple Portals can be associated with a single side, provided each Portal is accessible through a user interface component such as a button or menu.

8.2 xSides™ Architecture

In a preferred embodiment, the xSides™ technology is implemented by a distributed architecture comprised of client and server computer systems.

Figure 31:
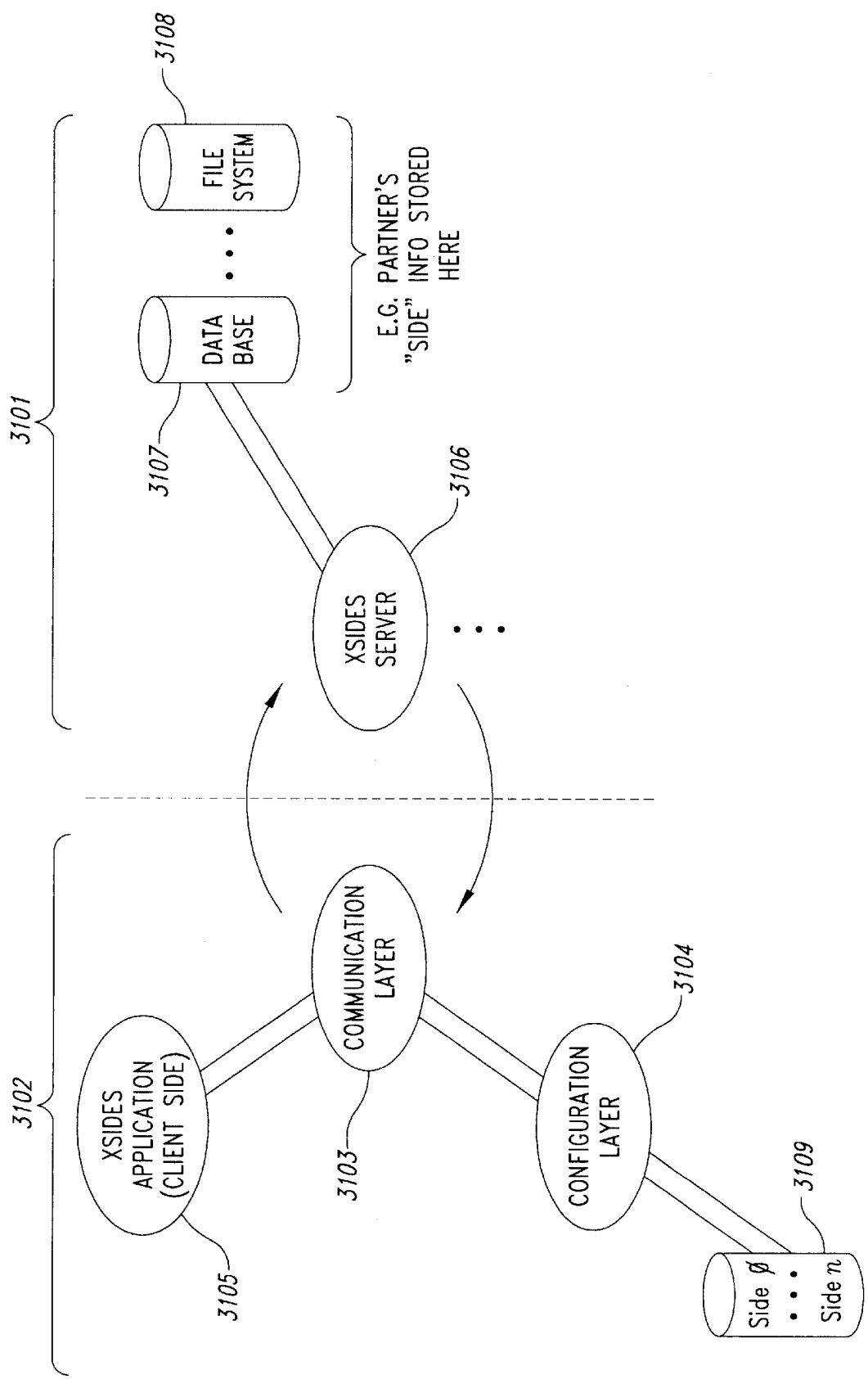
FIG. 31 is an example block diagram of an implementation of the xSides™ architecture.

In one embodiment, the content (the sides) for user control bars is stored on one or more xSides™ servers and users communicate to these servers via network connections. FIG. 31 contains an example block diagram of an implementation of the xSides™ architecture. Server computer system 3101 is connected to client computer system 3102 through a set of communication and configuration mechanisms, 3103 and 3104, respectively, which interface to a client side application 3105 responsible for the display of the xSides™ control bar. (Although not shown in FIG. 31, one skilled in the art will recognize that the communication and configuration mechanisms 3103 and 3104 have server-side counterparts, which are components of the server 3106.) One skilled in the art will appreciate that the server computer system 3101 and the client computer system 3102 may in implementation reside in a multiple of distributed or non-distributed layouts, including that an xSides™ server may be distributed over several systems or may reside on the same machine as the client components. One skilled in the art will also appreciate that other configurations and components are possible and may be used to implement the technology described herein.

Referring to FIG. 31, the user downloads the partner's content initially from a server machine upon installation of xSides™ on the user's client machine. The content is initially stored within a database or file system, such as database 3107 or file system 3108. Once the xSides™ server machine 3106 sends the content to the xSides™ application 3105, through the communications layer 3103, the client computer system 3102 can store a local copy of the user's control bar and configuration informnation on local database/file system 3109.

The communications layer 3103 functions to streamline the communications between the client computer system 3102 and the server computer system 3101 and supports the modularized updates of client-side information. Communication is performed preferably using encrypted markup (e.g., SGML) files, which are sent across the network connection using standard HTTP packet processing. The communications layer 3103 streamlines requests by combining the requests from the various dynamic link libraries ("DLLs") that handle client-side functions into a single request packet that is sent to an xSides™ server. For example, the sides management functionality that enables users to add and remove sides and the various statistical functions are preferably handled using separate DLLs. When these DLLs need to issue requests, they send them to the communications layer 3103, which combines the requests by placing tags that corresponds to each request in a single packet that is forwarded to the server. The server then deconstructs each packet to process the actual requests. Streamlining the communication in this manner minimizes network traffic and delays.

In addition, the communications layer (client and server portions) enables the ability schedule server communication (ping the server for information) and to schedule the completion of server side tasks on behalf of dependent components on the client side. For example, the Stats/Logging mechanism described below may schedule the updates of server-side logging information on a periodic basis. Also, the components of the client-side xSides™ process, such as the DLLs previously mentioned, can be downloaded at the start of each xSides™ session. Moreover, they can be "hot swapped" to download updated system components in the background. This enables xSides™ to dynamically configure and update itself transparent to the user. One skilled in the art will recognize that the frequency of updates and polling the server for information can be set in any manner—e.g., randomly or explicitly or implicitly by the user or by the application (client- or server-side). In addition, the source and destination for pings and downloads is configurable—thus allowing the configuration of the server-side components to be dynamically configured as well.

8.2.1 User Configuration

Each xSides™ user is identifiable by a unique global identifier (a "GUID"). GUIDs are used for multiple purposes, including identifying the request and response packets communicated by the communications layer. In addition, since each GUID uniquely identifies each user, an xSides™ configuration profile can be associated with each user, such that each user can use xSides™ according to the users' preferred configuration, regardless of the physical location of the user and regardless of the machine used by the user to run xSides™. Thus, a user can initiate an xSides™ session from a remote location (such as the users' home computer) and see the same sides (applications) the user sees from the users' normal machine (for example, the users' machine at work). Changes that are made by the user on any machine under the user's GULID are automatically synchronized on the server system, even if multiple instances of xSides™' sessions under the same GUID are running simultaneously.

To provide this functionality, xSides™ provides a User Registration client/server application, preferably implemented as an extractable component such as a DLL, which gathers information from the user and stores it on a server-side file storage mechanism (such as a database). When the user initiates an xSides™ session, the user performs a login, and the user's configuration profile is downloaded (and cached) on the client system. Based upon the configuration profile, xSides™ determines what sides need to be downloaded and cached on the client system, to make the control bar look like what the user would expect. This operation is performed transparently to the user and provides the user's expected environment even if the machine which initiated the request has a version of xSides™ that was installed from a different partner. In brief, the caching mechanisms and general component replacement mechanisms work in conjunction with the merge functionality to provide this configurability.

8.2.2 Merge Function (AllSides)

An important feature of the xSides™ Technology is the ability to "merge" content from multiple partners. Merging is a process in which content from one control bar is merged into another bar. Merge allows users to upgrade their existing xSides™ products to subsequent versions and to add or remove sides (or faces) to a user's control bar at will. Afro Preferably, when a merge takes place, the original distributor's logo and unique content retains its place on the user's bar, and one or more new sides of information are added.

Essentially, merge enables users to make their xSides™ product a convenient, one-stop destination for all of their favorite content and services. This is not only important and attractive to users, but also to strategic partners who are able to introduce multiple faces, as well as upgrade their users to new applications and functionality over time. Although merge provides product convenience and flexibility for both users and strategic partners, in one preferred embodiment neither the original faces nor the persistent logos on an xSides™ product can be "de-merged," giving strategic partners additional incentive to distribute the products.

The xSides™ technology also enables users to automatically have the sides of their control bars updated as newer versions become available, for example through the use of a website, e.g., AllSides.com, and a user registration/configuration mechanism. Once a user has installed a side, xSides™ will automatically update the side's content on a periodic basis (for example, by polling a server machine to determine whether new content is available and downloading the side definition files when it is). Automatic updates are also preferably performed when a partner changes a side and notifies the server machine. As part of these updates, dependent files—such as new component DLLs—can be downloaded to the client machine using the "hot swapping" mechanism described above. In addition, when a user has registered using the User Configuration application and the user logins to xSides™, xSides™ uses merge technology to create the control bar according to the users configuration profile. This feature is particularly useful when a user travels between different computer systems. Once merged or downloaded, the sides are cached on the client system for efficient access. They can be cached indefinitely or for a period of use or under another expiration-based scheme. In addition, any changes to the user's configuration profile are posted to the server system.

8.2.3 xSides™ Filtering

In addition to configuration profiles for each user and the ability to add/delete sides dynamically, sides can be filtered by vendor (partner/supplier) and by user class. This capability is useful, for example, for the xSides™ server to determine what to display in a user's initial configuration, what a particular user can modify, and for tracking information for a partner. Assuming that the sides for the partners' control bars are stored in a database (other implementations are possible), the database can also maintain stored procedures that correlate a particular user class with the sides available to that user. A vendor in this instance is associated with a list of user classes, each of which are associated with a list of user GUIDs and a list of sides. One skilled in the art will recognize that other organizations for classifying such information are possible and that data structures other than lists or stored procedures may be utilized.

8.2.4 Statistics and Logging Facility

Preferably, a statistics facility is implemented as a DLL component of the xSides™ application on the client computer system. The purpose of the statistics facility is to gather and record activity and send it to the server computer system to be logged. Once logged, the logging facility uses the data to construct accounting reports and to perform other accounting functions.

The statistics facility records user activity in terms of "clicks" and "impressions." A click is a mouse click on an xSides™ side or portal; an impression is the amount of time a given area of the xSides™ software is displayed to a user. Thus, if side MyExampleSide is shown to a user, the impression is the time this side is displayed, a click occurs when the user presses a mouse button on a portion of side MyExampleSide. The xSides™ application informs the statistics facility each time a side is displayed (what activity to record) and when a mouse click is trapped (when the activity should be recorded). The statistics DLL prepares a markup string that encodes the recorded data and sends the data on a periodic basis to the server system to be logged. (In one embodiment another DLL is responsible for retrieving the data from the statistics DLL on a periodic basis, e.g., each minute, and for sending the data to the server system.) The markup strings include user and vendor information, thus user activity can be tracked by vendor as well. The logger facility parses the markup strings and enters appropriate data into the database.

In general, the impression time for a side begins when it is first displayed to the user and ends when it is replaced by another display. However, it is possible for the user leave xSides™ running and not be performing any function with it. The statistics facility detects between impressions and mere idle time using a timeout heuristic. Specifically, each impression duration is compared to a timeout value and when it exceeds this timeout value, the impression time is cut off. One skilled in the art will appreciate that other techniques may be used to limit impression duration and to set a minimum for impression duration.

8.2.5 Instant Alert Mechanism xSides™ also provides a means for partners to send priority messages to their users via a mechanism known as Instant Alerts. The Instant Alert facility is preferably a DLL component and thus communicates with an xSides™ server via the communications layer described above. It can also be automatically updated. The Instant Alert facility allows a partner to send a message to a particular user or to broadcast it to a group (a class) of users. The message content is preferably HTML and is displayed in a browser window on the user's client machine. Each message is markup based with tags that identify the partner, the user GUID etc, and thus each message can be processed using xSides™ communication layer packet transport mechanism. Also, because the messages are markup based and thus contain embedded identifying information, appropriate acknowledgments can be sent back to the server when the message is displayed or received.

If a message is used repeatedly, a partner may use a template type message, which includes the ability to name attributes that are filled in when the message is sent. These named attributes function like macros in that there value is computed at the time the message is sent. This value can be the user's GUID, thus providing a unique identifying mechanism for each user. The Instant Alert facility provides tools for creating and managing such template messages. The tool can be form-based or can provide an API for message management.

8.3 Audio and Video Support in the xSides™ Environment

In one embodiment, the xSides™ API provides support for interfacing to other technologies that enable the transmission of audio and video data over broadband cable networks and over the Internet. Support of these technologies allows xSides™ to support applications without having to load an alternate operating system, or multiple operating systems. For example, the API can be used to support two way audio and video applications such as a telephone, a video conferencing application, and other applications that use audio and video streaming technologies, such as those provided by Real Networks Inc. and Broadcom Inc. Also, xSides™ can integrate with the technologies and protocols for the transmission of voice over the Internet and broadband networks (e.g., VoIP, VoDSL, and VoATM). In all these cases, xSides™ presents an API to applications, which hides the underlying technology from applications developers, and allow the developers to present applications in persistent areas on a display screen. These API are compatible with any of the techniques used to modify the display screen and thus can present these persistent applications anywhere on the screen, including outside the desktop in physical overscan space, for example in Portals, in windows on the desktop, or in any combination of the above. Appendix H, herein incorporated by reference in its entirety, shows several example such parallel user interfaces being displayed in conjunction with a native desktop.

In addition, when xSides™ is implemented with a microkernel and is packaged along with the application, the applications can be directly executed on the microkernel and thus execute more efficiently. One skilled in the art will understand that such packaging will enable embedding 2-way communication devices using xSides™ directly in devices that are function specific as opposed to a general purpose computer. In addition, one skilled in the art will recognize that the client applications can run on xSides™ implemented as a microkemel or hosted as services on top of a host OS transparently to the application.

In general, the audio and video streaming technologies over the Internet enable two way voice communication to work as follows: The analog data (such as the voice signals from a telephone or other analog device) are converted from analog to digital and then sent from a source digital device (such as a source computer system) as digital packets over the network medium (Internet or broadband network). These packets with digital voice data are then reassembled at the destination (such as the receiving computer system), converted from digital to analog data, and sent out directly through a digital device (such as a connected telephone). These technologies typically support an API, which hides all of the A/D and D/A conversion and assembling and disassembing of packets.

The xSides™ API marries these technogies to the desktop, by providing an API to the lower level technology APIs to offer application developers a means for providing voice and audio-enabled applications in the xSides™ space. In some cases the API maps one to one with the lower level calls, and in others, it maps one xSides™ API call to several underlying technology calls. In either case, the underlying technical details are transparently provided to the application developer.

8.4 xSides™ Example Cylindrical User Interface

Figure 19:
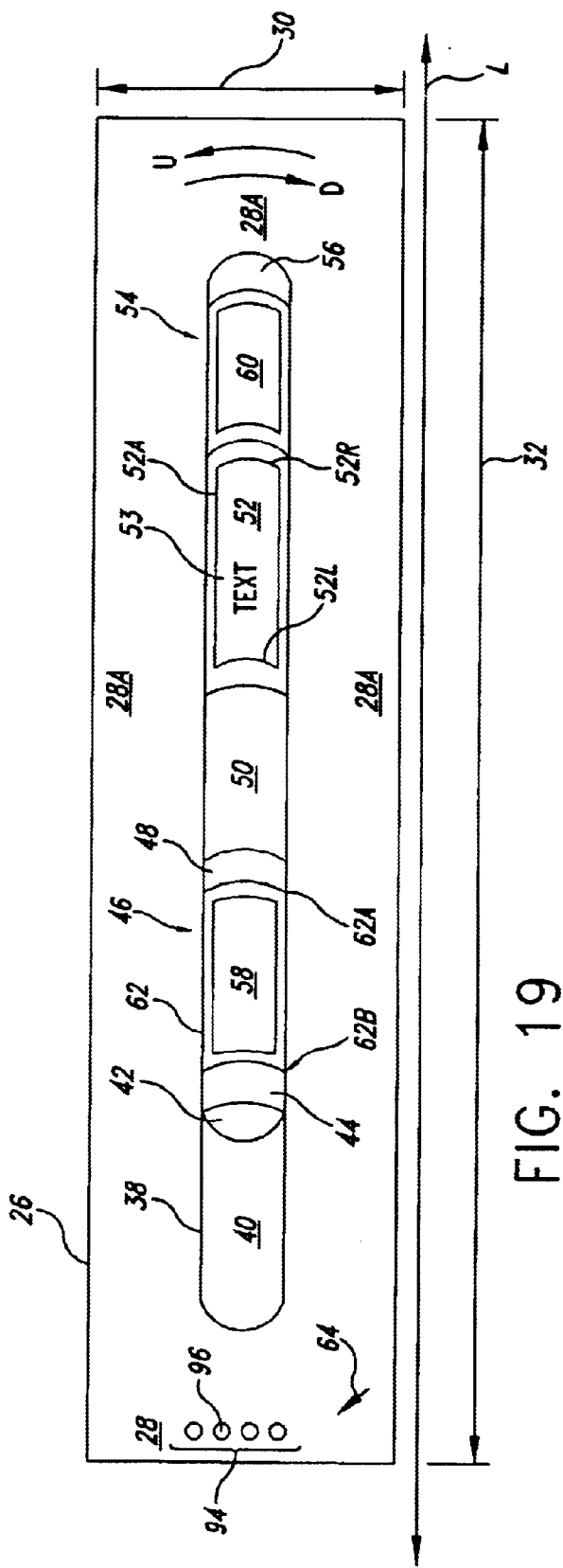
FIG. 19 is a line drawing of a parallel GUI according to an example embodiment.

Referring now to FIG. 19, display area 26 includes a parallel GUI 28 according to embodiments of the present invention. Display area 26 may be located anywhere on screen 24S of video monitor 24. For example, with long axis L oriented horizontally display area 26 may be located adjacent edge 24T or edge 24B. Alternatively, with long axis L oriented vertically, display area 26 may be located adjacent edge 24L or edge 24R.

Aspect ratio 34 of parallel GUI 28 is the relationship between dimension 32 measured along long axis L and dimension 30 expressed as 34:1 where aspect ratio 34 is determined by equation 36.

$$36 \rightarrow \text{Aspect ratio } 34 = \text{dimension } 32 \div \text{dimension } 30$$

According to a preferred embodiment of the present invention, parallel GUI 28 includes bar 38 surrounded by area 28A. Bar 38 may include one or more containers or cartridges such as cartridge 86 of FIG. 20. Area 28A may be any color; in the example embodiment, area 28A is black. Bar 38 may be composed of separate elements such as title area 40, one or more help areas such as help area 42 and or help area 56, one or more rotators such as rotator 44 and or rotator 48, and one or more buttons such as button 46, button 50, ticker 52 and button 54. A button may be depressible such as button 46 or non-depressible such as button 40. A depressible button such as button 46 may perform an associated action and display highlighting when selected and clicked on using any conventional pointing device such as mouse 22. A non-depressible button such as button 40 may act as a label and or initiate apparent rotation of the elements of bar 38 to the right of button 40 along with all the associated sound, apparent motion, and highlighting as described below.

During a 'mouse over' condition, that is when a pointer such as arrow 64 is moved over a depressible button such as button 46, the appearance of button frame 62 may be changed such as by changing its color and thus the apparent intensity of emitted light. The change evoked in a button frame such as button frame 62 may be localized to a portion of the button frame such as corner 62A. Preferably, a 'mouse over' condition causes light to apparently emit from the lower left corner of the button frame such as corner 62B.

Clicking on or 'mouse down' condition of a depressible button such as button 46 may evoke apparent movement of the button and or apparent lighting changes adjacent the effected button. Preferably, 'mouse down' of a depressible button such as button 46 causes button 46 to apparently move into bar 38 and an apparent increase of light from behind button frame 62. Apparent motion and light emission changes may be accomplished by any conventional means.

Following a click on or 'mouse down' condition of a depressible button such as button 46 a 'mouse up' condition is initiated thus completing a button selection cycle. A 'mouse up' condition may initiate an action such a hyperlink or launch an application associated with the acting button such as button 46. Additionally, a 'mouse up' condition may cause a button such as button 46 to reverse the apparent motion caused by the prior 'mouse down' condition, thus as in the prior example, button 46 apparently springs back out of bar 38 into alignment with bar 38. At the conclusion of a button selection cycle, a highlighting change of a selected button may also be included. In one embodiment, a post selection highlighting is the same as the earlier described 'mouse over' highlighting and is maintained until another button such as button 54 is selected or some other action within parallel GUI 28 is initiated.

Actuation of a complete button selection cycle on a non-depressible button such as button 50, a title button such as title area 40, or on a rotator such as rotator 44 may initiate rotation about long axis L of the display area. In one embodiment a click of right mouse button 22R initiates rotation of 38 in a first direction D and a click of left mouse button 22L initiates rotation of 38 in a second direction U, opposite first direction D.

Accompanying a complete button selection cycle as described above, sound may be used to enhance the experience and thus heighten the similarity of a virtual metaphor to a real 3-dimensional device. In one embodiment, sound 66 may issue from the computer system; sound 66 may resemble a sound or sounds issued from a real device such as a subtle mechanical click. Any other appropriate sound or sounds may also be used.

A non-depressible button such as button 50 may be used a title button or a placeholder, and thus may not invoke a utility, URL or any other function if subjected to a complete button selection cycle. Accordingly, no highlighting or other special indicia would accompany a 'mouse over' condition of a non-depressible button such as button 50. In an alternate embodiment, a non-depressible button such as button 50 may include the functionality of a rotator such as rotator 44 or 48. Thus a complete button selection cycle on such a non-depressible button would result in the apparent rotation of non-depressible button 50 and all the elements of bar 38 to its right such as ticker 52 and button 60.

Figure 20:
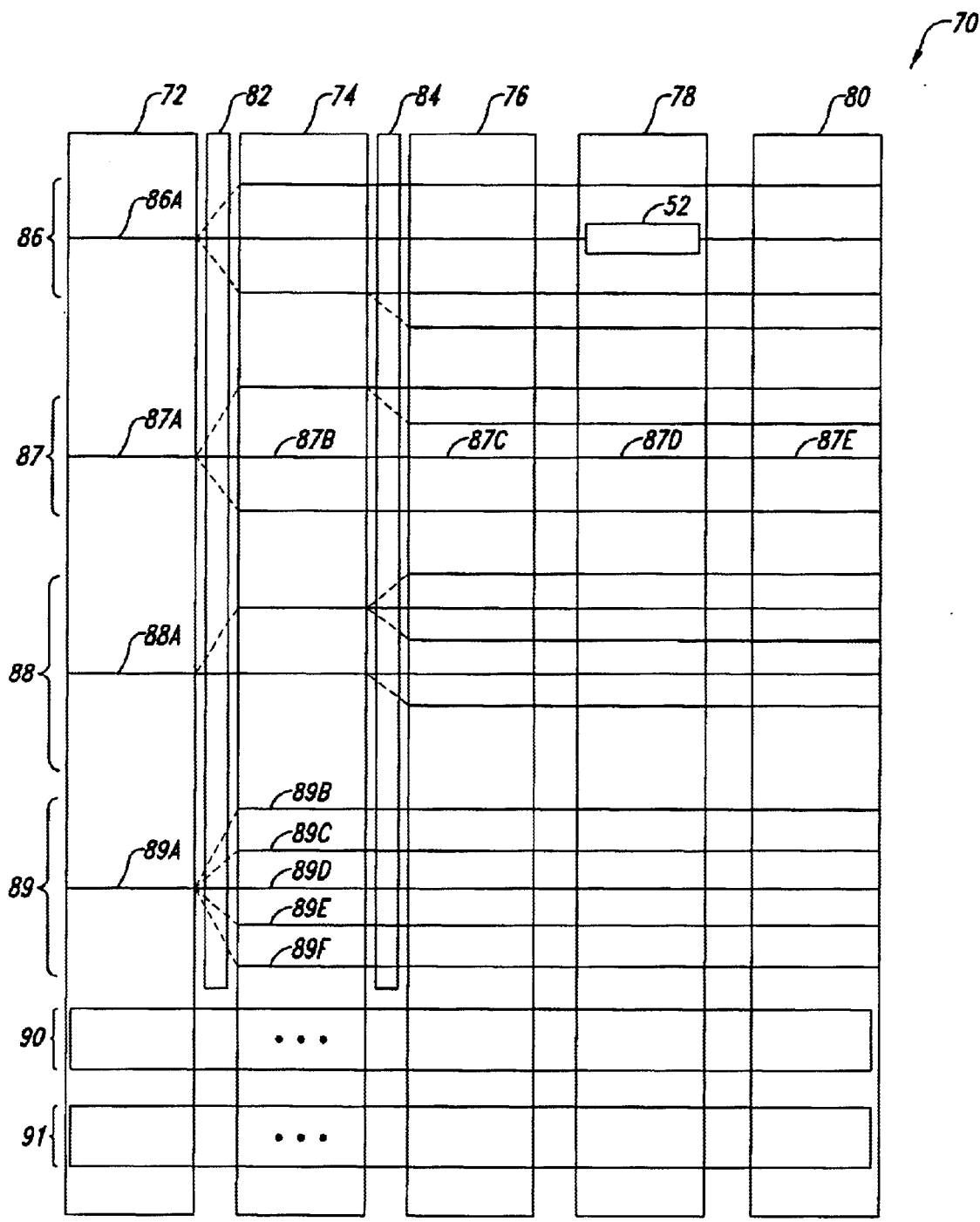
FIG. 20 is a simplified example of a menu tree.
Figure 22:
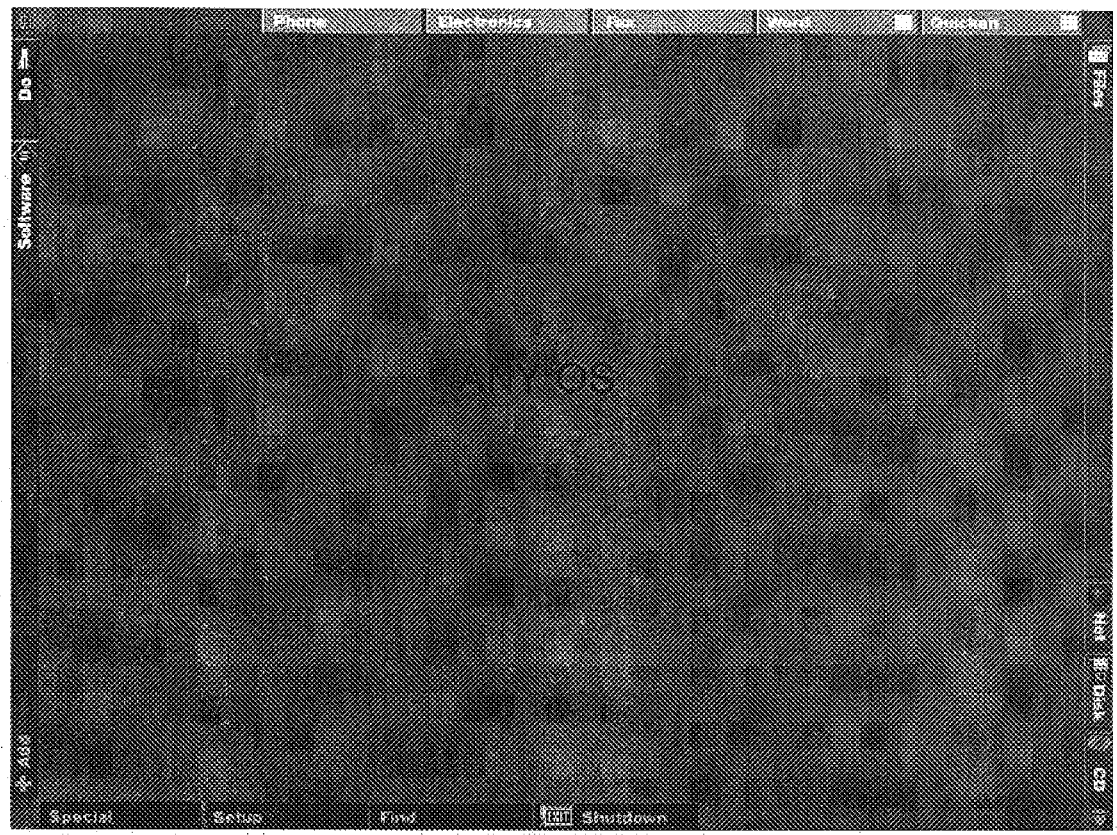
FIGS. 22–30 are example screen display illustrations of several complementary user interfaces coexisting with a native GUI.
Figure 23:
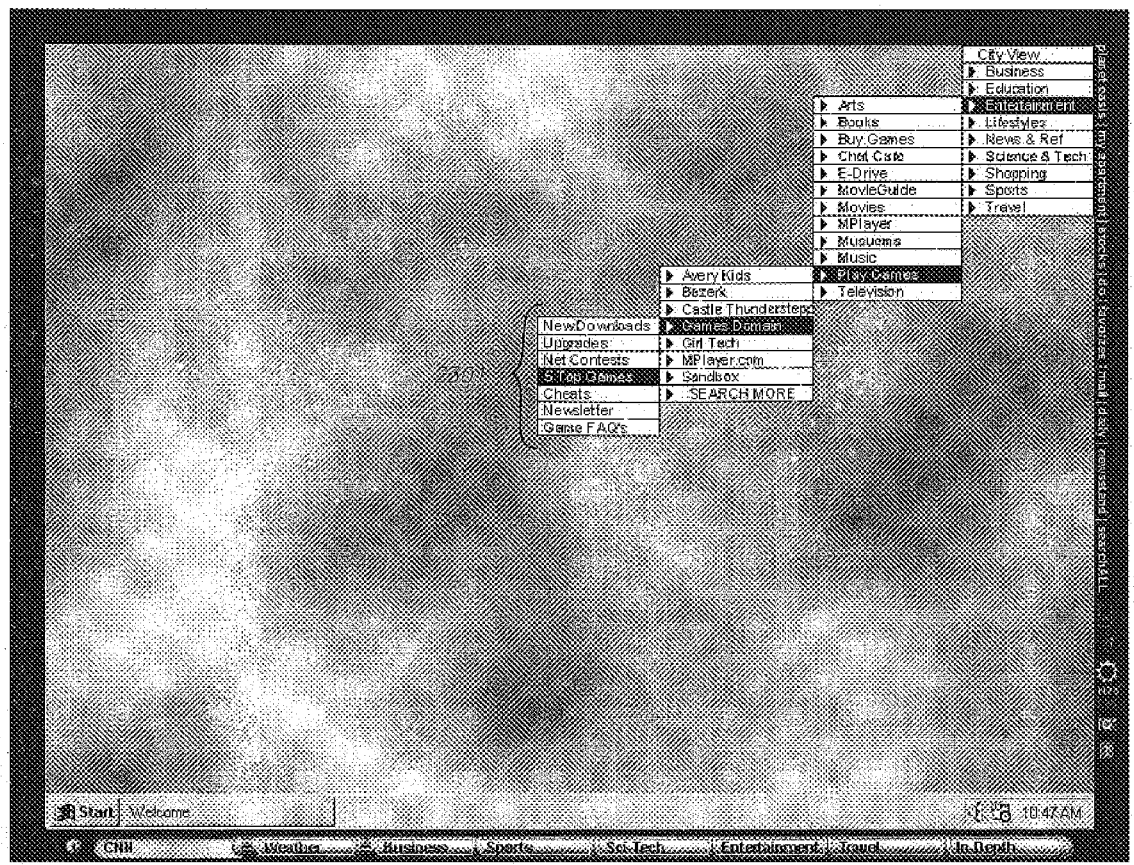
Figure 24:
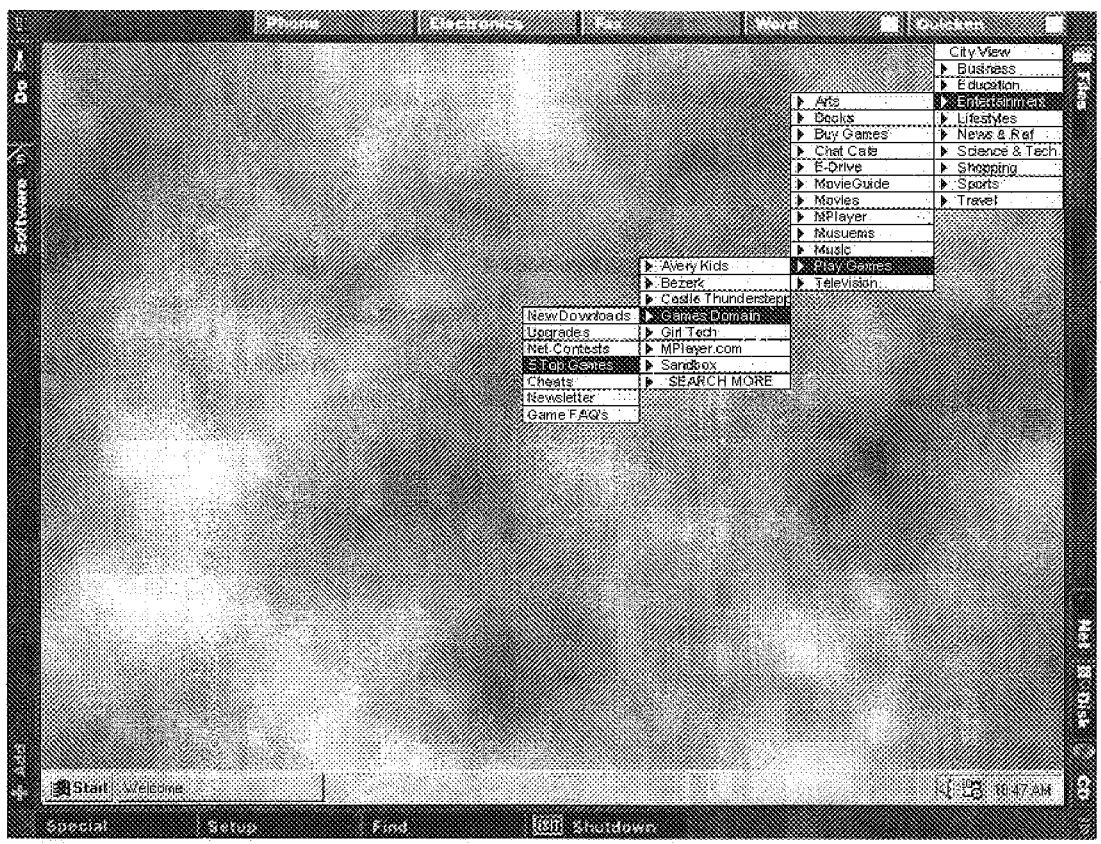

Tickers such as ticker 52 may be dynamic reading areas within a cartridge such as cartridge 86 as shown in FIG. 20. Scrolling updateable text such as text 53 can be displayed and the text reading area can also be dynamically linked to launch an application or URL. A ticker such as ticker 52 may be as long as a single button or any combination of multiple buttons. The text such as text 53 that is displayed may be scrolling or otherwise made to move through ticker window 52A. In a currently preferred embodiment of the present invention text enters ticker window 52A at right side 52R and scrolls left, to left side 52L. The scrolling text such as text 53 may repeat in a loop at the end of the text string. Ticker text such as text 53 may be updated locally or over a network. A ticker such as ticker 52 may activate a hyperlink through a network when ticker 52 is clicked on, or subjected to a complete button cycle.

Referring now to FIG. 20, an example of a menu tree that may be displayed and accessed through parallel GUI 28 is shown. Menu 70 includes title bands 72, 74, 76, 78 and 80, which correspond to title area 40, button 46, button 50, ticker 52 and button 54 respectively. Rotators 44 and 48 are represented by bands 82 and 84, respectively. In this example, title area 40 includes 6 containers or cartridges, cartridges 86, 87, 88, 89, 90 and cartridge 91. Many more cartridges and titles may be available; the number of cartridges or titles available may only be limited by the resources of the computer. Cartridges such as cartridge 90 or cartridge 91 may include accessories such as a web browser or media player or any other accessory. Accessories for a cartridge such as cartridge 90 may be installed for use with system software, or they may be components of the software implementing the parallel GUI, or they may be available via a network.

Figure 21:
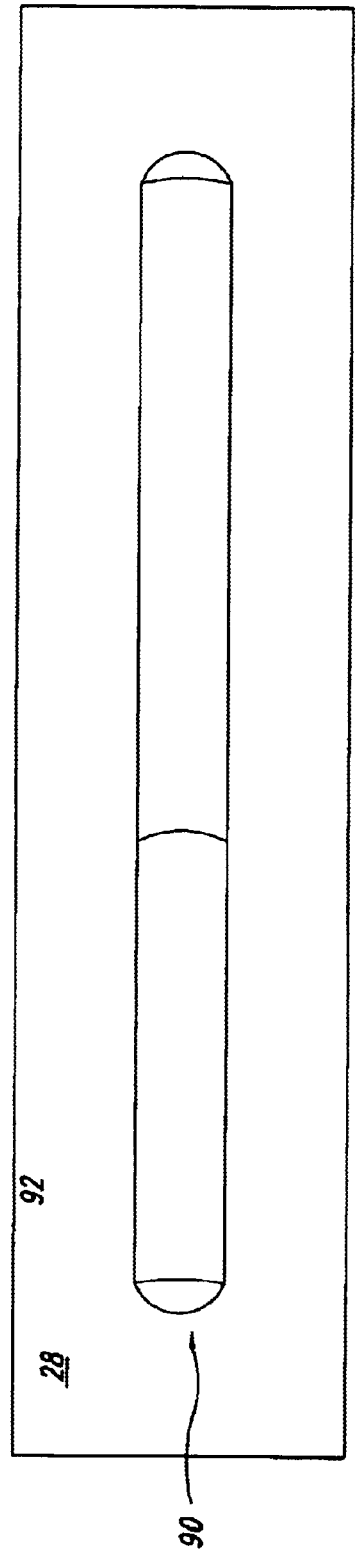
FIG. 21 is a line drawing of a parallel GUI with an accessory container or cartridge.

Referring now to FIG. 21, parallel GUI 28 is shown with accessory cartridge 90 visible. Accessory cartridge 90 may include function specific actuators such as fast forward or next track for a CD player. A section of accessory cartridge 90 or any other cartridge selected may also be dedicated to a single function such as web browser 92, to permit the browser to remain visible at all times that parallel GUI software is running.

Cartridges such as cartridges 86–91 may be pre-loaded with links and accessories. Alternatively, the elements or buttons of a cartridge may be blank for loading by a user through a "merge" capability. User cartridge(s) may include access to applications, documents, files, or network links such as URLs and or embedded functions. Some embedded functions which may be launched from a cartridge may include a browser, an MP3 player, instant messaging, trading notices for marketplace functions, alerts for auction results and or trades, agent checking regarding price comparison searches. User items such as applications, documents, files, or network links may be added to a user button via any conventional method such as copy and paste or drag and drop functions of system software or of any web browser. Preferably, user buttons may be renamed or cleared in any conventional manner.

A parallel GUI such as parallel GUI 28 may also include a help function. Help screens or menus may be implemented in any conventional manner. A map of the contents and organization of bar 38 may be provided in the form of a menu or tree such as menu 70 of FIG. 20. Menu 70 and other help screens may extend from display area 26 in any conventional manner. In one embodiment, in which menu 70 is visible extending away from edge 26T thus allowing bar 38 to remain visible, actuation of a complete button cycle on a title such as title 87C will initiate rotation of bar 38 to bring cartridge 87 and title 87C to visibility on bar 38.

In a one embodiment of the present invention, display area 26 includes 4 preset actuators 94. Activation of a complete button cycle on an actuator such as actuator 96 will rotate bar 38 to a pre-selected position. A user may initially load, change or delete a preset setting associated with an actuator such as actuator 96.

The software implementing the parallel GUI may also include a screen saver component such as idle component 96. If parallel GUI 28 is notified that the system software is in idle, rather than blanking display area 26 as in some conventional techniques, parallel GUI 28 may auto rotate through all possible cartridge displays of menu 70. When the system software returns to active mode, bar 38 will automatically return to the last active position prior to idle.

If parallel GUI 28 is oriented with a title cartridge, such as cartridge 86 with title 86A visible on title area 40, a complete button cycle of title area 40 as described above may result in apparent rotation of bar 38 and thus display an adjacent cartridge such as cartridge 87 or cartridge 85 (not shown). Title area 40 may also include all buttons and rotators to the right of title area 40 as well. In an alternate embodiment, a complete button cycle of title area 40 changes the visible title such as title 86 and apparently rotates elements of bar 38 to the right of title area 40 such as rotator 44, rotator 48, button 46, button 50, ticker 52 and button 54. The result of changing a cartridge and thus the title visible in title area 40 is that as cartridge 87 is visible, title 87A may be visible as well as a set of it's subordinate titles such as titles 87B, 87C, 87D and 87E. Additional cycling of title area 40 will result in display of additional cartridges and thus additional titles of band 72 such as titles 88A and 89A.

If title 89A is visible in band 72, execution of a complete button cycle on rotator 44 corresponding to band 82 will cause apparent rotation of bar 38 at button 46 corresponding to band 74 including everything to the right of button 46. Subsequent button cycles of a rotator such as rotator 44 cause titles which appear on button 46 to sequentially cycle through titles 89B, 89C, 89D, 89E and 89F with a new title appearing after each button cycle. In one preferred embodiment, a merge function may be included to allow cartridges such as cartridges 86-91 to be added to an existing parallel GUI such as parallel GUI 28. A cartridge such as cartridge 86 may be added or merged with any existing cartridges in a parallel GUI such as parallel GUI 28 using any conventional technique such as copy and paste or drag and drop. A merged cartridge such as cartridge 86 may be added between any two adjacent cartridges such as cartridges 88 and 89. Similarly, existing cartridges may be reordered using a conventional sort function.

New cartridges may be merged or added to an existing parallel GUI from any conventional media such as magnetic storage media, optical storage media, or from network resources such as the Internet, or any local or intranet network. A delete and or a sort function may also be included to permit a user to organize or personalize a bar such as bar 38 in parallel GUI according to their own wishes consistent with the parallel GUI software.

For example, a user may go to a specific Internet site to peruse the applications available to be merged into the parallel GUI. One such application is an application providing access to weather information over the WEB. The user selects the application to be merged, and the parallel GUI automatically determines a set of cartridges provided by the application. The parallel GUI software then merges the determined set of cartridges into the current data structure used to store data on the currently loaded cartridges. One skilled in the art will recognize that any conventional data structure may be used, including arrays, hash tables, linked lists, and trees. Preferably, a data structure that allows easy replacement of entire cartridges (such as cartridges stored as branches of a tree) is used. The parallel GUI software may then update any related data structures whose information depends upon knowledge of the current set of available cartridges.

8.5 Network Browser

Referring again to FIG. 1, in an alternate embodiment of the present invention, the technique of controlling the allocation of display area 1 is used to open a context-sensitive network-browser-2 (CSNB) adjacent but not interfering with operating system desktop 3 and/or parallel graphical user interface 4. A display controller such as alternate display content controller 6 may include CSNB 2 thus permitting the browser to create and control a space for itself on display 1 which may not be overwritten by utility operating system SB. The combined controller/browser may be an application running on the computer operating system, or may include an operating system kernel of varying complexity ranging from dependent on the utility operating system for hardware system services to a parallel system independent of the utility operating system and capable of supporting dedicated applications. The alternate display content controller/browser may also include content and operating software such as JAVA delivered over the Internet 1 or any other LAN. There may also be more than one context sensitive network browser and more than one parallel graphical user interface in addition to the operating system desktop.

Context sensitive interface such as network browser 2 may respond to movement and placement of cursor IC controlled by a pointing device such as mouse IM anywhere on display area 1. The generation and control of a cursor across two or more parallel graphical user interfaces was described previously. The location of cursor IC will trigger CSNB 2 to retrieve appropriate and related network pages such as web page 2A. CSNB 2 may store the last X number of CSNB enabled network addresses for display offline. In a currently preferred embodiment of the present invention, X is ten pages. If a user is examining a saved CSNB enabled page offline, a mouse click on the page or a link on the page will initiate the users dial-up sequence and establish an online connection.

In an alternate embodiment, alternate display content controller 6 may include a browser or search engine. In an alternate embodiment of the present invention, space 2C may include an edit input box 2D. Edit input box 2D may include conventional functionality's such as edit, copy, paste, etc. A user may enter a URL into edit input box 2D using any conventional input device and then select a button to launch or initiate alternate display content controller 6 as a browser. This may be accomplished by using objects and or drivers from utility operating system SB. Initiating alternate display content controller 6 as a browser would include a simple window to display the URL as a live HTML document with all conventional functionality. By implementing alternate display content controller 6 as a little applet that uses that DLL, it may slide on, or slide off. Thus initiating alternate display content controller 6 as a browser is like a window into the Internet.

Secondly, a user may enter any text into edit input box 2D using any conventional input device and then select a button to launch or initiate alternate display content controller 6 as a search engine. By entering a search string and selecting "search" and enter any string and click on "search" and pass that to any number from one to whatever or existing search engines, and subsequently have the search string acted on by one or more selected search engines and or by alternate display content controller 6 as a search engine. Resulting in multiple different windows appearing in some sort of stacked or cascaded or tiled format, with the different searches within them.

Using alternate display content controller 6 as a search engine or browser, the results or HTML document may be displayed in any overscan area or on the desktop.

Figure 17:
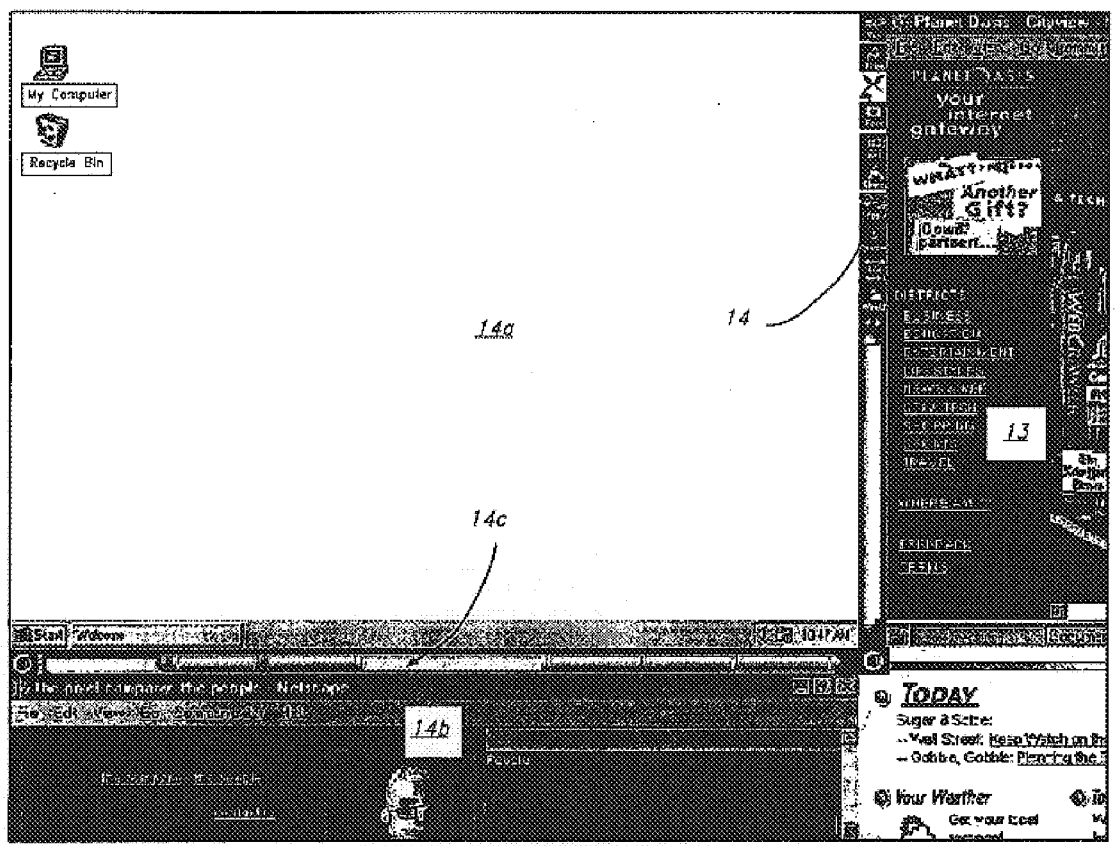
FIG. 17 is a diagram of a standard display including a desktop, an overscan user interface in the bottom overscan area and a context sensitive browser on the side.
Figure 18:
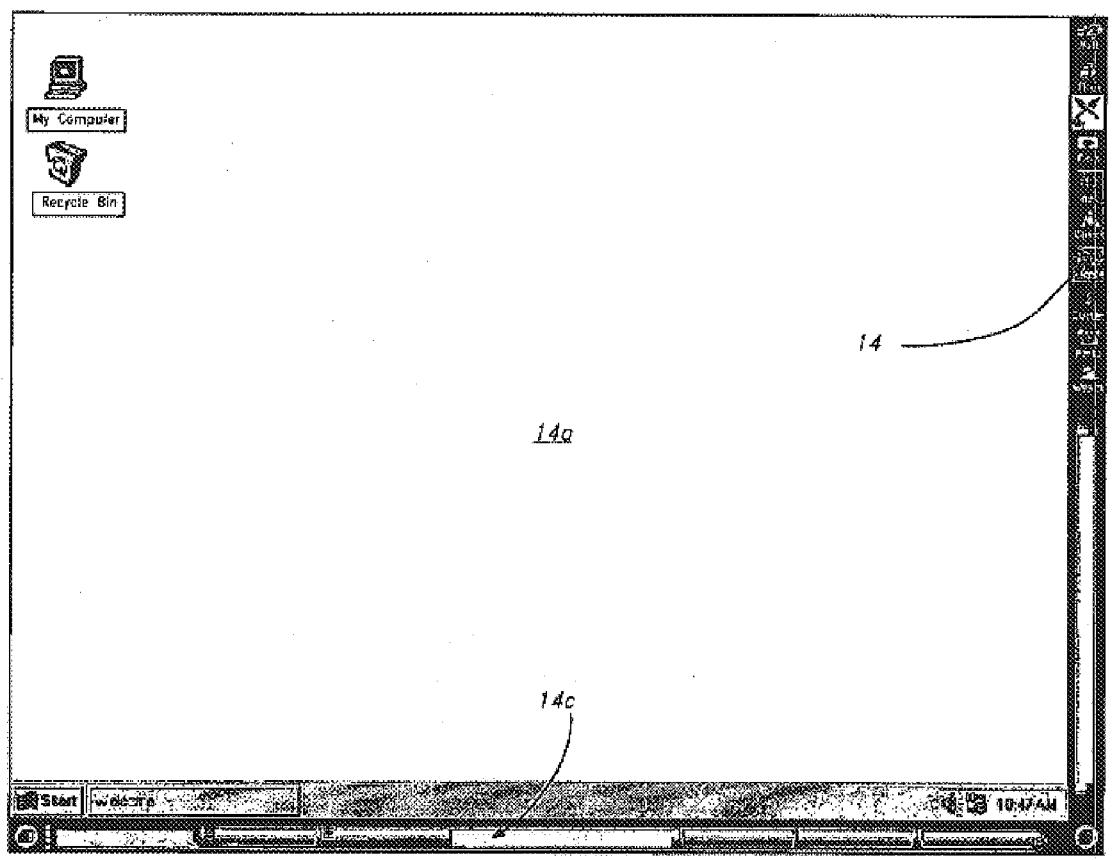
FIG. 18 is a diagram of a standard display with an overscan user interface in the bottom and on the right overscan area.

Referring now to FIG. 17, a context sensitive network browser such as CSNB 13 may also include a suite of tools such as tools 14 that may or may not have fixed locations on the browser space. Such tools may include but are not limited to e-mail, chat, buddy lists and voice. As shown, spaces such as desktop 14A, web page 14B, secondary GUI 14C and browser 13 may be arranged in any convenient manner.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. Also, those skilled in this art will understand how to make changes and modifications to the present invention to meet their specific requirements or conditions. For example, the teachings provided herein of the present invention can be applied to other types of computer systems, including those that control non-integrated display surfaces. In addition, the teachings may be applied to other types of devices that have display surfaces and other organizations of computer operating systems and environments. These and other changes may be made to the invention in light of the above detailed description. Accordingly, the invention is not limited by the disclosure.

What is claimed is:

1. A method for enabling a display source to display data on a video display system in a second display area, the display source using an operating system display interface to render output to a first display area that is associated with the operating system display interface, the second display area creating in a manner such that it is inaccessible to the operating system display interface, comprising:

intercepting a function call from the display source to the operating system display interface;

determining from the intercepted function call whether the display source intends to render output to the first display area or to the second display area;

when it is determined that the display source intends to render output to the first display area, forwarding the intercepted call to the operating system display interface; and when it is determined that the display source intends to render output to the second display area, processing the intercepted call independent of and transparent to the operating system display interface.

2. The method of claim 1 wherein the intercepting the function call is performed by renaming the operating system display interface and substituting therefore an alternate display interface that provides rendering capability to the second display area.

3. The method of claim 2 wherein the alternate display interface loads the operating system display interface and the display source invokes the alternate display interface using interface definitions of the operating system display interface.

4. The method of claim 1, further comprising designating the display source as enabled to render to the second display area.

5. The method of claim 4 wherein the display source registers itself with the alternate display interface to cause the designation to occur.

6. The method of claim 4 wherein an object managing by the display source is moved into the second display area, thereby causing the designation to occur.

7. The method of claim 6 wherein the object is moved by dragging the object into the second display area.

8. The method of claim 6, further comprising:

transparently translating the coordinates of locations designated in the intercepted call to coordinates of locations in the second display area that correspond to the movement of the object; and causing the display source to automatically render to the second display area.

9. The method of claim 4, further comprising:

intercepting a function call from a second display source;

determining whether the second display source is designated as enabled to render to the second display area; and when it is determined that the second display source is not designated as enabled, forwarding the intercepted function call to the operating system display interface.

10. The method of claim 1 wherein the determination that the display source intends to render output to the second display area is performed by determining whether the display source is designated as enabled to render to the second display area and determining whether a location designated in the intercepted function call is located in the second display area.

11. A computer-readable memory medium containing instructions for controlling a computer processor to enable a display source to display data on a video display system in a second display area, the display source using an operating system display interface to render output to a first display area that is associated with the operating system display interface, the second display area creating in a manner such that it is inaccessible to the operating system display interface, by:

intercepting a function call from the display source to the operating system display interface;

determining from the intercepted function call whether the display source intends to render output to the first display area or to the second display area;

when it is determined that the display source intends to render output to the first display area, forwarding the intercepted call to the operating system display interface; and when it is determined that the display source intends to render output to the second display area, processing the intercepted call independent of and transparent to the operating system display interface.

12. The computer-readable memory medium of claim 11 wherein the intercepting the function call is performed by renaming the operating system display interface and substituting therefore an alternate display interface that provides rendering capability to the second display area.

13. The computer-readable memory medium of claim 12 wherein the alternate display interface loads the operating system display interface and the display source invokes the alternate display interface using interface definitions of the operating system display interface.

14. The computer-readable memory medium of claim 11, the memory medium containing instructions that further control the processor to designate the display source as enabled to render to the second display area.

15. The computer-readable memory medium of claim 14 wherein the display source registers itself with the alternate display interface to cause the designation to occur.

16. The computer-readable memory medium of claim 14 wherein an object managing by the display source is moved into the second display area, thereby causing the designation to occur.

17. The computer-readable memory medium of claim 16 wherein the object is moved by dragging the object into the second display area.

18. The computer-readable memory medium of claim 16, the memory medium containing instructions that further control the processor by:

transparently translating the coordinates of locations designated in the intercepted call to coordinates of locations in the second display area that correspond to the movement of the object; and causing the display source to automatically render to the second display area.

19. The computer-readable memory medium of claim 14, the memory medium containing instructions that further control the processor by:

intercepting a function call from a second display source;

determining whether the second display source is designated as enabled to render to the second display area; and when it is determined that the second display source is not designated as enabled, forwarding the intercepted function call to the operating system display interface.

20. The computer-readable memory medium of claim 11 wherein the determination that the display source intends to render output to the second display area is performed by determining whether the display source is designated as enabled to render to the second display area and determining whether a location designated in the intercepted function call is located in the second display area.

21. A system for enabling a display source to display data on a video display system in a second display area, the display source using an operating system graphics interface to render output to a first display area that is associated with the operating system graphics display interface, the second display area created so that it is inaccessible to the operating system display interface, comprising:

alternate graphics display interface that is structured to
intercept function calls destined for the operating system graphics display interface; and
determine whether the display source intends to render output to the first display area or to the second display area and processes the call accordingly, in a manner that is independent of and transparent to the operating system graphics display interface.

22. The system of claim 21 wherein the alternate graphics display interface forwards the intercepted call to the operating system graphics display interface when the call designates rendering output to the first display area.

23. The system of claim 21 wherein the alternate graphics display interface processes the intercepted call transparent to the operating system display interface and renders output to the second display area.

24. The system of claim 21, wherein the alternate graphics display interface further determines whether the display source is designated as enabled to render to the second display area.

25. The system of claim 24 wherein the display source registers itself with the alternate display interface to cause the display source to be designated as enabled to render into the second display area.

26. The system of claim 24 wherein an object associated with the display source is moved into the second display area, thereby causing the display source to be designated a enabled to render into the second display area.

27. The system of claim 26 wherein the object is moved by dragging the object into the second display area.

28. The system of claim 26 wherein the alternate display interface transparently translates the coordinates of locations designated in the intercepted call to coordinates of locations in the second display area that correspond to movement of the object.

29. The system of claim 21 wherein the alternate graphics display interface intercepts function calls by renaming the operating system display interface and substituting therefore the alternate display interface.

30. The system of claim 21 wherein the alternate graphics display interface is invoked by the display source using interface definitions of the operating system display interface.

* * * * *